(12) United States Patent
Conway et al.

(10) Patent No.: US 11,051,581 B2
(45) Date of Patent: Jul. 6, 2021

(54) FOOTWEAR SOLE STRUCTURE HAVING A FLUID-FILLED CHAMBER INCLUDING A TENSILE MEMBER

(71) Applicant: NIKE, Inc., Beaverton, OR (US)

(72) Inventors: Sean Conway, Beaverton, OR (US); Shaun J. Hensley, Portland, OR (US); Bret P. Liebeno, West Linn, OR (US); Deni Mei, Beaverton, OR (US); Greg Ponitz, Beaverton, OR (US); Sean Stam, Beaverton, OR (US); Geoff Weston, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/897,632

(22) Filed: Jun. 10, 2020

(65) Prior Publication Data

US 2020/0297070 A1 Sep. 24, 2020

Related U.S. Application Data

(62) Division of application No. 15/915,816, filed on Mar. 8, 2018, now Pat. No. 10,709,199.

(Continued)

(51) Int. Cl.
*A43B 13/18* (2006.01)
*A43B 13/20* (2006.01)
(Continued)

(52) U.S. Cl.
CPC ............ *A43B 13/186* (2013.01); *A43B 13/12* (2013.01); *A43B 13/14* (2013.01); *A43B 13/181* (2013.01);
(Continued)

(58) Field of Classification Search
CPC ....... A43B 13/186; A43B 13/20; A43B 13/12; A43B 21/28; A43B 13/14; A43B 13/181;
(Continued)

(56) References Cited

U.S. PATENT DOCUMENTS

| 4,906,502 A | 3/1990 | Rudy |
| 4,999,931 A | 3/1991 | Vermeulen |

(Continued)

FOREIGN PATENT DOCUMENTS

| WO | 03075699 | 9/2003 |
| WO | WO-03075699 A1 | 9/2003 |

(Continued)

OTHER PUBLICATIONS

European Patent Office (ISA), International Search Report and Written Opinion for International Application No. PCT/US2018/021738, dated Jul. 2, 2018.

(Continued)

*Primary Examiner* — Michael C Miggins
(74) *Attorney, Agent, or Firm* — Honigman LLP; Matthew H. Szalach; Jonathan O'Brien

(57) ABSTRACT

A footwear sole structure having a fluid-filled chamber including a tensile member is provided. The fluid-filled chamber includes a first barrier sheet, a second barrier sheet and the tensile member. The first barrier sheet is formed from a first thermoplastic material. The second barrier sheet is attached to the first barrier sheet and is formed from a second thermoplastic material. The first barrier sheet and the second barrier sheet cooperate to define an internal cavity. The tensile member is disposed within the internal cavity and is formed from a third thermoplastic material. A first weld attaches the first barrier sheet, the second barrier sheet, and the tensile member together by melding the first thermoplastic material of the first barrier sheet, the second (Continued)

thermoplastic material of second barrier sheet, and the third thermoplastic material of the tensile member.

20 Claims, 46 Drawing Sheets

Related U.S. Application Data

(60) Provisional application No. 62/621,378, filed on Jan. 24, 2018, provisional application No. 62/470,019, filed on Mar. 10, 2017.

(51) Int. Cl.
| | |
|---|---|
| *B32B 37/18* | (2006.01) |
| *A43B 13/12* | (2006.01) |
| *B32B 7/04* | (2019.01) |
| *B32B 27/08* | (2006.01) |
| *B32B 3/14* | (2006.01) |
| *A43B 21/28* | (2006.01) |
| *A43B 13/14* | (2006.01) |
| *B29D 35/14* | (2010.01) |
| *A43B 1/00* | (2006.01) |
| *A43D 25/20* | (2006.01) |

(52) U.S. Cl.
CPC .......... *A43B 13/185* (2013.01); *A43B 13/20* (2013.01); *A43B 21/28* (2013.01); *B29D 35/142* (2013.01); *B32B 3/14* (2013.01); *B32B 7/04* (2013.01); *B32B 27/08* (2013.01); *B32B 37/185* (2013.01); *A43B 1/0009* (2013.01); *A43D 25/20* (2013.01); *B32B 2437/02* (2013.01)

(58) Field of Classification Search
CPC ... A43B 13/185; A43B 1/0009; B32B 37/185; B32B 7/04; B32B 27/08; B32B 3/14; B32B 2437/02; B29D 35/142; A43D 25/20
See application file for complete search history.

(56) References Cited

U.S. PATENT DOCUMENTS

| | | |
|---|---|---|
| 5,042,176 A | 8/1991 | Rudy |
| 6,119,371 A | 9/2000 | Goodwin et al. |
| 7,070,845 B2 | 7/2006 | Thomas et al. |
| 8,667,710 B2 | 3/2014 | Kokstis et al. |
| 2011/0277347 A1 | 11/2011 | Monfils et al. |

FOREIGN PATENT DOCUMENTS

| | | |
|---|---|---|
| WO | 2016172169 | 10/2016 |
| WO | WO-2016172169 A1 | 10/2016 |

OTHER PUBLICATIONS

European Patent Office (IPEA), International Preliminary Report on Patentability for International Application No. PCT/US2018/021738, dated May 29, 2019.

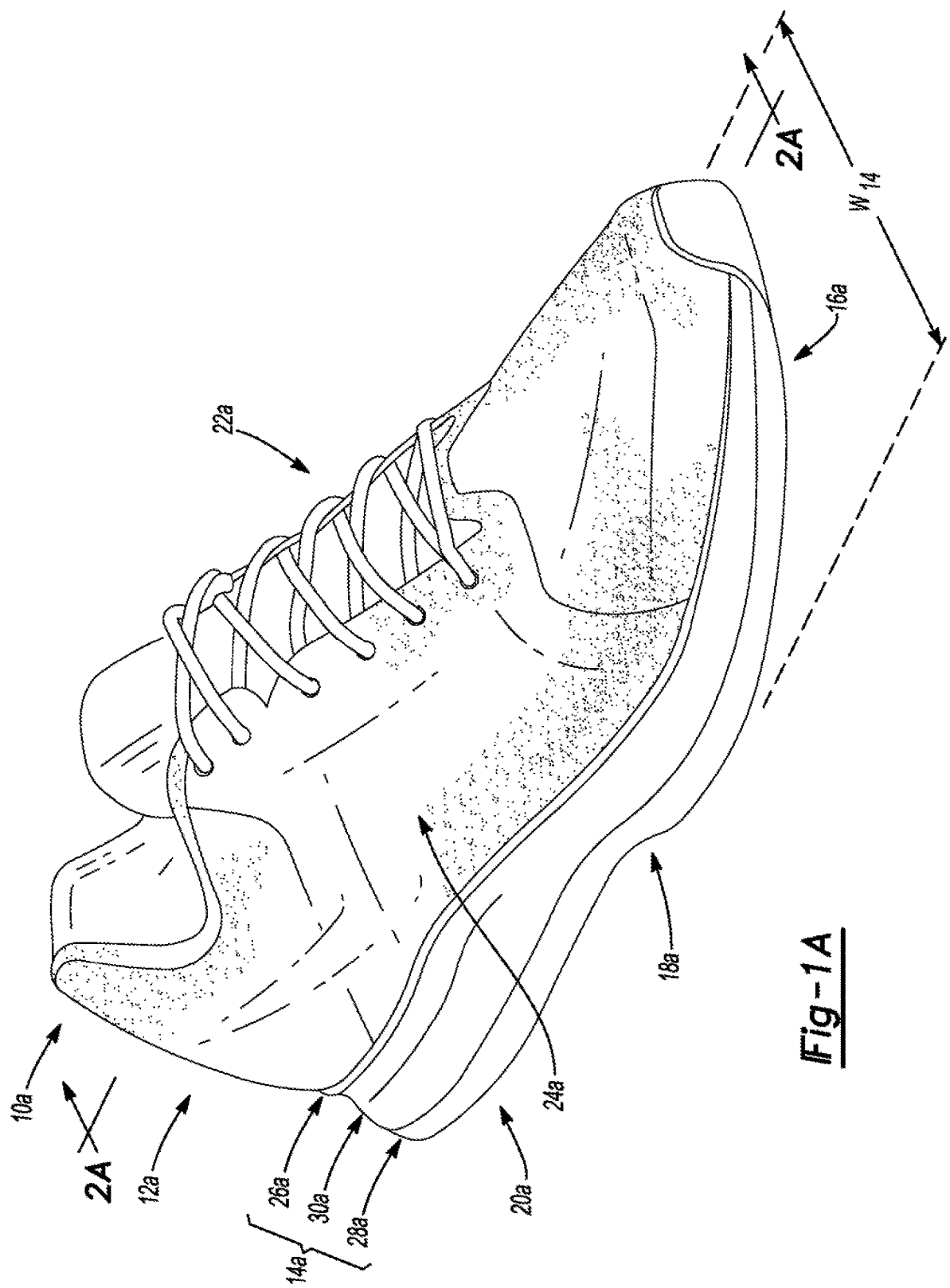

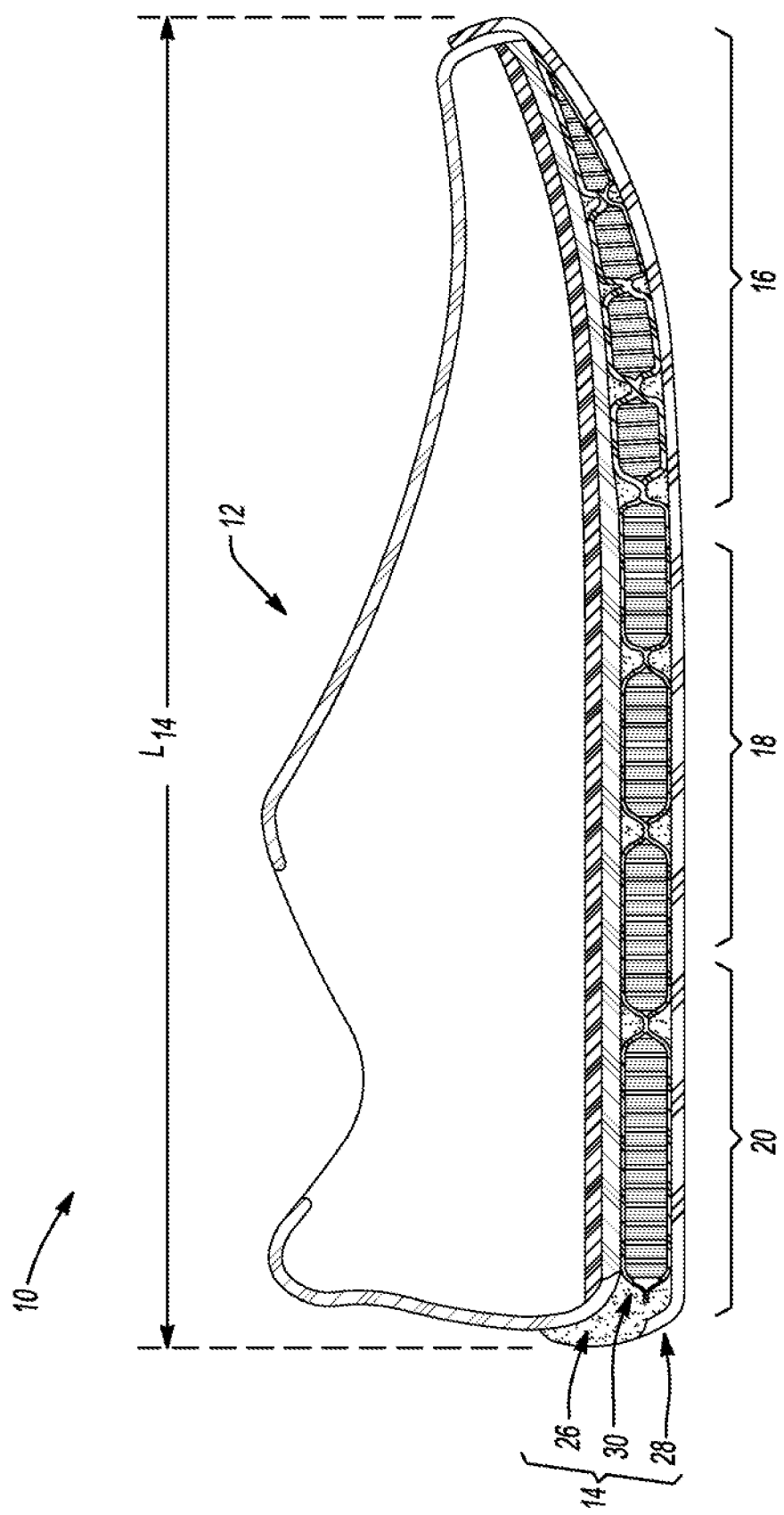

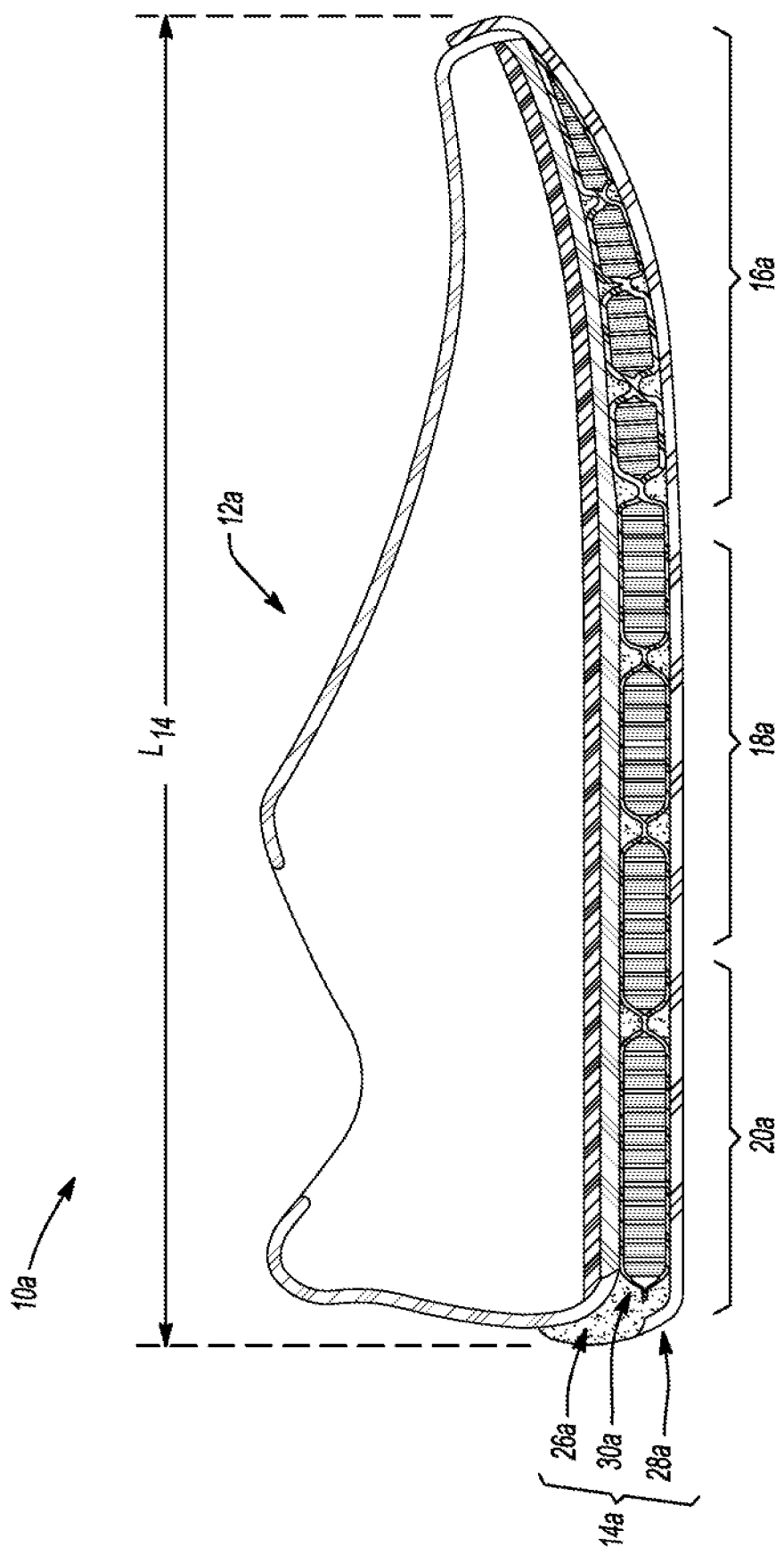

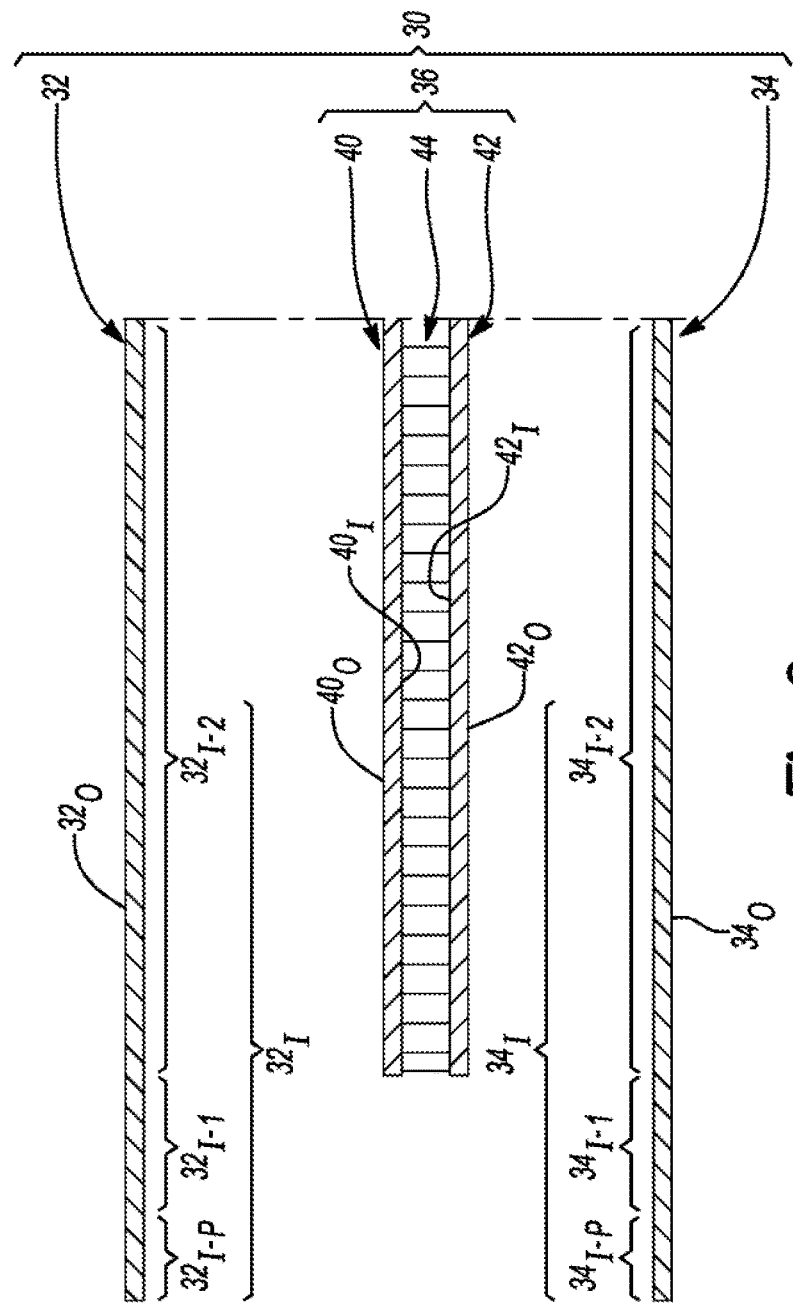
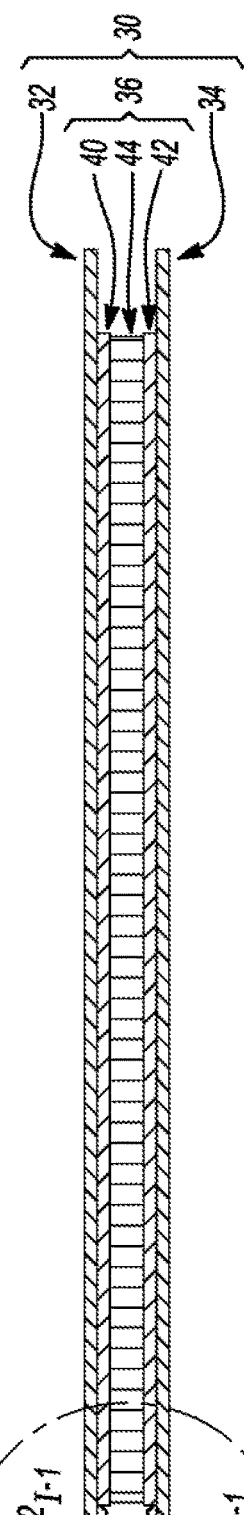

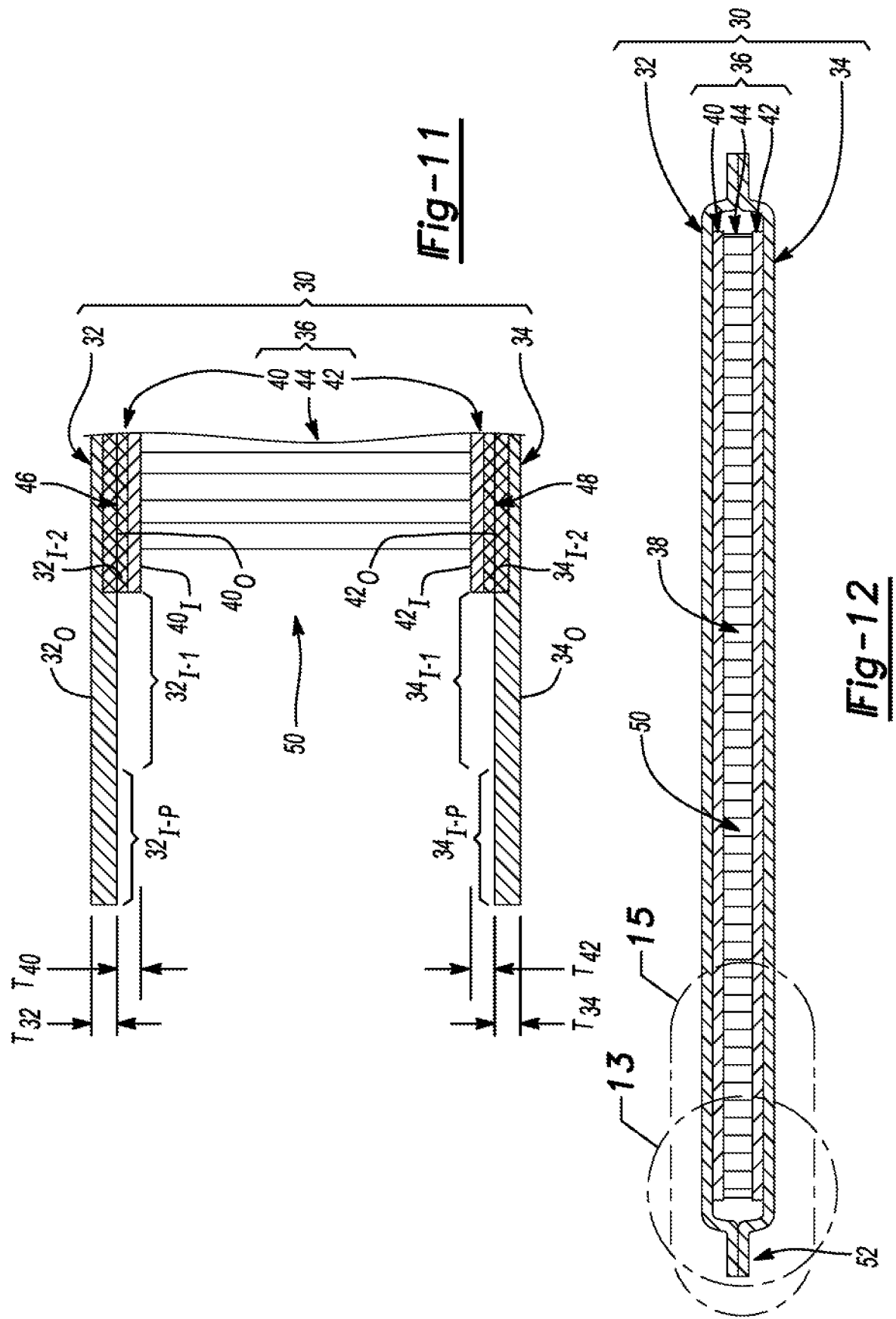

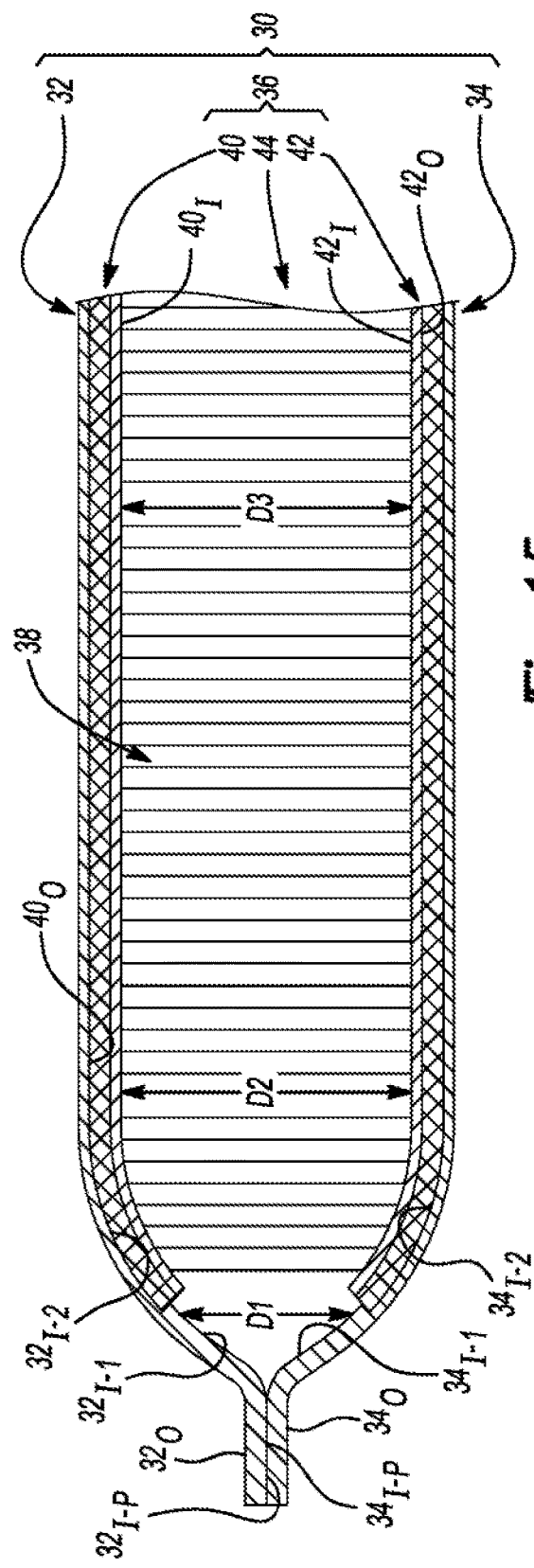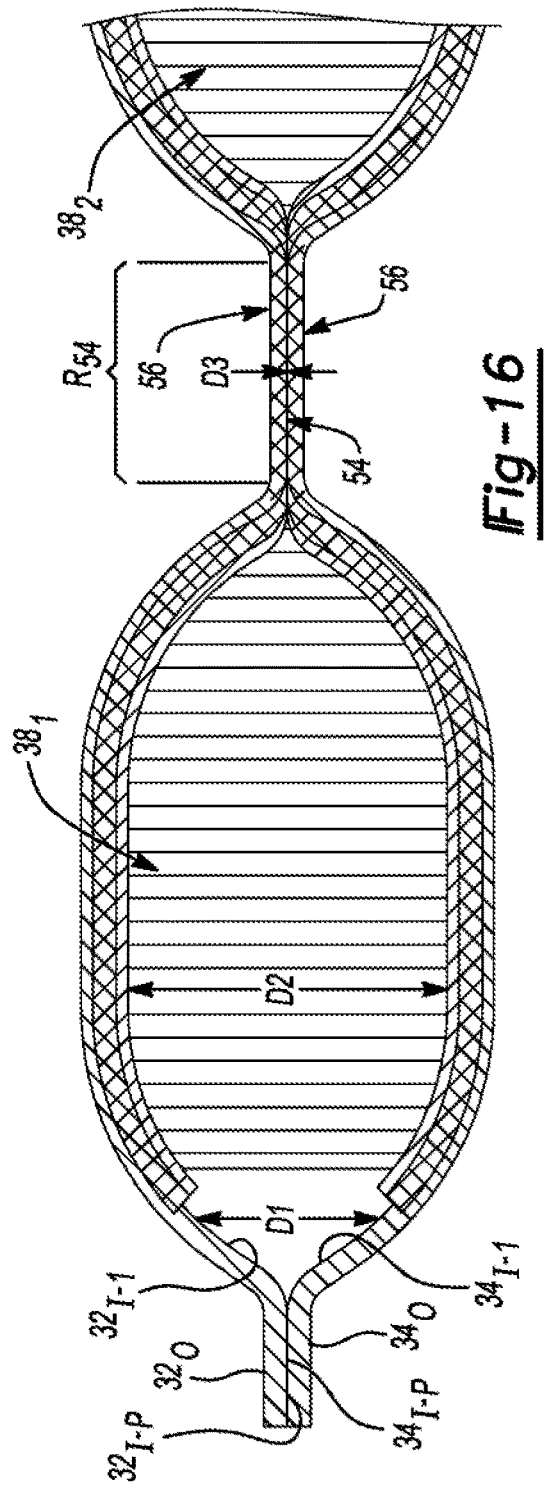

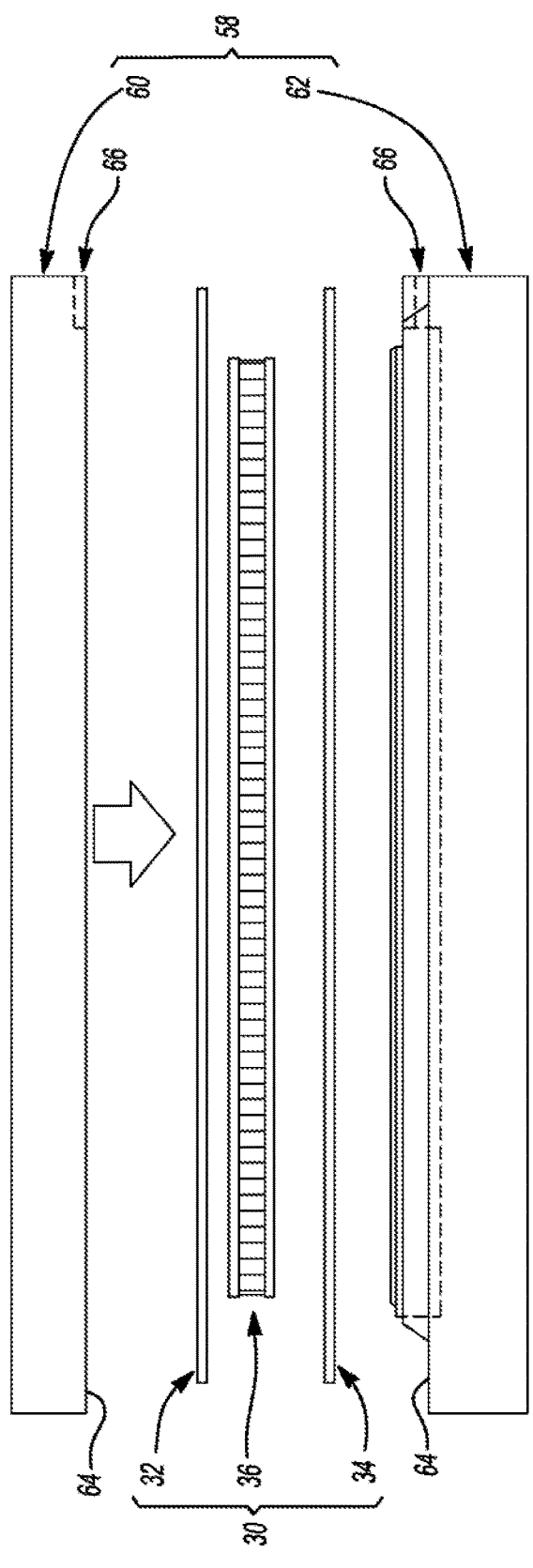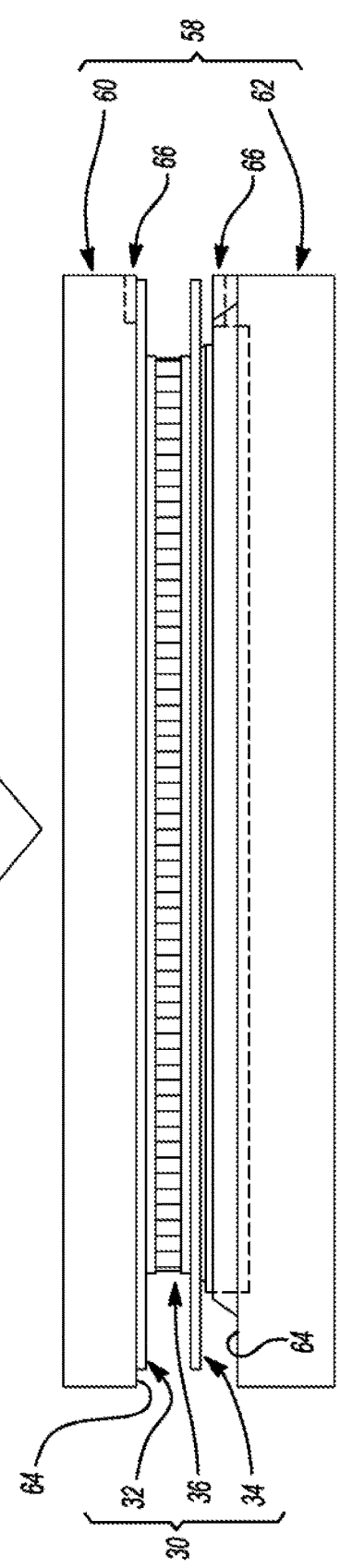

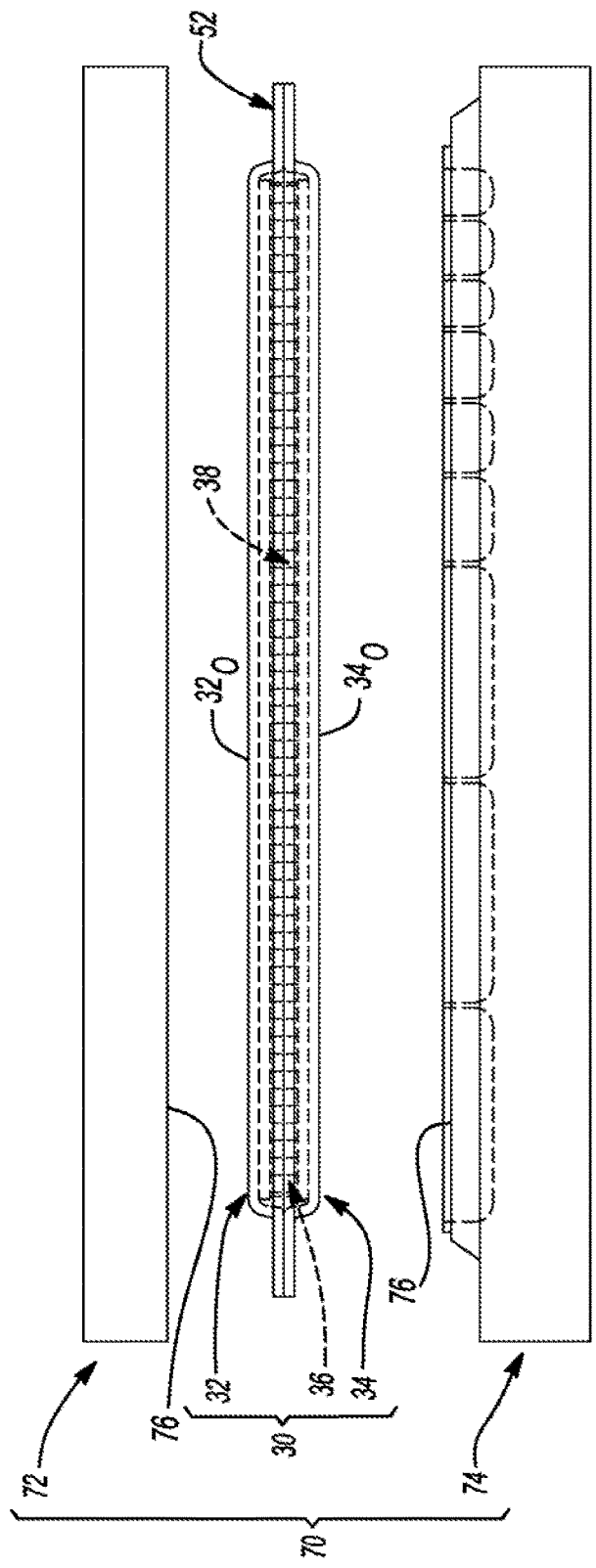
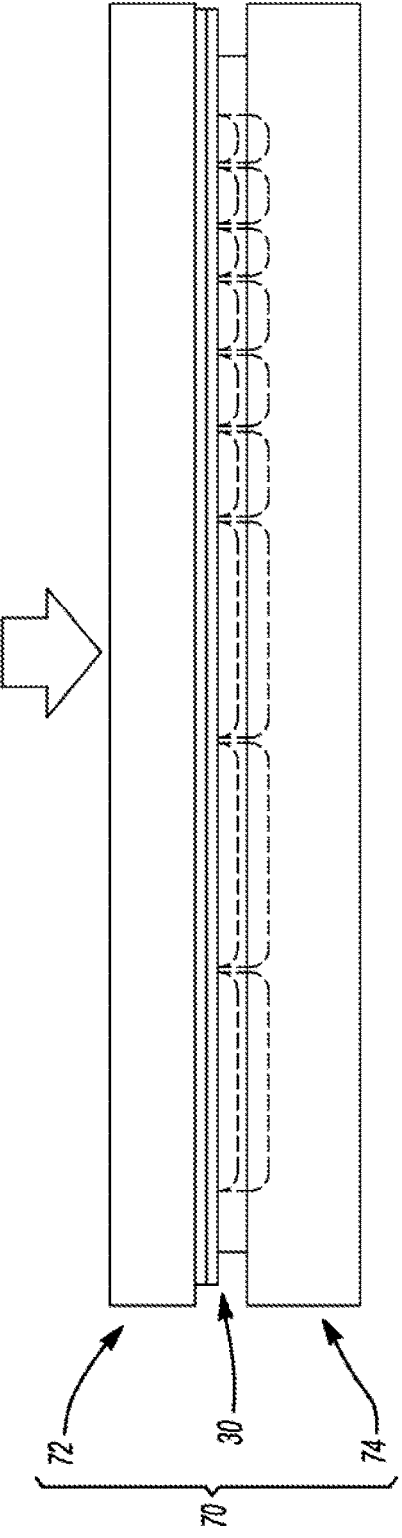

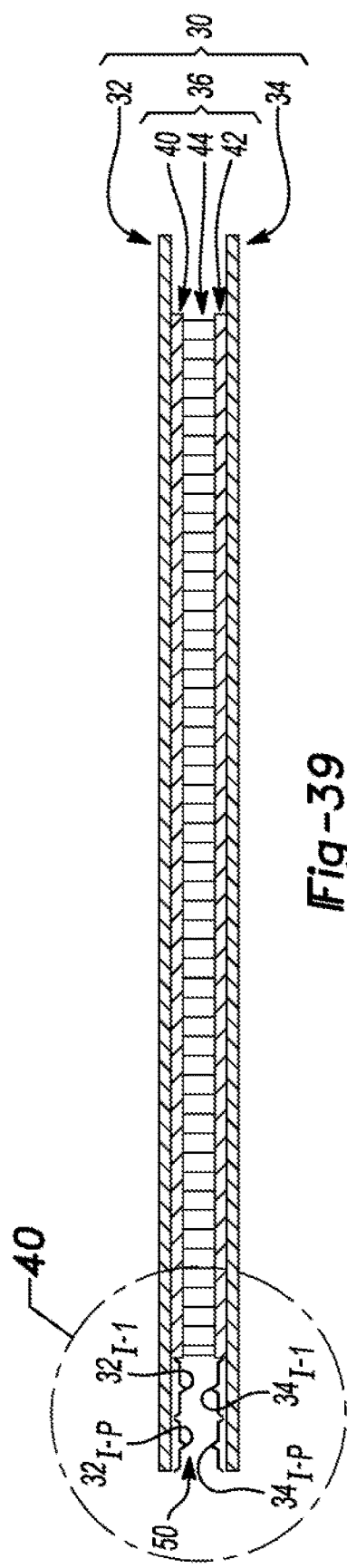
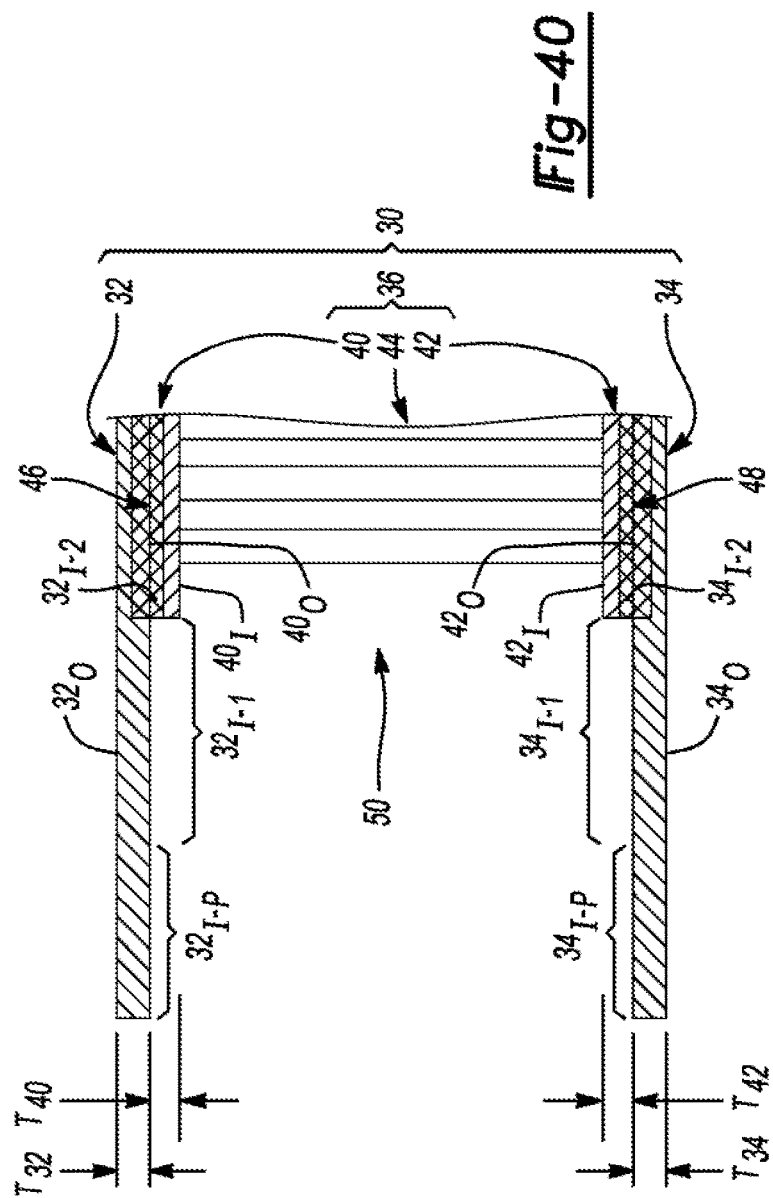

FOOTWEAR SOLE STRUCTURE HAVING A FLUID-FILLED CHAMBER INCLUDING A TENSILE MEMBER

CROSS REFERENCE TO RELATED APPLICATIONS

This application is a Divisional application of U.S. Non-Provisional Application No. 15/915,816, filed Mar. 8, 2018, which claims priority under 35 U.S.C. § 119(e) to U.S. Provisional Application No. 62/470,019, filed Mar. 10, 2017 and to U.S. Provisional Application No. 62/621,378, filed on Jan. 24, 2018. The disclosures of these prior applications are considered part of the disclosure of this application and are hereby incorporated by reference in their entireties.

FIELD

The present disclosure relates generally to articles of footwear and more particularly to a sole structure for an article of footwear.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a stacked arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. While existing sole structures perform adequately for their intended purpose, improvements to sole structures are continuously being sought in order to advance the arts.

DESCRIPTION OF THE DRAWINGS

The drawings described herein are for illustrative purposes only of selected embodiments and not all possible implementations, and are not intended to limit the scope of the present disclosure.

FIG. 2 is a cross-sectional view of the article of footwear of FIG. 1 taken along Line 2-2 of FIG. 1;

FIG. 1A is a perspective view of an article of footwear incorporating a sole structure in accordance with the principles of the present disclosure;

FIG. 2A is a cross-sectional view of the article of footwear of FIG. 1A taken along Line 2A-2A of FIG. 1A;

FIG. 9 is a cross-sectional view of the cushioning arrangement of FIG. 8 taken along Line 9-9 of FIG. 8;

FIG. 10 is a cross-sectional view of the cushioning arrangement of FIG. 9 arranged in a partially assembled state;

FIG. 11 is an enlarged cross-sectional view of a portion of the cushioning arrangement of FIG. 10 identified by Line 11 of FIG. 10;

FIG. 12 is a cross-sectional view of the cushioning arrangement of FIG. 10 arranged in a further partially assembled state and taken along Line 12-12 of FIG. 14;

FIG. 15 is an enlarged cross-sectional view of a portion of the cushioning arrangement of FIG. 12 identified by Line 15 of FIG. 12;

FIG. 16 is a cross-sectional view of a portion of the cushioning arrangement of FIG. 15 arranged in a further assembled state and taken along Line 16-16 of FIG. 17;

FIG. 19 is a side view of the first mold tool arranged in the open configuration and the cushioning arrangement of FIG. 18;

FIG. 20 is a side view of the first mold tool of FIG. 19 arranged in a partially closed configuration and the cushioning arrangement of FIG. 19;

FIG. 25 is a side view of the second mold tool arranged in the open configuration and the cushioning arrangement of FIG. 14;

FIG. 26 is a side view of the second mold tool of FIG. 25 arranged in a closed configuration and the cushioning arrangement of FIG. 25;

FIG. 39 is a cross-sectional view of the cushioning arrangement of FIG. 38 arranged in a partially assembled state;

FIG. 40 is an enlarged cross-sectional view of a portion of the cushioning arrangement of FIG. 39 identified by Line 40 of FIG. 39;

Corresponding reference numerals indicate corresponding parts throughout the several views of the drawings.

DETAILED DESCRIPTION

Figure 1:
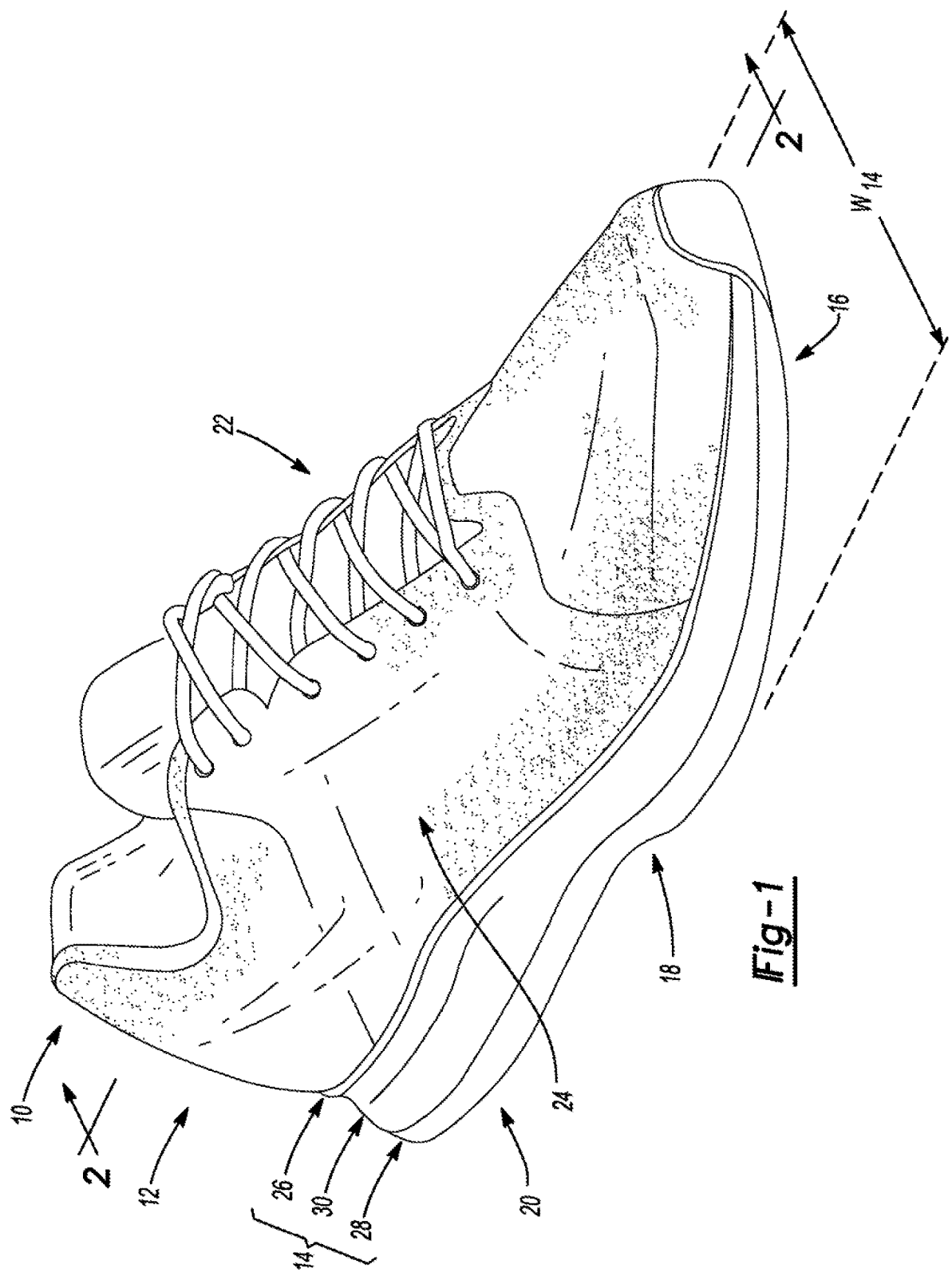
FIG. 1 is a perspective view of an article of footwear incorporating a sole structure in accordance with the principles of the present disclosure.
Figure 1B:
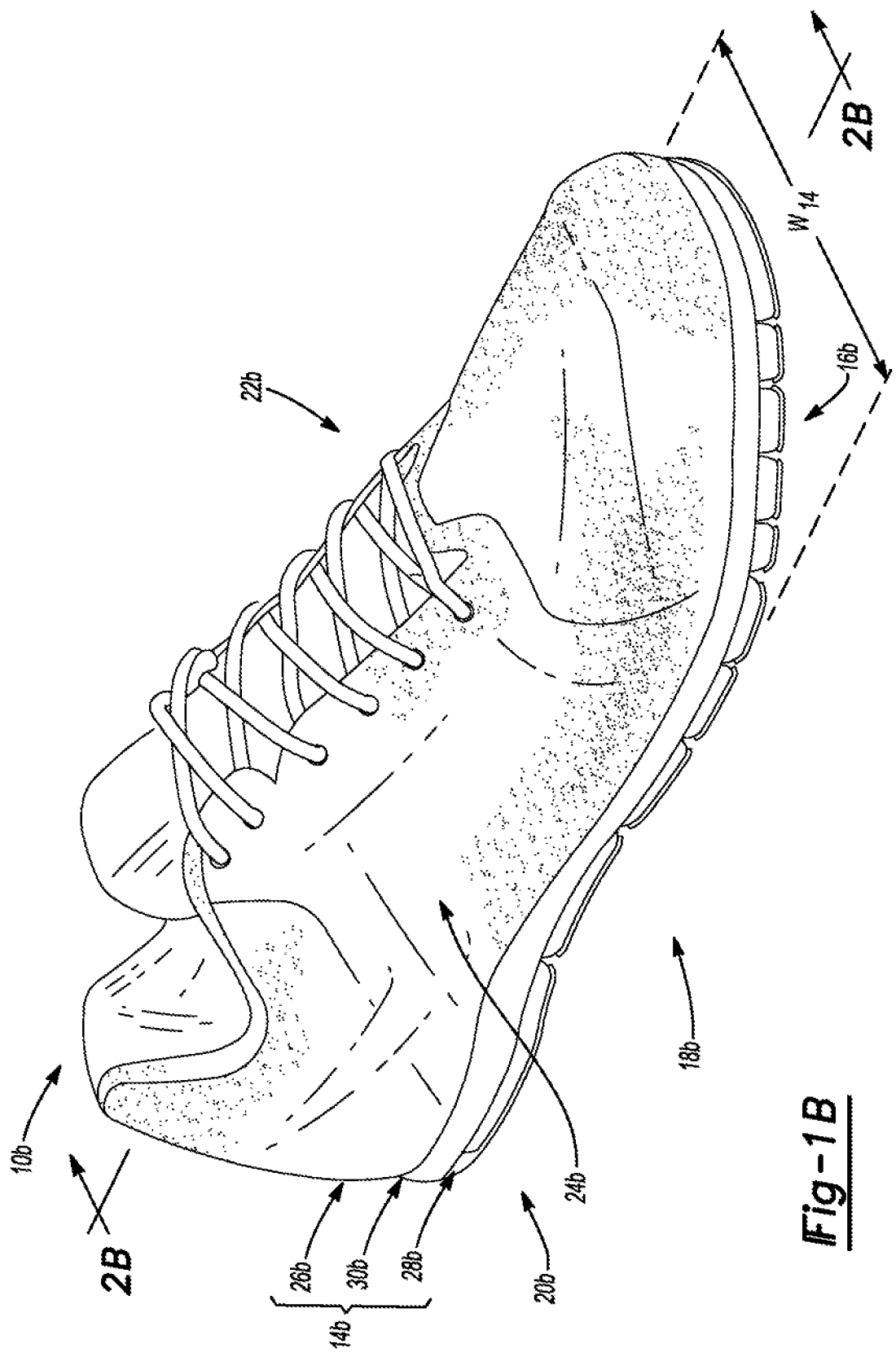
FIG. 1B is a perspective view of an article of footwear incorporating a sole structure in accordance with the principles of the present disclosure.

The present disclosure is directed to a fluid-filled chamber including a tensile member. The fluid-filled chamber includes a first barrier sheet, a second barrier sheet, and the tensile member. The first barrier sheet is formed from a first thermoplastic material, the second barrier sheet is formed from a second thermoplastic material, and the tensile member is formed from a third thermoplastic material. The second barrier sheet is attached to the first barrier sheet and the first barrier sheet and the second barrier sheet cooperate to define an internal cavity. The tensile member is disposed within the internal cavity. A first weld attaches the first barrier sheet, the second barrier sheet, and the tensile member together by melding the first thermoplastic material of the first barrier sheet, the second thermoplastic material of second barrier sheet, and the third thermoplastic material of the tensile member. The fluid-filled chamber can be used in footwear as a cushioning element, such as, for example, as a sole structure or a component of a sole structure or as a heel counter. The fluid-filled chamber can also be used as a cushioning element in apparel. The fluid-filled chamber can also be used in sporting equipment as a cushioning element, such as, for example, in the straps of a backpack. The present disclosure is also directed to methods of forming the fluid-filled chambers as described herein, as well as methods of manufacturing footwear, apparel, or sports equipment comprising incorporating the fluid-filled chamber into such articles.

The melding of the first thermoplastic material, the second thermoplastic material, and the third thermoplastic material can be produced by softening all three thermoplastic materials, thereby allowing all three thermoplastic materials to co-mingle at least partially at the location of the first weld and then re-solidify. In so doing, the barrier sheets and the tensile member are no longer separate components at the location of the first weld. Use of such melded first welds allows fluid-filled chambers with new configurations to be made. For example, use of such melded first welds allows for the design and production of fluid-filled chambers that are more flexible and/or that have a greater degree of curvature as compared to fluid-filled chambers without such melded welds.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of moded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or sheet is referred to as being "on," "engaged to," "connected to," or "coupled to" another element or sheet, it may be directly on, engaged, connected or coupled to the other element or sheet, or intervening elements or sheets may be present. In contrast, when an element is referred to as being "directly on," "directly engaged to," "directly connected to," or "directly coupled to" another element or sheet, there may be no intervening elements or sheets present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, sheets and/or sections, these elements, components, regions, sheets and/or sections should not be limited by these terms. These terms may be only used to distinguish one element, component, region, sheet or section from another region, sheet or section. Terms such as "first," "second," and other numerical terms when used herein do not imply a sequence or order unless clearly indicated by the context. Thus, a first element, component, region, sheet or section discussed below could be termed a second element, component, region, sheet or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a fluid-filled chamber is provided. The fluid-filled chamber includes a first barrier sheet, a second barrier sheet, and a tensile member. The first barrier sheet is formed from a first thermoplastic material. The second barrier sheet is attached to the first barrier sheet and is formed from a second thermoplastic material. The first barrier sheet and the second barrier sheet cooperate to define an internal cavity. The tensile member is disposed within the internal cavity and is formed from a third thermoplastic material. A first weld attaches the first barrier sheet, the second barrier sheet, and the tensile member together by melding the first thermoplastic material of the first barrier sheet, the second thermoplastic material of second barrier sheet, and the third thermoplastic material of the tensile member.

The first barrier sheet comprises the first thermoplastic material. The first thermoplastic material comprises one or more polymers such as, for example, one or more thermoplastic polyurethane (TPU) polymers. In some implementations, the first barrier sheet can be a layered film formed of multiple layers of thermoplastic materials. The multiple layers can be formed of multiple thermoplastic materials including the first thermoplastic material. In such examples, the melting point(s) of the multiple thermoplastic materials is less than, or approximately the same as, the melting point of the first thermoplastic material. In one example, the first barrier sheet can comprise layers of the first thermoplastic material with a different thermoplastic material. The first thermoplastic material can comprise one or more TPU polymers, and the different thermoplastic materials can comprise one or more ethylene-vinyl alcohol (EVOH) polymers. In a particular example, when the first barrier sheet comprises multiple layers of thermoplastic materials including one or more layers of the first thermoplastic material, a polymeric component of the first thermoplastic material can consist essentially of one or more TPU polymers. Similarly, the second barrier sheet comprises the second thermoplastic material. The second thermoplastic material comprises one or more polymers such as, for example, one or more thermoplastic polyurethane (TPU) polymers. In some implementations, the second barrier sheet can be a layered film formed of multiple layers of thermoplastic materials. The multiple layers can be formed of multiple thermoplastic materials including the second thermoplastic material. In such examples, the melting point(s) of the multiple thermoplastic materials is less than, or approximately the same as, the melting point of the second thermoplastic material. In one example, the second barrier sheet can comprise layers of the second thermoplastic material with a different thermoplastic material. The second thermoplastic material can comprise one or more TPU polymers, and the different thermoplastic materials can comprise one or more ethylene-vinyl alcohol (EVOH) polymers. In a particular example, when the second barrier sheet comprises multiple layers of thermoplastic materials including one or more layers of the second thermoplastic material, a polymeric component of the second thermoplastic material can consist essentially of one or more TPU polymers.

In one configuration, a second weld extends continuously around a perimeter of the fluid-filled chamber to define an outer edge of the fluid-filled chamber. The second weld may join the first barrier sheet and the second barrier sheet and, further, may be spaced apart from the first weld. Alternatively, the first weld may contact and extend from the second weld.

In some implementations, the third thermoplastic material of the tensile member is foamed and, further, may be formed from a sheet of foamed thermoplastic material.

The tensile member may include a plurality of tensile elements extending between the first barrier sheet and the second barrier sheet. The plurality of tensile elements may extend between and connect a first tensile layer that opposes the first barrier sheet and a second tensile layer that opposes the second barrier sheet. In other examples, the first tensile layer may be attached to the first barrier sheet and the second tensile layer may be attached to the second barrier sheet.

In one configuration, the tensile member comprises a textile. The fibers or yarns from which the textile is formed can themselves be formed of the third thermoplastic material. For example, substantially all of the fibers and/or yarns forming the textile can consist essentially of the third thermoplastic material. Alternatively, substantially all of the fibers and/or yarns forming the textile can be formed of one or more thermoplastic materials each having a melting point within a range of about 20° C. or about 10° C. or about 5° C. of the melting points of the first thermoplastic material and the second thermoplastic material of the first barrier sheet and the second barrier sheet. In another example, substantially all of the fibers and/or yarns forming the textile can be formed of one or more thermoplastic materials each having a melting point less than the melting points of the first thermoplastic material and the second thermoplastic material, or less than about 10° C. or about 5° C. greater than the melting points of the first thermoplastic material and the second thermoplastic material.

The textile may be a knit textile. The knit textile may include a first tensile layer, a second tensile layer, and tensile strands extending between and connecting the first tensile layer and the second tensile layer. For example, the knit textile can be a warp knit spacer fabric formed of one or more yarns. Each of the one or more yarns can be formed of the third thermoplastic material, or can be formed of a thermoplastic material having a melting point within a range of about 20° C. or of about 10° C. or of about 5° C. of the melting points of the first thermoplastic material and the second thermoplastic material of the first barrier sheet and the second barrier sheet. In a particular example, each of the one or more yarns can be formed of a thermoplastic material comprising one or more thermoplastic polyurethane (TPU) polymers. The first tensile layer may oppose the first barrier sheet and the second tensile layer may oppose the second barrier sheet. The first tensile layer may be attached to the first barrier sheet and the second tensile layer may be attached to the second barrier sheet.

In some implementations, the internal cavity receives a pressurized fluid. In an example, the pressurized fluid is air.

The first thermoplastic material, the second thermoplastic material, and the third thermoplastic material can comprise one or more thermoplastic polyurethane (TPU) polymers. In an example, a melting temperature of the first thermoplastic material, a melting temperature of the second thermoplastic material, and a melting temperature of the third thermoplastic material are all within a range of approximately 20° C., or are all within a range of approximately 10° C., or are all within a range of approximately 5° C. In other examples, a melting temperature of the first thermoplastic material, a melting temperature of the second thermoplastic material, and a melting temperature of the third thermoplastic material are approximately the same. In yet other examples, at least two of the first thermoplastic material, the second thermoplastic material, and the third thermoplastic material are formed from the same material.

In some configurations, an article of footwear incorporates the fluid-filled chamber. In other configurations, an article of equipment may include the fluid-filled chamber.

With reference to the figures, a method of making a fluid-filled chamber is provided. The method includes receiving a first barrier sheet formed from a first thermoplastic material, receiving a second barrier sheet formed from a second thermoplastic material, and receiving a tensile member formed from a third thermoplastic material. The tensile member is positioned between the first barrier sheet and the second barrier sheet. The first barrier sheet, the second barrier sheet, and the tensile member are welded together at a first weld by melding the first thermoplastic material of the first barrier sheet, the second thermoplastic material of second barrier sheet, and the third thermoplastic material of the tensile member.

In some examples, the method may include forming a second weld that extends continuously around a perimeter of the fluid-filled chamber to define an outer edge of the fluid-filled chamber. The second weld may extend continuously around a perimeter of the fluid-filled chamber and may join the first barrier sheet and the second barrier sheet. Welding the first barrier sheet, the second barrier sheet, and the tensile member together at the first weld may include spacing the first weld apart from the second weld. Alternatively, welding the first barrier sheet, the second barrier sheet, and the tensile member together at the first weld may include contacting the first weld with the second weld such that the first weld extends from the second weld.

In some instances, forming the tensile member from the third thermoplastic material includes forming the tensile member from a foamed thermoplastic material and, further, may include forming the tensile member from a sheet of foamed thermoplastic material. Forming the tensile member from the third thermoplastic material may include providing the tensile member with a plurality of tensile elements extending between the first barrier sheet and the second barrier sheet. Providing the tensile member with a plurality of tensile elements may include extending the plurality of tensile elements between a first tensile layer that opposes the first barrier sheet and a second tensile layer that opposes the second barrier sheet, the plurality of tensile elements connecting the first tensile layer and the second tensile layer. The method may additionally include attaching the first tensile layer to the first barrier sheet and attaching the second tensile layer to the second barrier sheet.

In some implementations, forming the tensile member from the third thermoplastic material may include forming the tensile member from a textile such as, for example, a knit textile. Forming the tensile member from a knit textile may include forming the knit textile to include a first tensile layer, a second tensile layer, and tensile strands that extend between and connect the first tensile layer and the second tensile layer. The method may include positioning the tensile member such that the first tensile layer opposes the first barrier sheet and the second tensile layer opposes the second barrier sheet. The method may also include attaching the first tensile layer to the first barrier sheet and attaching the second tensile layer to the second barrier sheet.

In some examples, the method includes providing an internal cavity of the fluid-filled chamber with a pressurized fluid. Providing the internal cavity with a pressurized fluid may include providing the internal cavity with pressurized air.

In some instances, forming the first barrier sheet from a first thermoplastic material, forming the second barrier sheet from a second thermoplastic material, and forming the tensile member from a third thermoplastic material includes forming the first barrier sheet, the second barrier sheet, and the tensile member from one or more thermoplastic polyurethane (TPU) polymers. In other instances, forming the first barrier sheet from a first thermoplastic material, forming the second barrier sheet from a second thermoplastic material, and forming the tensile member from a third thermoplastic material includes forming the first barrier sheet, the second barrier sheet, and the tensile member from materials having melting temperatures that are all within a range of approximately 20° C. In yet other instances, forming the first barrier sheet from a first thermoplastic material, forming the second barrier sheet from a second thermoplastic material, and forming the tensile member from a third thermoplastic material includes forming the first barrier sheet, the second barrier sheet, and the tensile member from materials having melting temperatures that are approximately the same. Forming the first barrier sheet from a first thermoplastic material, forming the second barrier sheet from a second thermoplastic material, and forming the tensile member from a third thermoplastic material may include forming at least two of the first barrier sheet, the second barrier sheet, and the tensile member from the same material.

In some implementations, the method may include incorporating the fluid-filled chamber into an article of footwear. In other implementations, the method may include incorporating the fluid-filled chamber into an article of equipment.

Figure 2B:
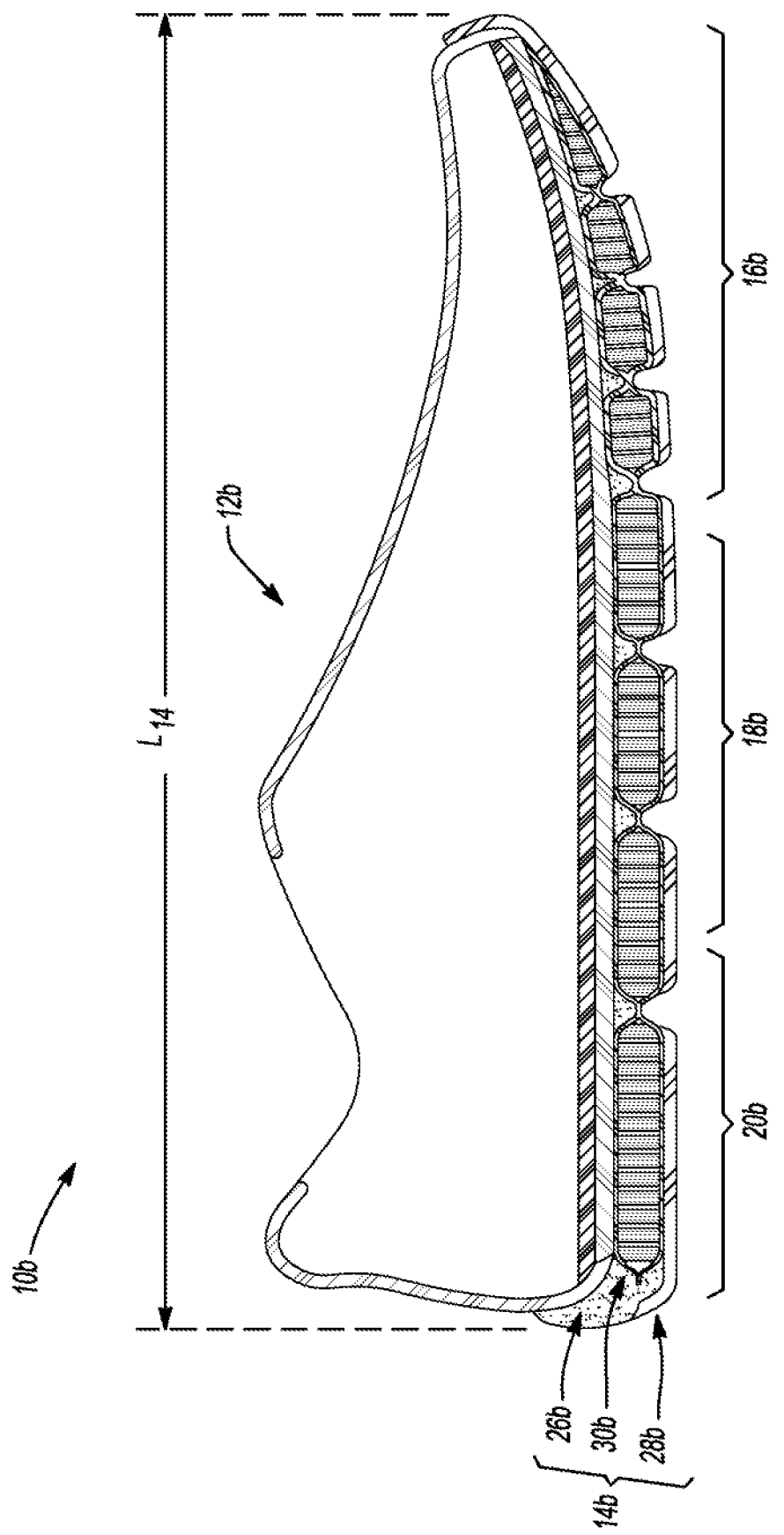
FIG. 2B is a cross-sectional view of the article of footwear of FIG. 1B taken along Line 2B-2B of FIG. 1B.
Figure 3:
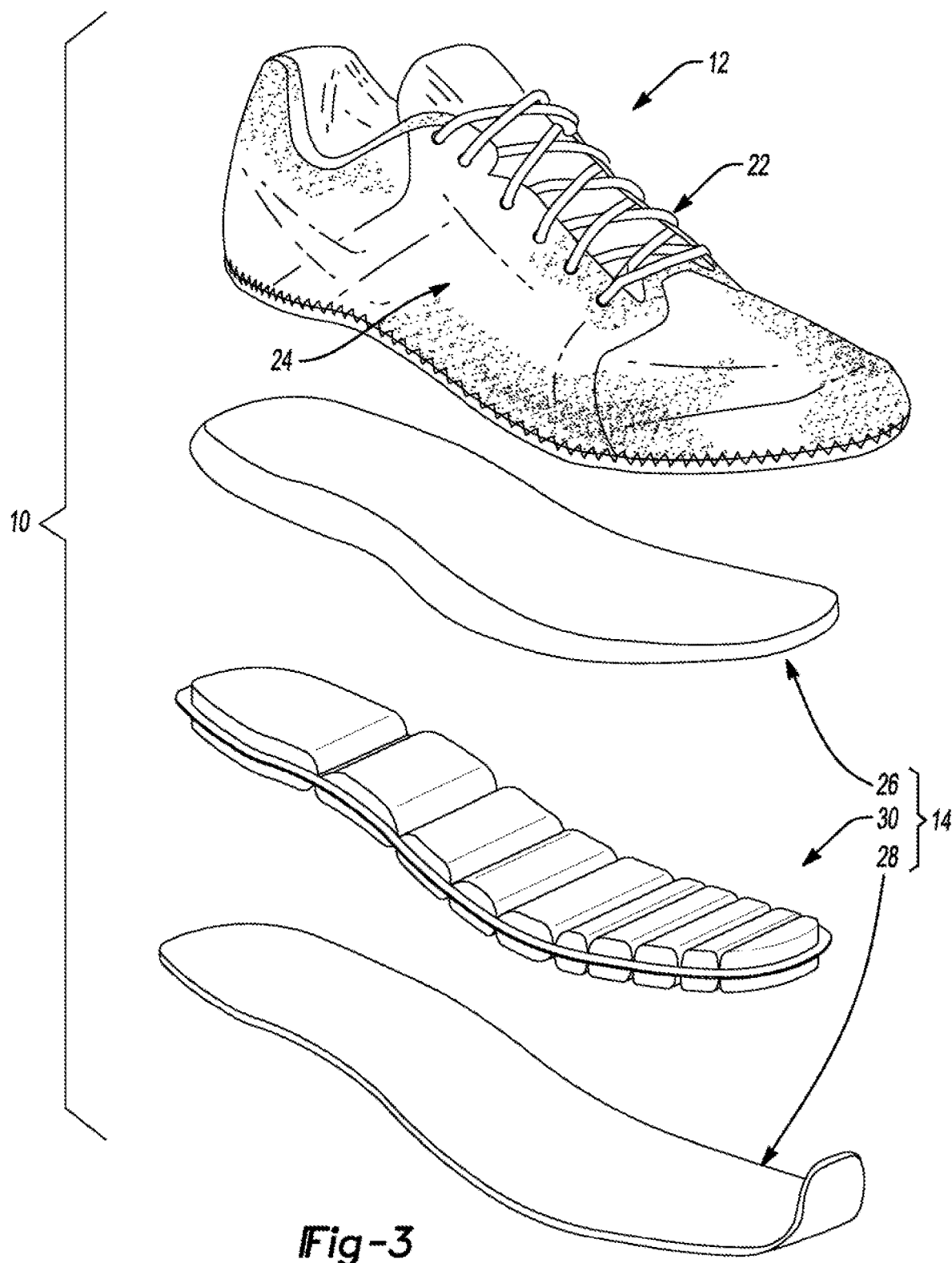
FIG. 3 is an exploded view of the article of footwear of FIG. 1.

With reference to FIGS. 1-3, an exemplary article of footwear 10 is provided and includes an upper 12 and a sole structure 14 attached to the upper 12. The article of footwear 10 may be divided into one or more regions. The regions may include a forefoot region 16, a midfoot region 18, and a heel region 20. The forefoot region 16 may correspond with toes and joints connecting metatarsal bones with phalanx bones of a foot. The midfoot region 18 may correspond with an arch area of the foot while the heel region 18 may correspond with rear portions of the foot, including a calcaneus bone. The article of footwear 10 may additionally include a medial side 22 and a lateral side 24 that correspond with opposite sides of the article of footwear 10 and extend through the regions 16, 18, and 20. The sole structure 14 may include a midsole 26, an outsole 28, and a cushioning arrangement 30. The cushioning arrangement 30 is disposed generally between the upper 12 and the outsole 28 and may be supported by the midsole 26, whereby a material of the midsole 26 is disposed between the cushioning arrangement 30 and the upper 12 and/or is disposed between the cushioning arrangement 30 and the outsole 28.

With reference to FIGS. 1A-3A, another exemplary article of footwear 10a is provided and includes an upper 12a and a sole structure 14a attached to the upper 12a. As with the article of footwear 10, the article of footwear 10a may be divided into one or more regions. The regions may include a forefoot region 16a, a midfoot region 18a, and a heel region 20a. The forefoot region 16a may correspond with toes and joints connecting metatarsal bones with phalanx bones of a foot. The midfoot region 18a may correspond with an arch area of the foot while the heel region 18a may correspond with rear portions of the foot, including a calcaneus bone. The article of footwear 10a may additionally include a medial side 22a and a lateral side 24a that correspond with opposite sides of the article of footwear 10a and extend through the regions 16a, 18a, and 20a. The sole structure 14a may include a midsole 26a, an outsole 28a, and a cushioning arrangement 30a. The cushioning arrangement 30a is disposed generally between the upper 12a and the outsole 28a and may be supported by the midsole 26a, whereby a material of the midsole 26a is disposed between the cushioning arrangement 30a and the upper 12a and/or is disposed between the cushioning arrangement 30a and the outsole 28a.

With reference to FIGS. 1B-3B, yet another exemplary article of footwear 10b is provided and includes an upper 12b and a sole structure 14b attached to the upper 12b. The article of footwear 10b may be divided into one or more regions. The regions may include a forefoot region 16b, a midfoot region 18b, and a heel region 20b. The forefoot region 16b may correspond with toes and joints connecting metatarsal bones with phalanx bones of a foot. The midfoot region 18b may correspond with an arch area of the foot while the heel region 18b may correspond with rear portions of the foot, including a calcaneus bone. The article of footwear 10b may additionally include a medial side 22b and a lateral side 24b that correspond with opposite sides of the article of footwear 10b and extend through the regions 16b, 18b, and 20b. The sole structure 14b may include a midsole 26b, an outsole 28b, and a cushioning arrangement 30b. The cushioning arrangement 30b is disposed generally between the upper 12b and the outsole 28b and may be supported by the midsole 26b, whereby a material of the midsole 26b is disposed between the cushioning arrangement 30b and the upper 12b and/or is disposed between the cushioning arrangement 30b and the outsole 28b.

Figure 3A:
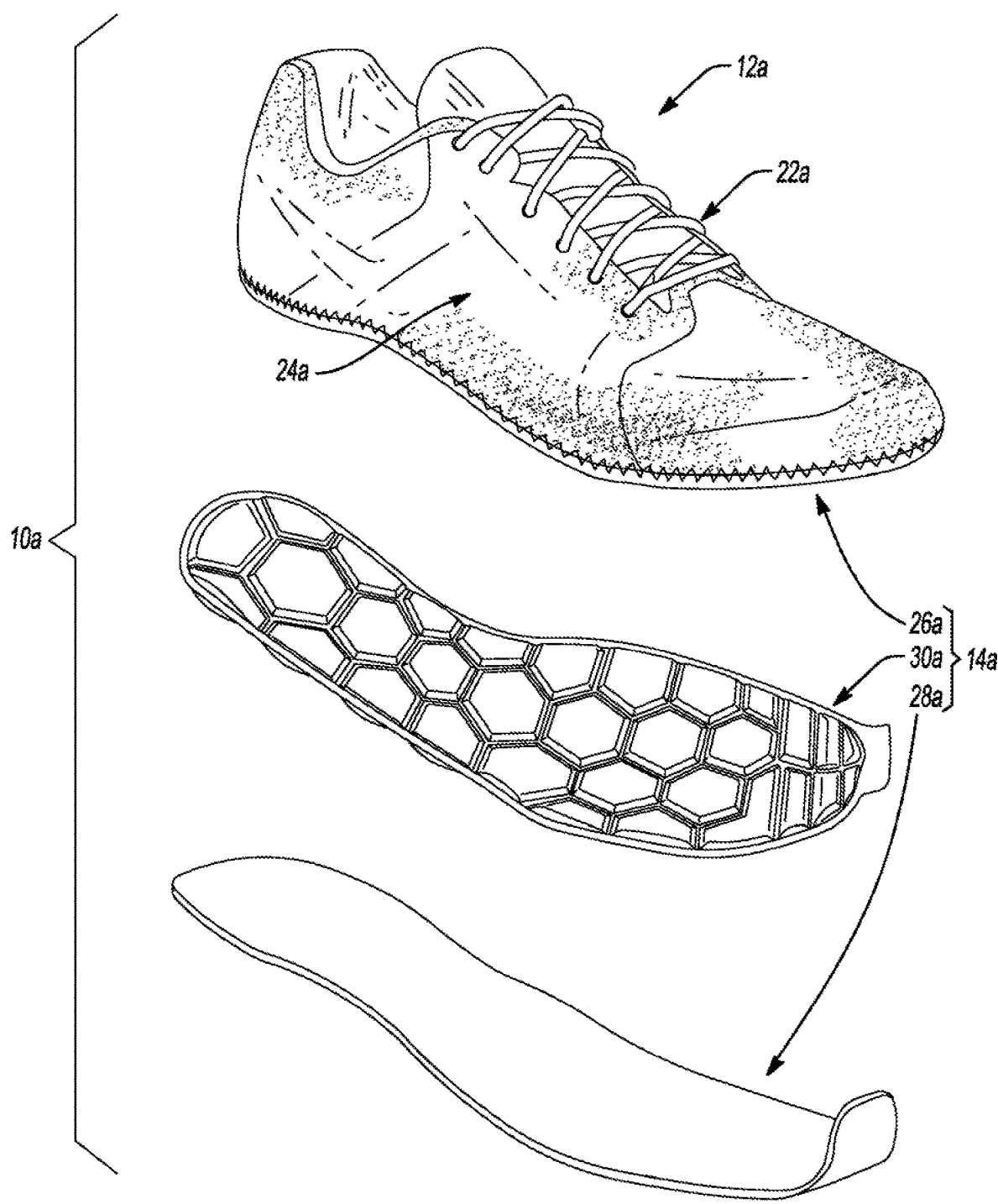
FIG. 3A is an exploded view of the article of footwear of FIG. 1A.
Figure 3B:
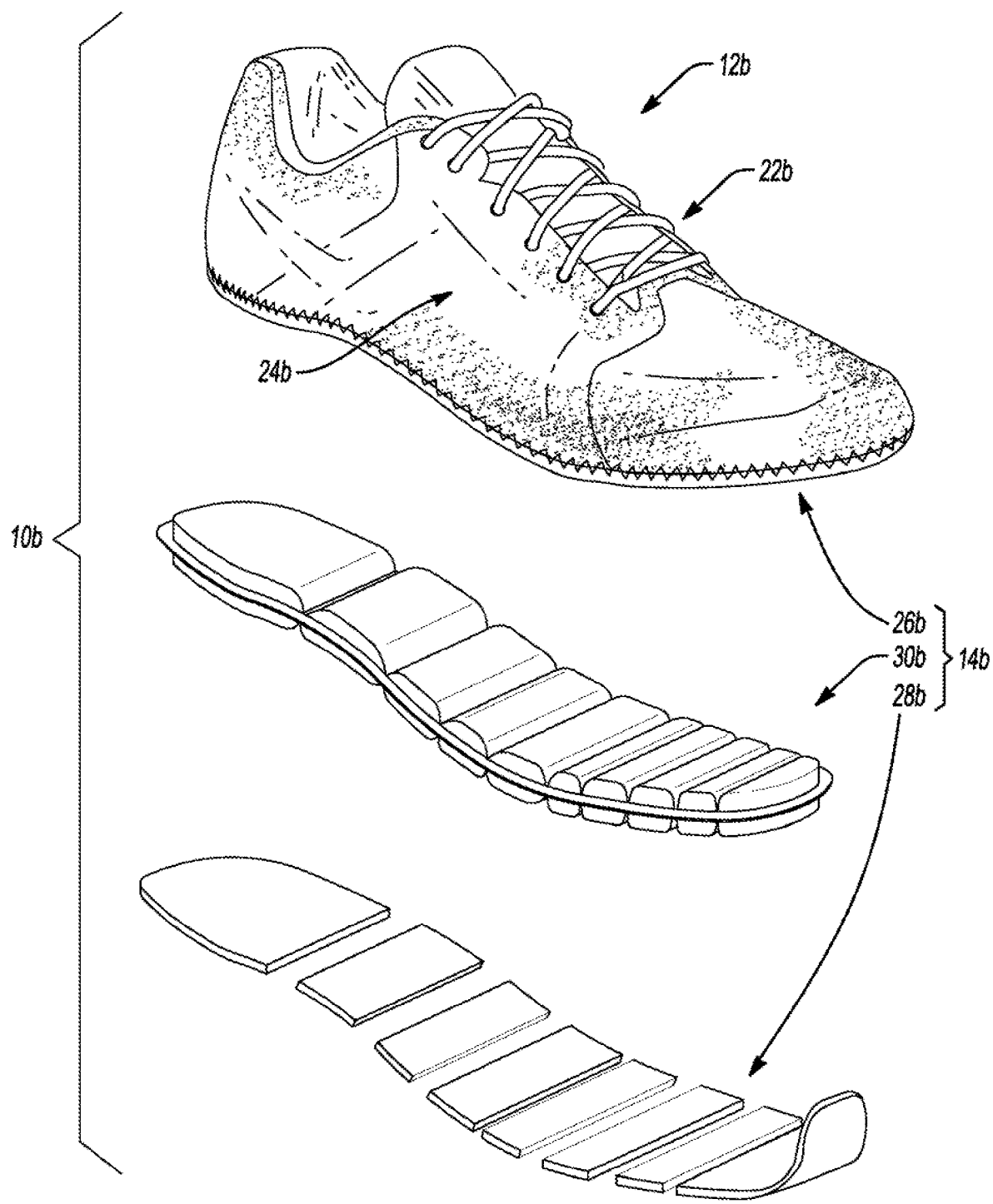
FIG. 3B is an exploded view of the article of footwear of FIG. 1B.

As shown in FIGS. 1-3 and 1A-3A, the outsole 28, 28a extends across substantially the entire width ($W_{14}$) and the length ($L_{14}$) of the sole structures 14, 14a. However, comparatively, as shown in FIGS. 1B-3B, although the outsole 28b extends across substantially the entire width ($W_{14}$) of the sole structure 14b, the outsole 28b is periodically interrupted along the length ($L_{14}$) of the sole structure 14. As such, the outsole 28b defines a plurality of pad portions that respectively correspond to a portion of an outer surface profile of the cushioning arrangement 30b, as shown in FIGS. 2B and 3B. Because the outsole 28b is periodically interrupted, the cushioning arrangement 30b is not obscured or covered by the outsole 28b in areas between adjacent pad portions of the outsole 28b and is visible at the outsole 28b in these areas.

With particular reference to FIGS. 4-7, various locations of the cushioning arrangement 30 relative to the midsole 26 are provided. While the location of the cushioning arrangement 30 relative to the midsole 26 will be described and shown with respect to FIGS. 4-7, it should be understood that the cushioning arrangements 30a, 30b could be located in the same locations as the cushioning arrangement 30 relative to the respective midsoles 26a, 26b.

Figure 4:
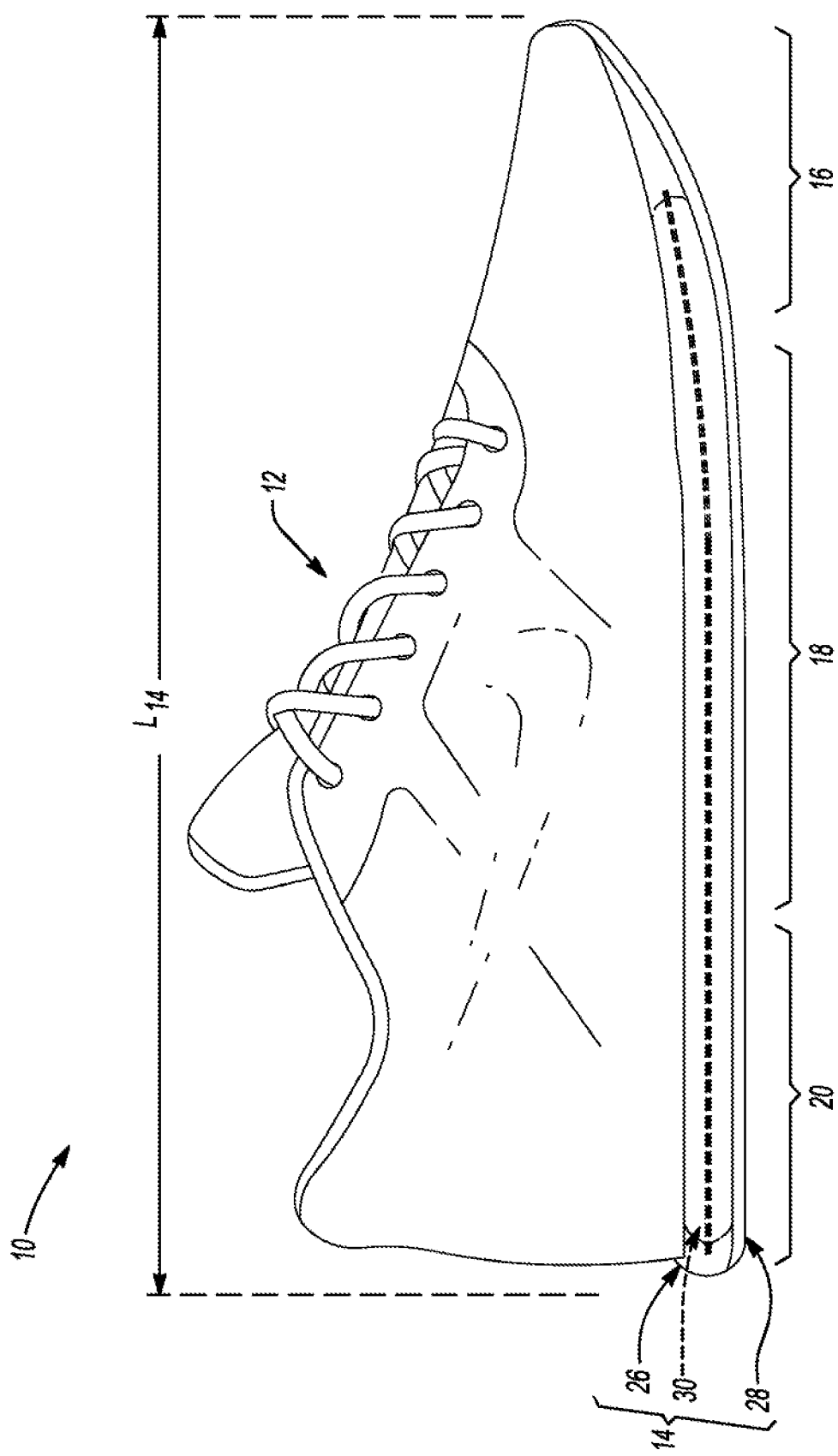
FIG. 4 is an exemplary side view of the article of footwear of any of FIGS. 1-3, FIGS. 1A-3A, or FIGS. 1B-3B.
Figure 5:
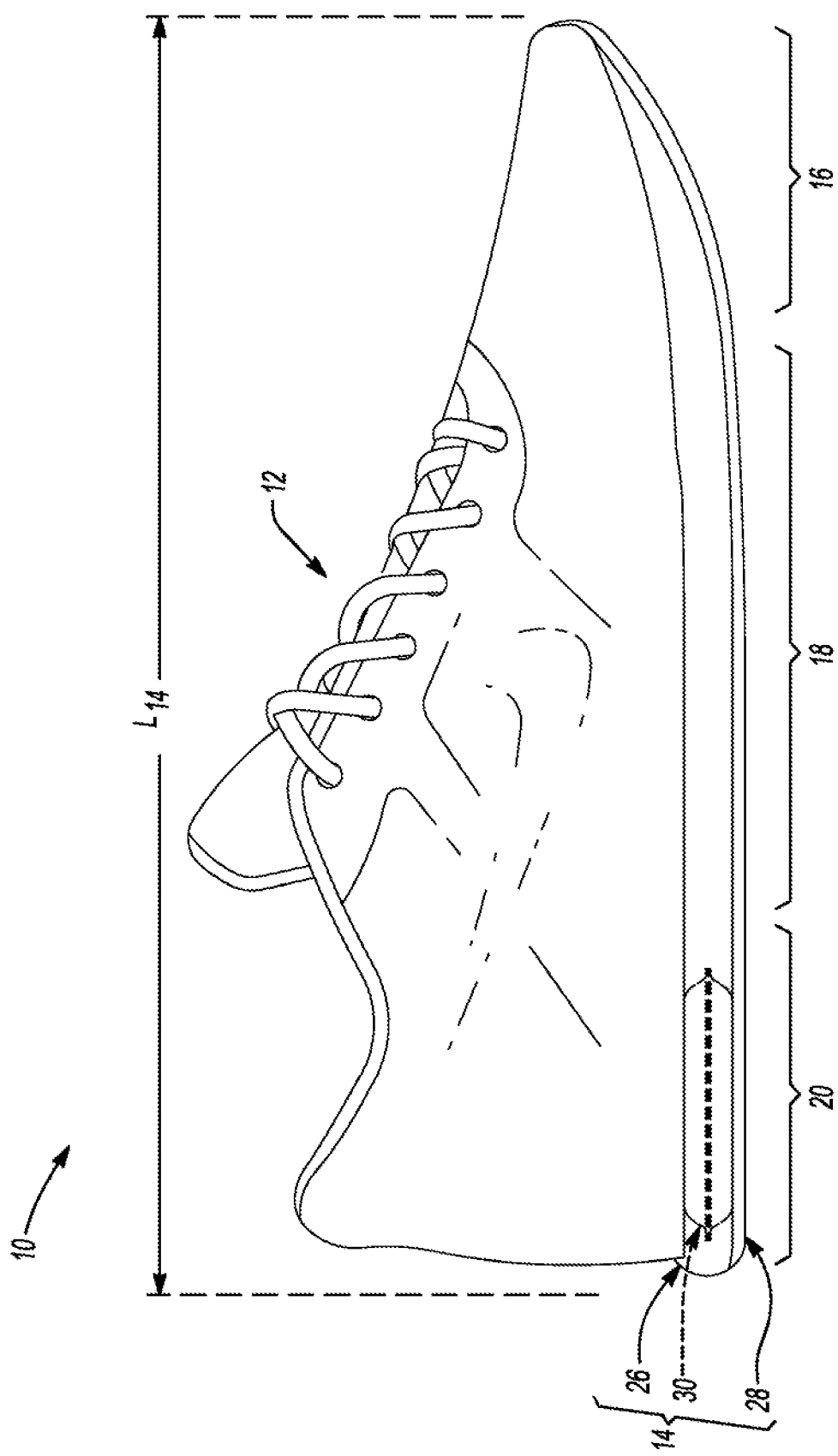
FIG. 5 is an exemplary side view of the article of footwear of any of FIGS. 1-3, FIGS. 1A-3A, or FIGS. 1B-3B.
Figure 6:
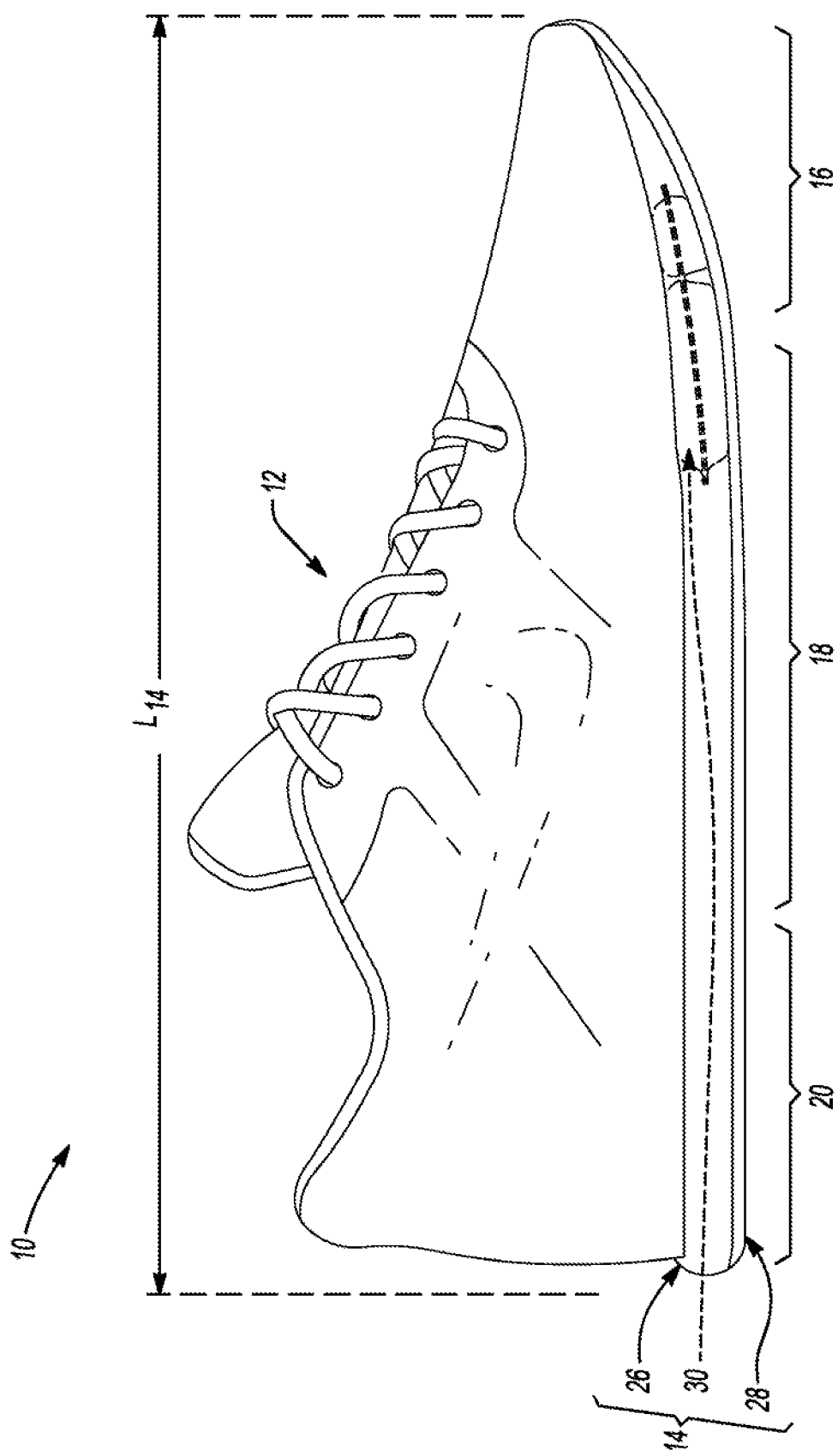
FIG. 6 is an exemplary side view of the article of footwear of any of FIGS. 1-3, FIGS. 1A-3A, or FIGS. 1B-3B.
Figure 7:
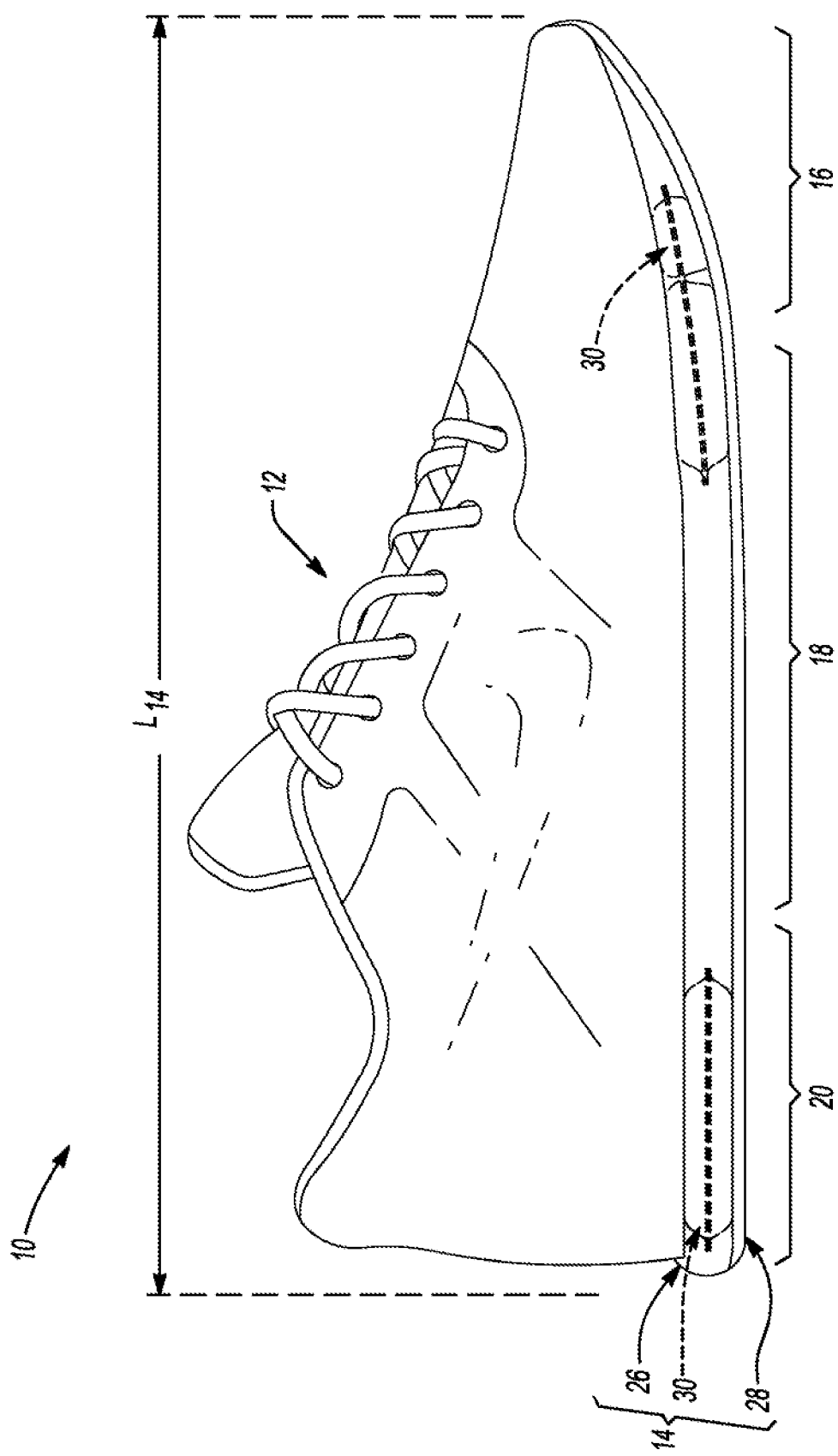
FIG. 7 is an exemplary side view of the article of footwear of any of FIGS. 1-3, FIGS. 1A-3A, or FIGS. 1B-3B.

As shown in FIGS. 2 and 4, the cushioning arrangement 30 may extend across substantially most or all of a length ($L_{14}$) of the sole structure 14 including, for example, the forefoot region 16, the midfoot region 18, and the heel region 20. In another example, as shown in FIG. 5, the cushioning arrangement 30 may extend across some or all of the heel region 20 of the sole structure 14 but may not extend into the forefoot region 16 and the midfoot region 18 of the sole structure 14. In yet another example, as shown in FIG. 6, the cushioning arrangement 30 may extend across some or all of the forefoot region 16 of the sole structure 14 but may not extend into the midfoot region 18 and the heel region 20 of the sole structure 14. Finally, as shown in in FIG. 7, the cushioning arrangement 30 may include a first portion extending across some or all of the forefoot region 16 and a second portion extending across some or all of the heel region 20 with a material of the midsole 26 disposed between and separating the first portion and the second portion of the cushioning arrangement 30 at the midfoot region 18 of the sole structure 14. The cushioning arrangement 30 may additionally extend across substantially all of a width ($W_{14}$) of the sole structure 14 (FIG. 1) between the medial side 22 and the lateral side 24.

Referring, respectively, to FIGS. 1-3 and 1B-3B, the outer surface profile of the cushioning arrangement 30 and the cushioning arrangement 30b may be substantially similar to one another. Therefore, although the following disclosure at FIGS. 8-17 makes reference to the cushioning arrangement 30 of FIGS. 1-3, the disclosure at FIGS. 8-17 may also apply to the cushioning arrangement 30b of FIGS. 1B-3B. Furthermore, although the outer surface profile of the cushioning arrangement 30a at FIGS. 1A-3A is different from that of the outer surface profile of the cushioning arrangements 30, 30b, aspects (see, for example, the formation of one or more recesses, trenches, or valleys 56) of the cushioning arrangement 30 described at FIGS. 8-17 also apply to the cushioning arrangement 30a.

As shown in FIGS. 8-11, the cushioning arrangement 30 is defined by a plurality of components 32, 34, 36. When the plurality of components 32, 34, 36 are joined together, as shown, for example, in FIGS. 12-15, the plurality of components 32, 34, 36 form a fluid-filled chamber 38.

As will be described in detail below, after the fluid-filled chamber 38 is formed, the plurality of components 32, 34, 36 defining the cushioning arrangement 30 may be further shaped to divide the fluid-filled chamber 38 into a plurality of fluid-filled chambers $38_1$-$38_n$. For example, the fluid-filled chambers $38_1$-$38_n$ may be defined by a rearward-most fluid-filled chamber $38_1$ (see, e.g. FIGS. 16 and 17) located within the heel region 20 of the sole structure 14 and a forward-most fluid-filled chamber $38_n$ (see, for example, FIG. 17) located within the forefoot region 16 of the sole structure 14. The plurality of fluid-filled chambers $38_1$-$38_n$ may also be defined by one or more intermediate fluid-filled chambers $38_2$-$38_{n-1}$ (see, for example, FIG. 17) located between the fluid-filled chamber $38_1$ and the fluid-filled chamber $38_n$.

Figure 17:
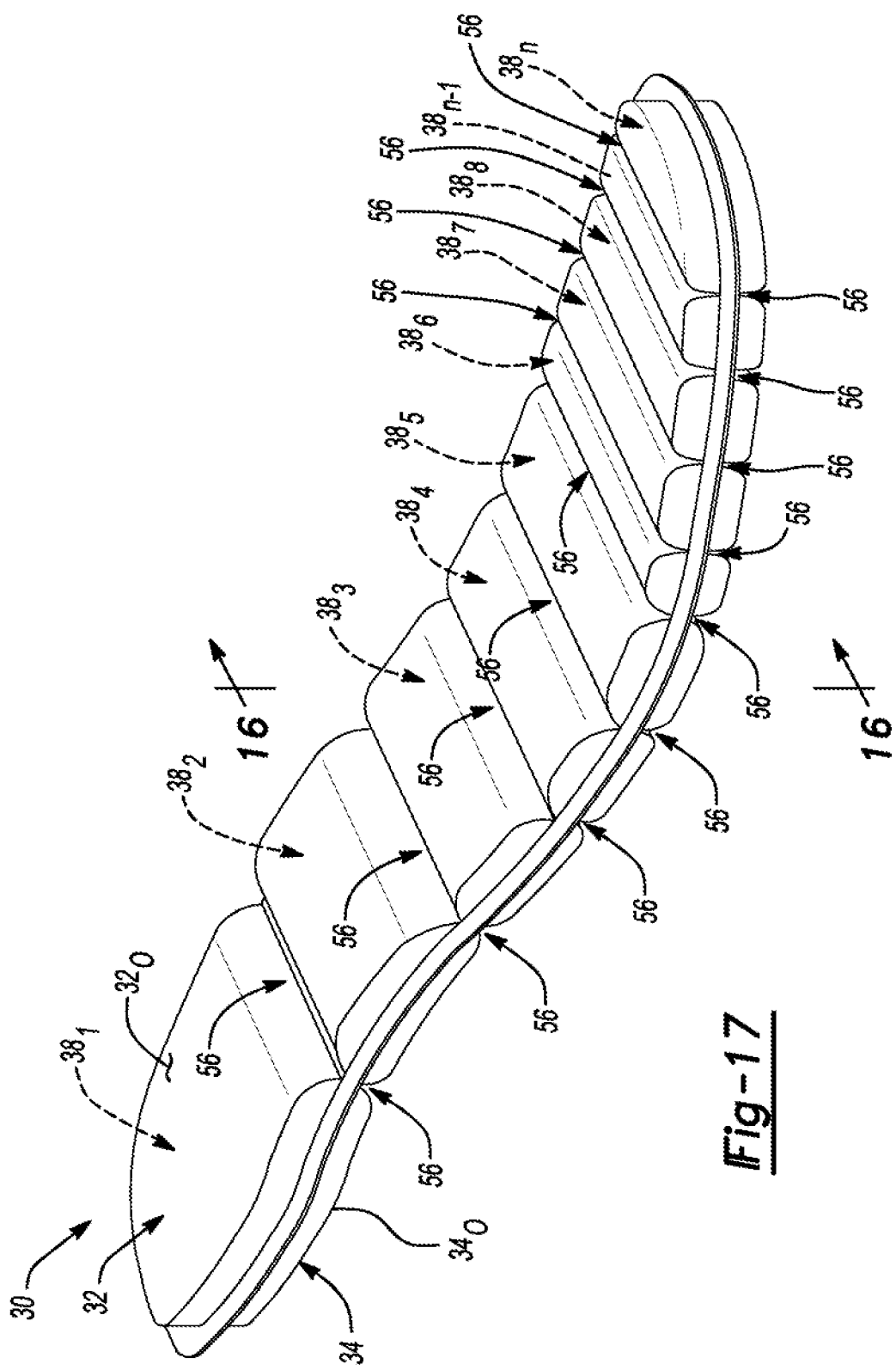
FIG. 17 is a perspective view of the cushioning arrangement of the article of footwear of either of FIGS. 1-3 or FIGS. 1B-3B.

The shape of the fluid-filled chambers $38_1$-$38_n$ define an outer surface profile of the cushioning arrangements 30, 30a, 30b. In an example, as shown in FIGS. 3, 3B, and 17, each fluid-filled chamber of the plurality of fluid-filled chambers $38_1$-$38_n$ extends laterally between the medial side 22, 22b and the lateral side 24, 24b of the sole structure 14, 14b such that each fluid-filled chamber $38_1$-$38_n$ includes a substantially rectangular shape having a longitudinal axis extending between the medial side 22, 22b and the lateral side 24, 24b. In another example, as shown in FIG. 3A, each fluid-filled chamber of the plurality of fluid-filled chambers $38_1$-$38_n$ may be defined by a substantially hexagonal shape that collectively forms, for example, a honeycomb pattern. While the chambers $38_1$-$38_n$ could be elongate (FIGS. 3, 3B) or hexagonal (FIG. 3A), the chambers $38_1$-$38_n$ could include any shape, as will be described below.

Figure 8:
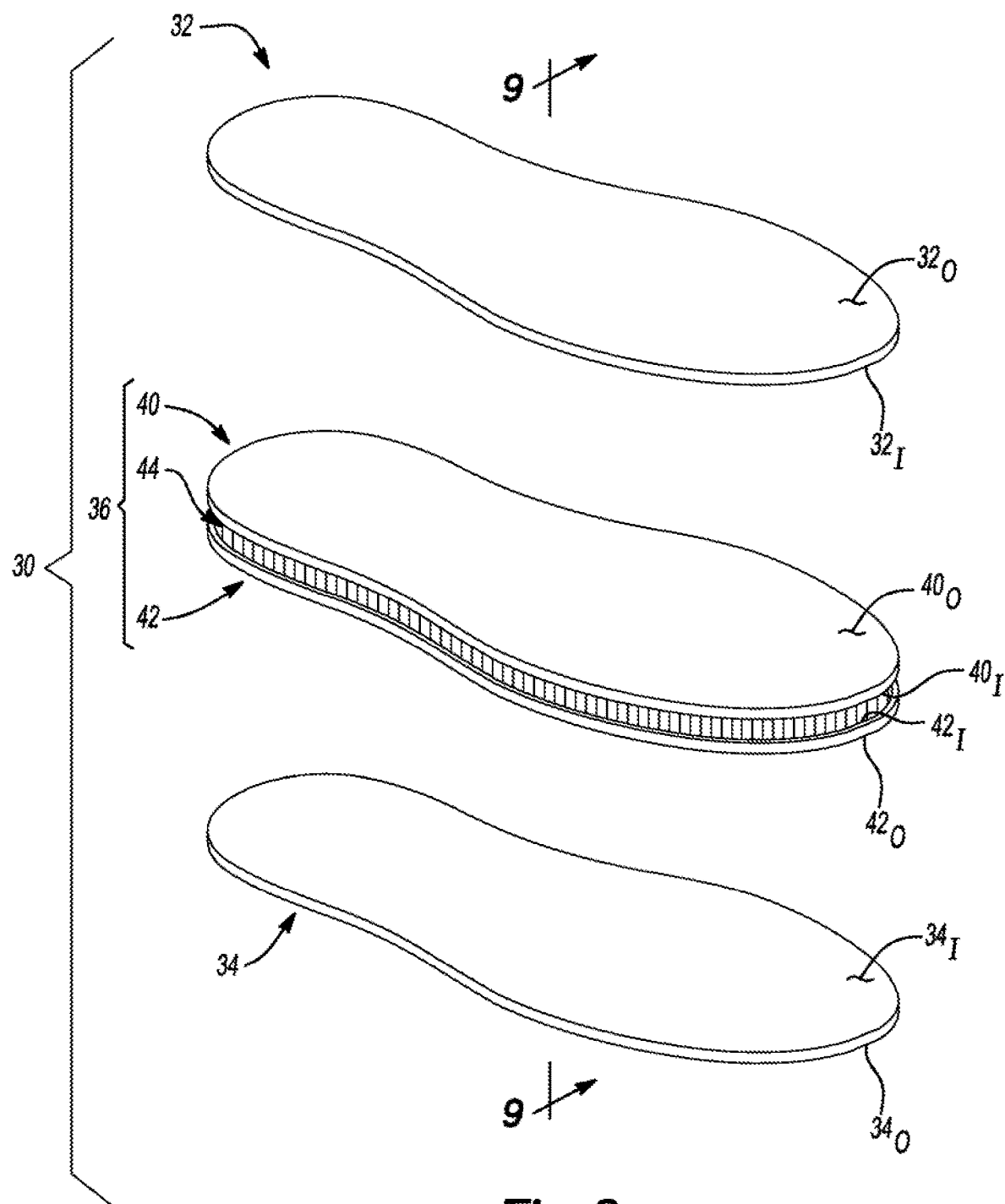
FIG. 8 is an exploded view of a cushioning arrangement of the article of footwear of any of FIGS. 1-3, FIGS. 1A-3A, or FIGS. 1B-3B.

Referring to FIGS. 8 and 9, an unassembled, exploded view of the plurality of components 32, 34, 36 defining an exemplary cushioning arrangement 30 is shown. The plurality of components 32, 34, 36 may include a first barrier sheet 32, a second barrier sheet 34, and a tensile member 36. The tensile member 36 may include a first tensile layer 40, a second tensile layer 42, and a plurality of tensile elements 44 extending between and connecting the first tensile layer 40 and the second tensile layer 42.

As shown generally in FIG. 8, each of the first barrier sheet 32 and the second barrier sheet 34 may be defined by an inner surface $32_I$, $34_I$ and an outer surface $32_O$, $34_O$. Each of the first tensile layer 40 and the second tensile layer 42 may also be defined by an inner surface $40_I$, $42_I$ and an outer surface $40_O$, $42_O$. The plurality of tensile elements 44 extend between the inner surface $40_I$, $42_I$ of each of the first tensile layer 40 and the second tensile layer 42 to connect the first tensile layer 40 and the second tensile layer 42.

With reference to FIG. 9, the inner surface $32_I$ of the first barrier sheet 32 may include a perimeter inner surface portion $32_{I-P}$, a first inner surface portion $32_{I-1}$ extending from the perimeter inner surface portion $32_{I-P}$, and a second inner surface portion $32_{I-2}$ extending from the first inner surface portion $32_{I-1}$. The inner surface $34_I$ of the second barrier sheet 34 may include a perimeter inner surface portion $34_{I-P}$, a first inner surface portion $341_{I-1}$ extending from the perimeter inner surface portion $34_{I-P}$, and a second inner surface portion $34_{I-2}$ extending from the first inner surface portion $34_{I-1}$.

Referring to FIGS. 9-11, a first step of forming the exemplary cushioning arrangement 30 includes: (1) attaching the outer surface $40_O$ of the first tensile layer 40 of the tensile member 36 to the second inner surface portion $32_{I-2}$ of the inner surface $32_I$ of the first barrier sheet 32 by melding the material of the first tensile layer 40 and the material of the first barrier sheet 32 to form a first melded portion 46 (see, for example, FIG. 11) and (2) attaching the outer surface $42_O$ of the second tensile layer 42 of the tensile member 36 to the second inner surface portion $34_{I-2}$ of the inner surface $34_I$ of the second barrier sheet 34 by melding the material of the second tensile layer 42 and the material of the second barrier sheet 34 to form a second melded portion 48 (see, for example, FIG. 11). With reference to FIG. 11, the first melded portion 46 may include a portion of a thickness ($T_{32}$) of the first barrier sheet 32 and a portion of a thickness ($T_{40}$) of the first tensile layer 40 of the tensile member 36. Similarly, the second melded portion 48 may include a portion of a thickness ($T_{34}$) of the second barrier sheet 34 and a portion of a thickness ($T_{42}$) of the second tensile layer 42 of the tensile member 36.

Melding of the materials of the first tensile layer 40 and the first barrier sheet 32 and melding of the materials of the second tensile layer 42 and the second barrier sheet 34 may be accomplished by applying heat to the first barrier sheet 32 and the second barrier sheet 34 to cause the materials of the foregoing elements 32, 34, 40, 42 to flow and meld. While the foregoing elements 32, 34, 40, 42 are described and shown as being attached together by melding the materials of the first barrier sheet 32 and the first tensile layer 40 and by melding the materials of the second barrier sheet 34 and the second tensile layer 42, the first barrier sheet 32 and the second barrier sheet 34 could alternatively be attached to the tensile layers 40, 42, respectively, via an adhesive (not shown) disposed between the first barrier sheet 32 and the first tensile layer 40 and between the second barrier sheet 34 and the second tensile layer 42.

As shown in FIGS. 10 and 11, after attaching the first tensile layer 40 of the tensile member 36 to the first barrier sheet 32 and attaching the second tensile layer 42 of the tensile member 36 to the second barrier sheet 34, the perimeter inner surface portion $32_{I-P}$ and the first inner surface portion $32_{I-1}$ of the first barrier sheet 32 and the perimeter inner surface portion $34_{I-P}$ and the first inner surface portion $341_{I-1}$ of the second barrier sheet 34 are not attached to any portion of the tensile member 36. At this point, a cavity 50 is defined between the first barrier sheet 32 and the second barrier sheet 34 but is not sealed from the surrounding environment.

Figure 13:
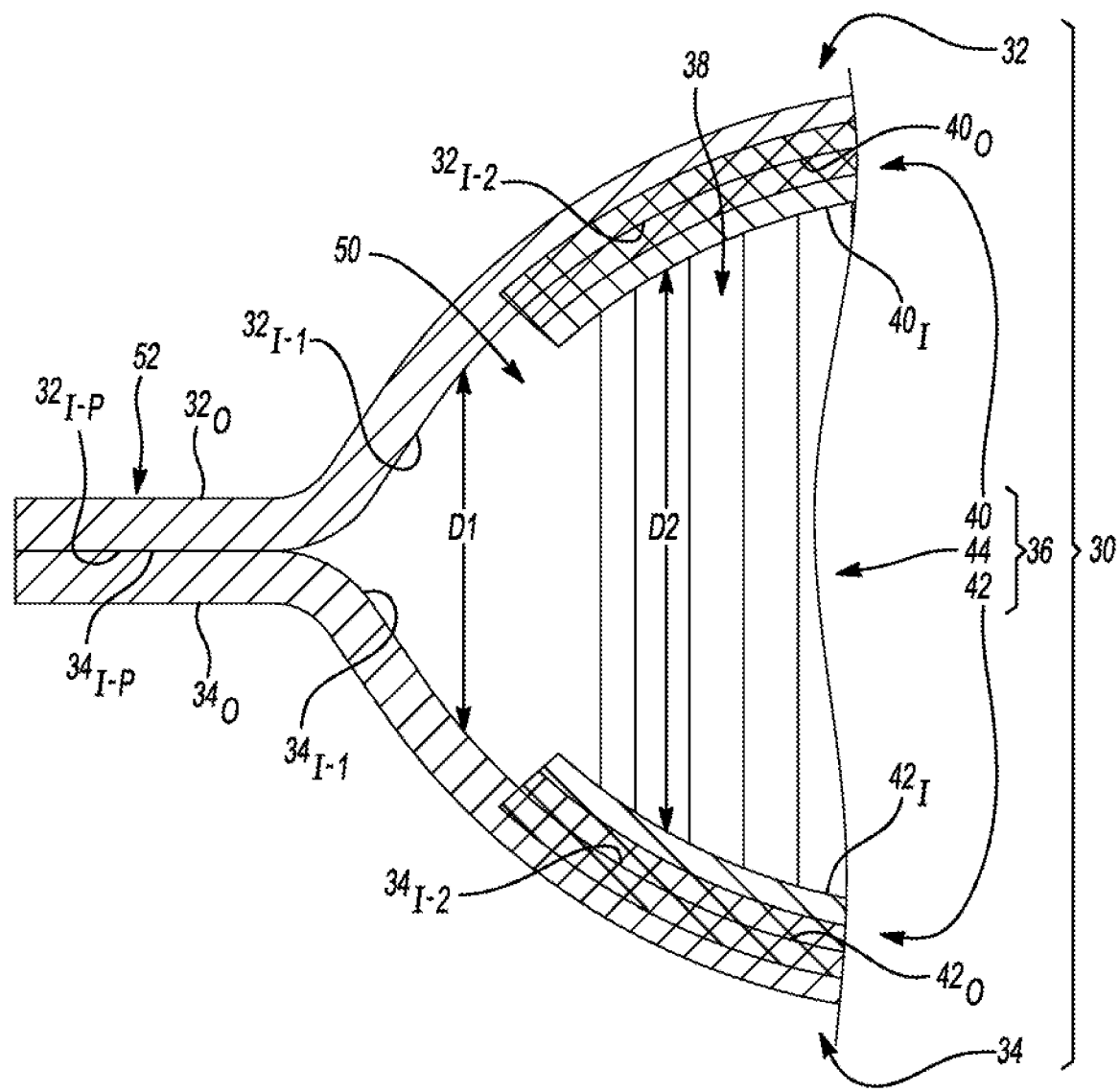
FIG. 13 is an enlarged cross-sectional view of a portion of the cushioning arrangement of FIG. 12 identified by Line 13 of FIG. 12.

With reference to FIGS. 12 and 13, the cavity 50 is subsequently sealed as a result of securing the perimeter inner surface portion $32_{I-P}$ of the first barrier sheet 32 to the perimeter inner surface portion $34_{I-P}$ of the second barrier sheet 34. In so doing, a perimeter seal or weld 52 is formed and the cavity 50 is sealed to form the fluid-filled chamber 38.

Securing the perimeter inner surface portion $32_{I-P}$ of the first barrier sheet 32 to the perimeter inner surface portion $34_{I-P}$ of the second barrier sheet 34 to form the perimeter seal 52 may be accomplished by heating or ultrasonically welding the perimeter inner surface portion $32_{I-P}$ of the first barrier sheet 32 to the perimeter inner surface portion $34_{I-P}$ of the second barrier sheet 34. Heating or ultrasonically welding the perimeter inner surface portion $32_{I-P}$ of the first barrier sheet 32 to the perimeter inner surface portion $341_{I-P}$ of the second barrier sheet 34 may result in one or more of the perimeter inner surface portion $32_{I-P}$ of the first barrier sheet 32 and the perimeter inner surface portion $34_{I-P}$ of the second barrier sheet 34 being melted, melded, bonded, adhered or otherwise secured or connected together in a substantially airtight or sealed manner.

While the tensile member 36 is described as being attached to the first barrier sheet 32 and the second barrier sheet 34 prior to formation of the perimeter seal 52, the barrier sheets 32, 34 could alternatively be attached to the tensile member 36 contemporaneously with formation of the perimeter seal 52. For example, the tensile member 36 may be disposed between the first barrier sheet 32 and the second barrier 34 sheet and may be adhered to the sheets 32, 34—via an adhesive or via heat by melding materials of the respective sheets 32, 34 and layers 40, 42—at the same time heat is applied to form the perimeter seal 52.

Regardless of when the tensile member 36 is attached to the barrier sheets 32, 34 (i.e., before or after formation of the perimeter seal 52), the sealed cavity 50 may receive a pressurized fluid (e.g., air) to at least partially inflate the cavity 50 and place the tensile elements 44 in tension. Placing the tensile elements 44 in tension causes the tensile elements 44 to restrict movement of the barrier sheets 32, 34 in a direction away from one another beyond a predetermined amount due to opposing ends of the tensile elements 44 being respectively connected to the inner surface $40_I$, $42_I$ of each of the first tensile layer 40 and the second tensile layer 42. In so doing, the tensile elements 44 serve to maintain a desired outer shape of the fluid-filled chamber 38.

As shown in FIG. 13, after the perimeter seal 52 is formed by securing the perimeter inner surface portion $32_{I-P}$ of the first barrier sheet 32 to the perimeter inner surface portion $34_{I-P}$ of the second barrier sheet 34, the first inner surface portion $32_{I-1}$ of the first barrier sheet 32 and the first inner surface portion $34_{I-1}$ of the second barrier sheet 34 are not secured to any portion of the plurality of components 32, 34, 36 defining the cushioning arrangement 30. As a result, the first inner surface portion $32_{I-1}$ of the first barrier sheet 32 is arranged at a first spaced-apart distance (D1) from the first inner surface portion $34_{I-1}$ of the second barrier sheet 34. Similarly, as shown in FIG. 13, because the tensile elements 44 are respectively connected to and disposed between the inner surface $40_I$, $42_I$ of each of the first tensile layer 40 and the second tensile layer 42 and the cavity 50 is pressurized, the inner surface $40_I$ of the first tensile layer 40 is spaced-apart from the inner surface $42_I$ of the second tensile layer 42 a second spaced apart distance (D2).

Figure 14:
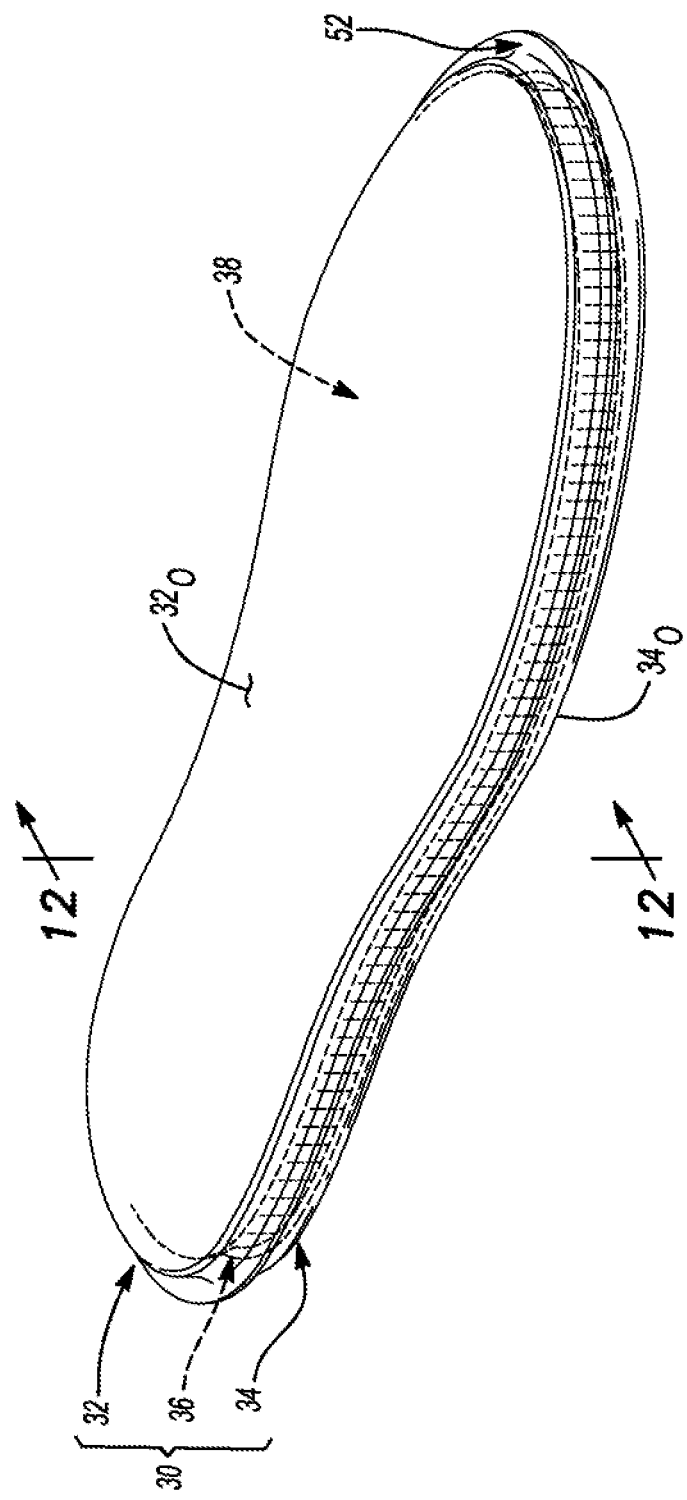
FIG. 14 is a perspective view of a partially assembled cushioning arrangement according to FIG. 12.

With reference to FIG. 14, the outer surface profile of the cushioning arrangement 30 is generally defined by the outer surface $32_O$ of the first barrier sheet 32 and the outer surface $34_O$ of the second barrier sheet 34. Because the fluid-filled chamber 38 of the cushioning arrangement 30 of FIG. 14 is not yet shaped or divided into a plurality of fluid-filled chambers $38_1$-$38_n$, the outer surface $32_O$, $34_O$ of each of the first barrier sheet 32 and the second barrier sheet 34 remains substantially flat and smooth.

Referring to FIG. 15, in addition to the second spaced apart distance (D2), the inner surface $40_I$ of the first tensile layer 40 may be further defined as being spaced-apart from the inner surface $42_I$ of the second tensile layer 42 at a third spaced apart distance (D3). As described above, during the manufacture of the cushioning arrangement 30, the fluid-filled chamber 38 of the cushioning arrangement 30 may be shaped or divided into a plurality of fluid-filled chambers $38_1$-$38_n$. In an example, as shown comparatively in FIGS. 15 and 16, formation of the plurality of fluid-filled chambers $38_1$-$38_n$ may result from disposing one or more portions of the inner surface $40_I$ of the first tensile layer 40 adjacent one or more portions of the inner surface $42_I$ of the second tensile layer 42 such that the third spaced apart distance (D3) is eliminated or reduced to zero (FIG. 16).

As shown in FIG. 16, when the third spaced apart distance (D3) is eliminated or reduced to zero, a region (see, for example, "$R_{54}$") is defined where the opposing portions of the inner surface $40_I$ of the first tensile layer 40 and the inner surface $42_I$ of the second tensile layer 42 along with any tensile fibers 44 extending therebetween are joined together. Specifically, the materials of the first barrier sheet 32, the second barrier sheet 34, the first tensile layer 40, the second tensile layer 42, and the tensile elements 44 are melded together to form a third melded portion 54. The third melded portion 54 fuses or welds the materials of the first barrier sheet 32, the second barrier sheet 34, the first tensile layer 40, the second tensile layer 42, and the tensile elements 44 together to form a series of internal welds (i.e., welds that are located within the perimeter seal or weld 52). As will be described below, the materials of these elements 32, 34, 40, 42, 44 are melded together by applying heat to one or both of the first barrier sheet 32 and the second barrier sheet 34 at discrete locations of the outer surfaces $32_O$, $34_O$ of each of the first barrier sheet 32 and the second barrier sheet 34, respectively, to cause the materials of these elements 32, 34, 40, 42, 44 to flow and meld.

Although one third melded portion 54 is shown at FIG. 16, a plurality of third melded portions 54 may be formed for further shaping or diving the fluid-filled chamber 38 of the cushioning arrangement 30 into the plurality of fluid-filled chambers $38_1$-$38_n$. With reference to FIG. 17, because the fluid-filled chamber 38 of the cushioning arrangement 30 of FIGS. 16 and 17 is shaped or divided into a plurality of fluid-filled chambers $38_1$-$38_n$, the outer surface $32_O$, $34_O$ of each of the first barrier sheet 32 and the second barrier sheet 34 no longer appears substantially flat and smooth. Rather, the outer surfaces $32_O$, $34_O$ of each of the first barrier sheet 32 and the second barrier sheet 34 are shaped to include one or more recesses, trenches, or valleys 56. The shape and locations of the valleys 56 provide the cushioning arrangements 30, 30b with the elongate fluid-filled chambers $38_1$-$38_n$ and provide the cushioning arrangement 30a with the fluid-filled chambers $38_1$-$38_n$ having a hexagonal shape.

Referring to FIGS. 11 and 16, the first melded portion 46, the second melded portion 48, and the one or more third melded portion(s) 54 may result from at least two of: (1) the first barrier sheet 32; (2) the second barrier sheet 34; and (3) at least one of the components of the tensile member 36 (i.e., the first tensile layer 40, the second tensile layer 42, and the plurality of tensile elements 44) being formed from the same material, a similar material, or a species of material corresponding to a genus material. In an example, the same material or the similar material may be a thermoplastic polyurethane (TPU) polymer. In another example, the genus material may be a thermoplastic material.

In an example, the first barrier sheet 32, the second barrier sheet 34, and at least one of the components of the tensile member 36 may be formed from the following materials: (1) the first barrier sheet 32 may be formed from a first thermoplastic material, (2) the second barrier sheet 34 may be formed from a second thermoplastic material, and (3) the tensile member 36—including the first tensile layer 40, the second tensile layer 42, and/or the tensile elements 44—may be formed from a third thermoplastic material (e.g., the first, second, and third thermoplastic materials may be the same material or, alternatively, different thermoplastic material species of a genus of a thermoplastic material). In an example, a melting temperature of the first thermoplastic material, a melting temperature of the second thermoplastic material, and a melting temperature of the third thermoplastic material are all within a range of approximately 20° C. In another example, a melting temperature of the first thermoplastic material, a melting temperature of the second thermoplastic material, and a melting temperature of the third thermoplastic material are approximately the same.

In addition to the foregoing material properties, the material defining the tensile member 36—including the first tensile layer 40, the second tensile layer 42, and/or the tensile elements 44—may be a foamed material such as a sheet of foamed thermoplastic material. Alternatively, the material defining the tensile member 36—including the first tensile layer 40, the second tensile layer 42, and/or the tensile elements 44—may be a textile such as a knit textile having tensile strands forming the tensile elements 44.

Figure 18:
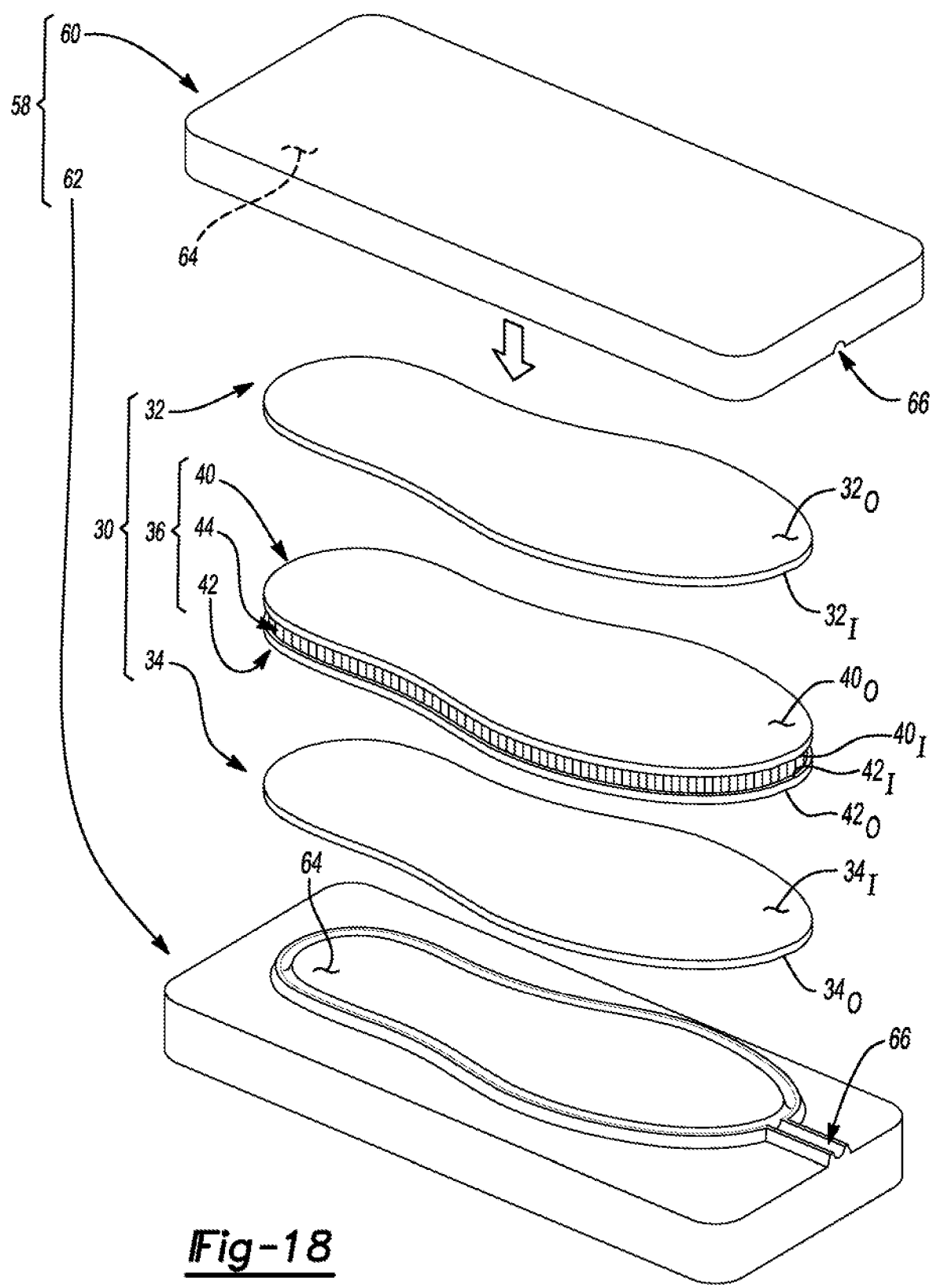
FIG. 18 is a perspective view of a first mold tool arranged in an open configuration and the exploded view of a cushioning arrangement of FIG. 8.

Referring to FIGS. 18-23, a first mold tool 58 is shown for forming the cushioning arrangement 30 of FIG. 14. As shown in FIG. 18, the mold tool 58 includes an upper mold half 60 and a lower mold half 62. Each of the upper mold half 60 and the lower mold half 62 may define a mold surface 64 for forming the perimeter seal 52 and the substantially flat, smooth outer surface $32_O$, $34_O$ of each of the first barrier sheet 32 and the second barrier sheet 34. The upper mold half 60 and the lower mold half 62 may additionally include a fluid conduit portion 66 that permits fluid communication with a source of pressurized fluid 68 (see, for example, FIG. 22) for permitting fluid communication of a pressurized fluid (e.g., air) from: (1) a source of pressurized fluid 68, (2) through the fluid conduit portion 66 of each of the upper mold half 60 and the lower mold half 62, and (3) into the cavity 50 for inflating the cushioning arrangement 30.

Figure 21:
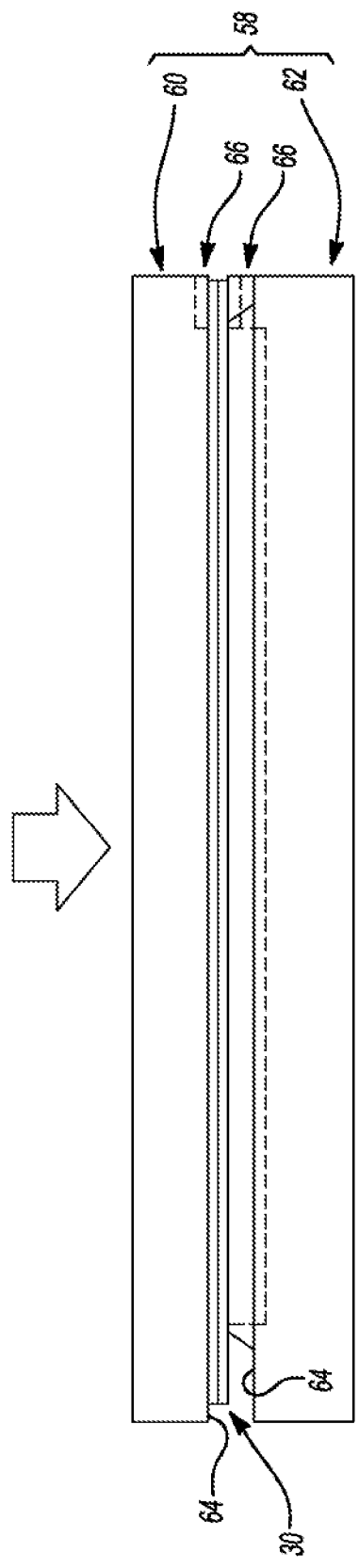
FIG. 21 is a side view of the first mold tool of FIG. 20 arranged in a closed configuration and the cushioning arrangement of FIG. 20.

As shown in FIGS. 18 and 19, the mold tool 58 is arranged in an open configuration by spacing apart the upper mold half 60 and the lower mold half 62 to allow the plurality of components 32, 34, 36 defining the cushioning arrangement 30 to be arranged therebetween. As shown in FIGS. 20 and 21, the mold tool 58 may then be arranged in a closed configuration by arranging the upper mold half 60 adjacent the lower mold half 62, thereby shaping the plurality of components 32, 34, 36 defining the cushioning arrangement 30. The components 32, 34, 36 are shaped by applying heat and pressure to the components 32, 34, 36 at the mold surfaces 64 of the upper mold half 60 and the lower mold half 62. Application of heat and pressure forms the perimeter seal 52 by fusing the materials of the barrier sheets 32, 34 together and, further, may form the first melded portion 46 and the second melded portion 48 to attach the tensile layers 40, 42 to the barrier sheets 30, 32, respectively. As described above, if the tensile layers 40, 42 are respectively attached to the barrier sheets 30, 32 via an adhesive rather than by melding a material of the elements 32, 34, 40, 42, the layers 40, 42 are attached to the sheets 30, 32, respectively, by the application of heat and/or pressure by the mold surfaces 64 of the upper mold half 60 and the lower mold half 62 to activate the adhesive when the mold halves 60, 62 are in the closed configuration.

Figure 22:
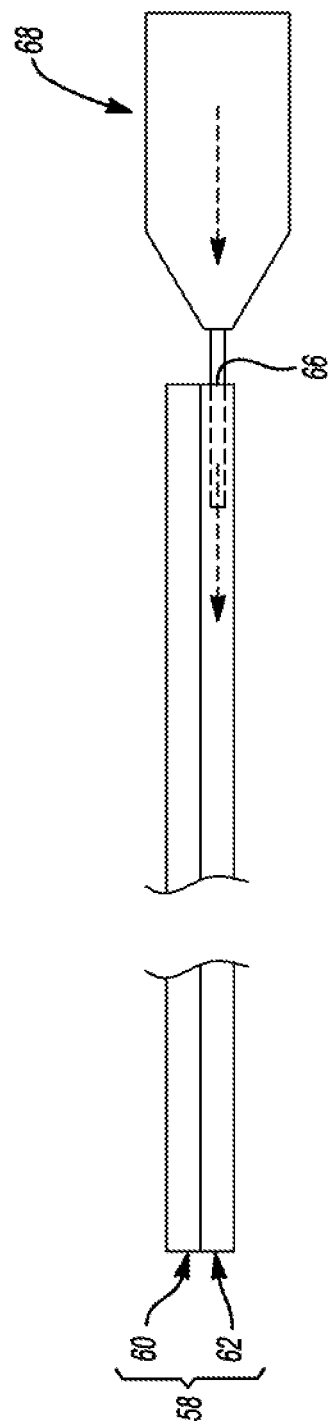
FIG. 22 is a schematic representation of a source of fluid providing the cushioning arrangement of FIG. 20 with pressurized fluid.
Figure 23:
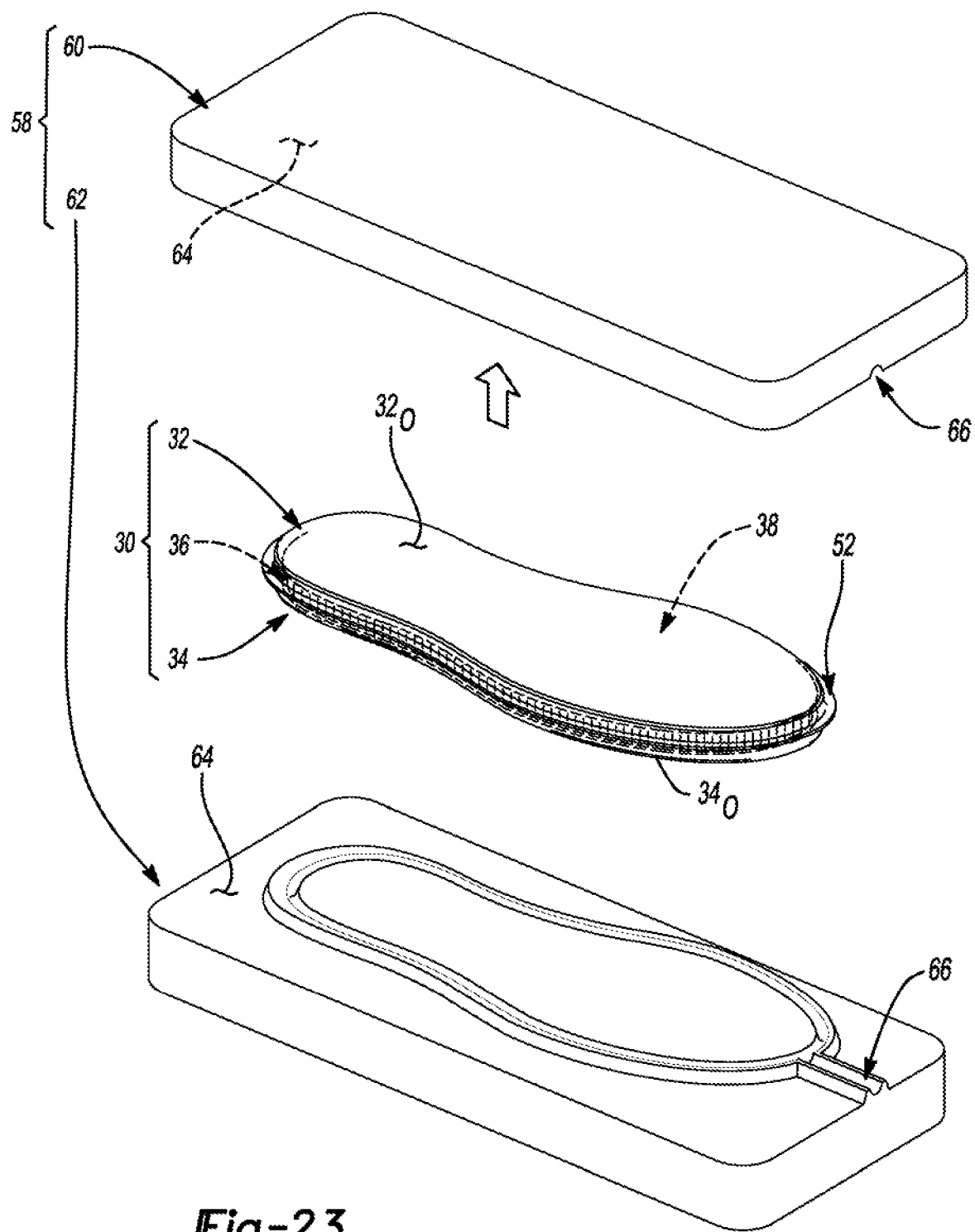
FIG. 23 is a perspective view of the first mold tool returned to the open configuration from the closed configuration and the partially assembled cushioning arrangement of FIG. 14.

The source of pressurized fluid 68 may communicate pressurized fluid (e.g., air) from: (1) the source of pressurized fluid 68, (2) through the fluid conduit portion 66 of each of the upper mold half 60 and the lower mold half 62, and (3) into the cavity 50 for at least partially inflating the cushioning arrangement 30, as shown in FIG. 22. Thereafter, the mold tool 58 may seal the perimeter seal 52 at the location of the conduit portion 66 by joining the material of the first barrier sheet 32 and the material of the second barrier sheet 34 at the location of the conduit portion 66 to seal the pressurized fluid within the cavity 50. At this point, the mold tool 58 may be returned to the open configuration by spacing apart the upper mold half 60 and the lower mold half 62 to allow the cushioning arrangement 30 of FIG. 14 to be removed from the mold tool 58.

Figure 24:
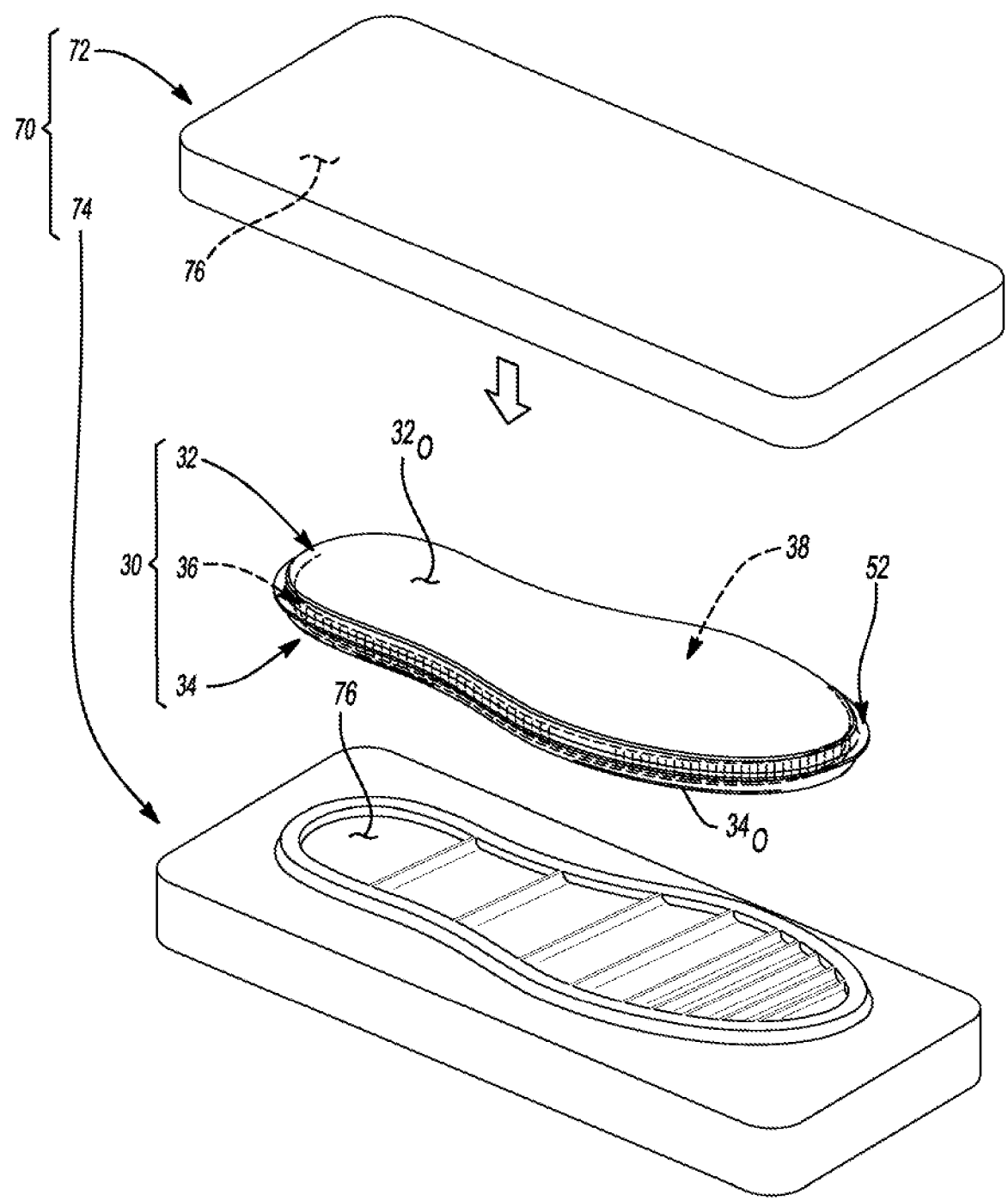
FIG. 24 is a perspective view of a second mold tool arranged in an open configuration and the partially assembled cushioning arrangement of FIG. 14.
Figure 27:
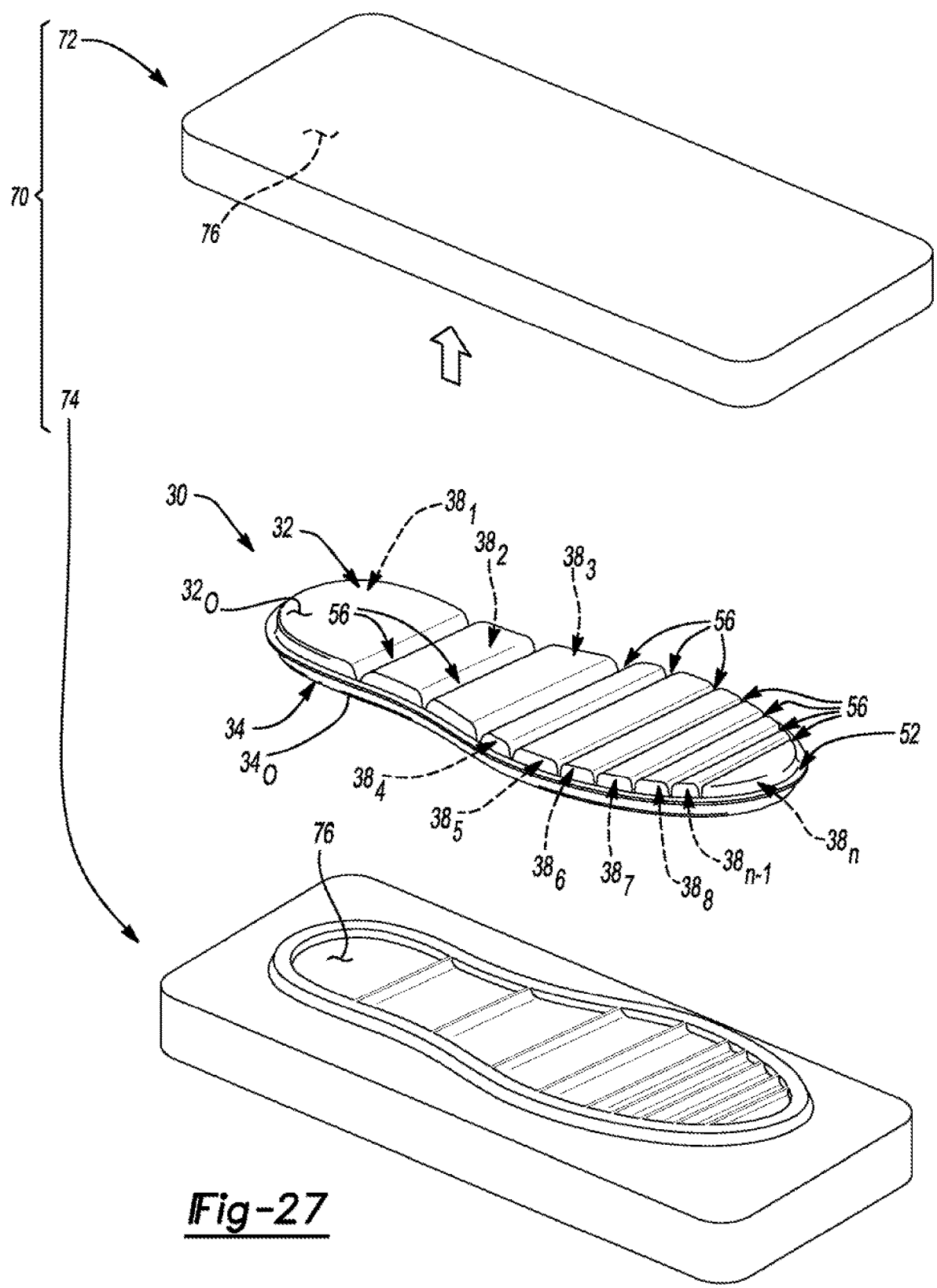
FIG. 27 is a perspective view of the second mold tool returned to open configuration from the closed configuration and the cushioning arrangement of FIG. 17.

Referring to FIGS. 24-27, a second mold tool 70 is shown for forming the cushioning arrangement 30 of FIG. 17 that is shaped or divided into a plurality of fluid-filled chambers $38_1$-$38_n$. As shown in FIG. 24, the mold tool 70 includes an upper mold half 72 and a lower mold half 74. Each of the upper mold half 72 and the lower mold half 74 may define a mold surface 76 for forming the plurality of fluid-filled chambers $38_1$-$38n$ and the one or more recesses, trenches, or valleys 56.

As shown in FIGS. 24 and 25, the second mold tool 70 is arranged in an open configuration by spacing apart the upper mold half 72 and the lower mold half 74 to allow the cushioning arrangement 30 that was previously formed by the first mold tool 58 to be arranged between the upper mold half 72 and the lower mold half 74. After the cushioning arrangement 30 is located between the mold halves 72, 74, the mold tool 70 is arranged in a closed configuration by arranging the upper mold half 72 adjacent the lower mold half 74, thereby further shaping the cushioning arrangement 30 by forming the one or more third melded portion(s) 54. Specifically, the mold surfaces 76 include a shape that defines the valleys 56 in the uniform and smooth outer surfaces $32_O$, $34_O$ of each of the first barrier sheet 32 and the second barrier sheet 34. The shape of the mold surface 76 may be such that the elongate fluid-filled chambers $38_1$-$38_n$ of FIGS. 3 and 3B are formed or, alternatively, may be such that fluid-filled chambers $38_1$-$38_n$ having a hexagonal shape such as shown in FIG. 3A are formed. Further, the mold surfaces 76 may include virtually any shape to provide the fluid-filled chamber 38 with virtually any pattern.

When the mold halves 72, 74 are moved into the closed configuration, the mold surfaces 76 contact respective ones of the outer surfaces $32_O$, $34_O$ of each of the first barrier sheet 32 and the second barrier sheet 34. At this point, heat and pressure are applied to the outer surfaces $32_O$, $34_O$ of each of the first barrier sheet 32 and the second barrier sheet 34 to provide the outer surfaces $32_O$, $34_O$ with a series of one or more recesses, trenches, or valleys 56. The recesses or valleys 56 are created where the mold surfaces 76 form the third melded portions 54, whereby materials of the first barrier sheet 32, the second barrier sheet 34, the first tensile layer 40, the second tensile layer 42, and the tensile elements 44 are melded together.

The melded portions 54 can form any pattern in the outer surfaces $32_O$, $34_O$ of each of the first barrier sheet 32 and the second barrier sheet 34 to provide filled chambers $38_1$-$38_n$ having virtually any shape, size, and configuration such as the configurations shown in FIGS. 3, 3A, and 3B. Further, the melded portions 54 may be spaced apart from the perimeter seal 52 or, alternatively, may be spaced apart from the perimeter seal 52. For example, as shown in FIG. 3, the melded portions 54 defining the valleys 56 extend across the chamber 38 from the medial side 22 to the lateral side 24 such that the melded portions 54 contact and extend from the perimeter seal 52. Alternatively, and with respect to FIG. 3A, some of the melded portions 54 defining the individual hexagonal shapes are spaced apart and separated from the perimeter seal 52 while others contact and extend from the perimeter seal 52.

Regardless of the particular configuration of the pattern formed by the melded portions 54, the melded portions 54 are formed because application of heat at discrete locations of the outer surfaces $32_O$, $34_O$ of each of the first barrier sheet 32 and the second barrier sheet 34 causes the material of the first barrier sheet 32, the second barrier sheet 34, the first tensile layer 40, the second tensile layer 42, and the tensile elements 44 to be melded together. Melding of these materials is possible because these materials are either the same and/or have the same melting temperature and/or have a melting temperature within approximately 20° C. of one another. Accordingly, when heat of a predetermined magnitude is applied to the outer surfaces $32_O$, $34_O$ of each of the first barrier sheet 32 and the second barrier sheet 34 (i.e., heat that exceeds the melting temperature of elements 32, 34, 40, 42, 44), the material of these elements 32, 34, 40, 42, 44 flows and mixes or melds together, thereby forming the melded portions 54.

After formation of the melded portions 54, the mold tool 70 is returned to the open configuration by spacing apart the upper mold half 72 and the lower mold half 74 such that the cushioning arrangement 30 of FIG. 17 may be removed. The cushioning arrangement 30 is shaped or divided into a plurality of fluid-filled chambers $38_1$-$38n$ by one or more recesses, trenches, or valleys 56 via formation of the melded portions 54.

While the melded portions 54 are shown and described as forming individual fluid-filled chambers $38_1$-$38_n$ that are fluidly isolated from one another, the melded portions 54 could alternatively form fluid-filled chambers $38_1$-$38_n$ that are in fluid communication with one another. For example, the melded portions 54 that form the fluid-filled chambers $38_1$-$38_n$ of the cushioning arrangement 30 of FIG. 17 are described and shown as extending across a width of the chamber 38 between opposite sides of the perimeter seal 52 such that each fluid-filled chamber $38_1$-$38_n$ is isolated from one another. These melded portions 54 could be modified such that one or more portions 54 are spaced apart from the perimeter seal 52, thereby permitting one or more fluid-filled chambers $38_1$-$38n$ to be in fluid communication with one another.

Figure 29:
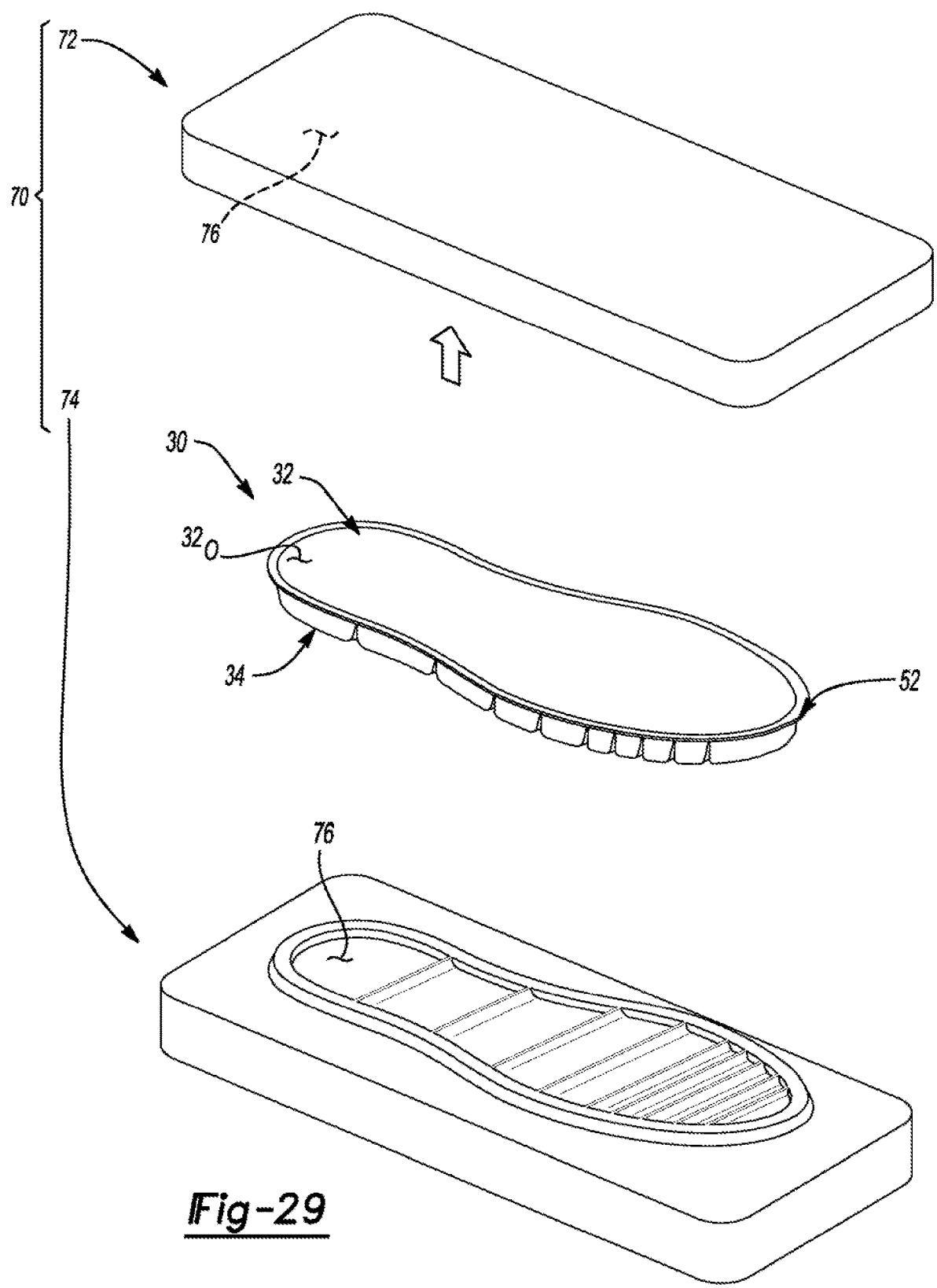
FIG. 29 is a perspective view of an exemplary mold tool returned to an open configuration from a closed configuration for forming the cushioning arrangement of FIG. 28.
Figure 30:
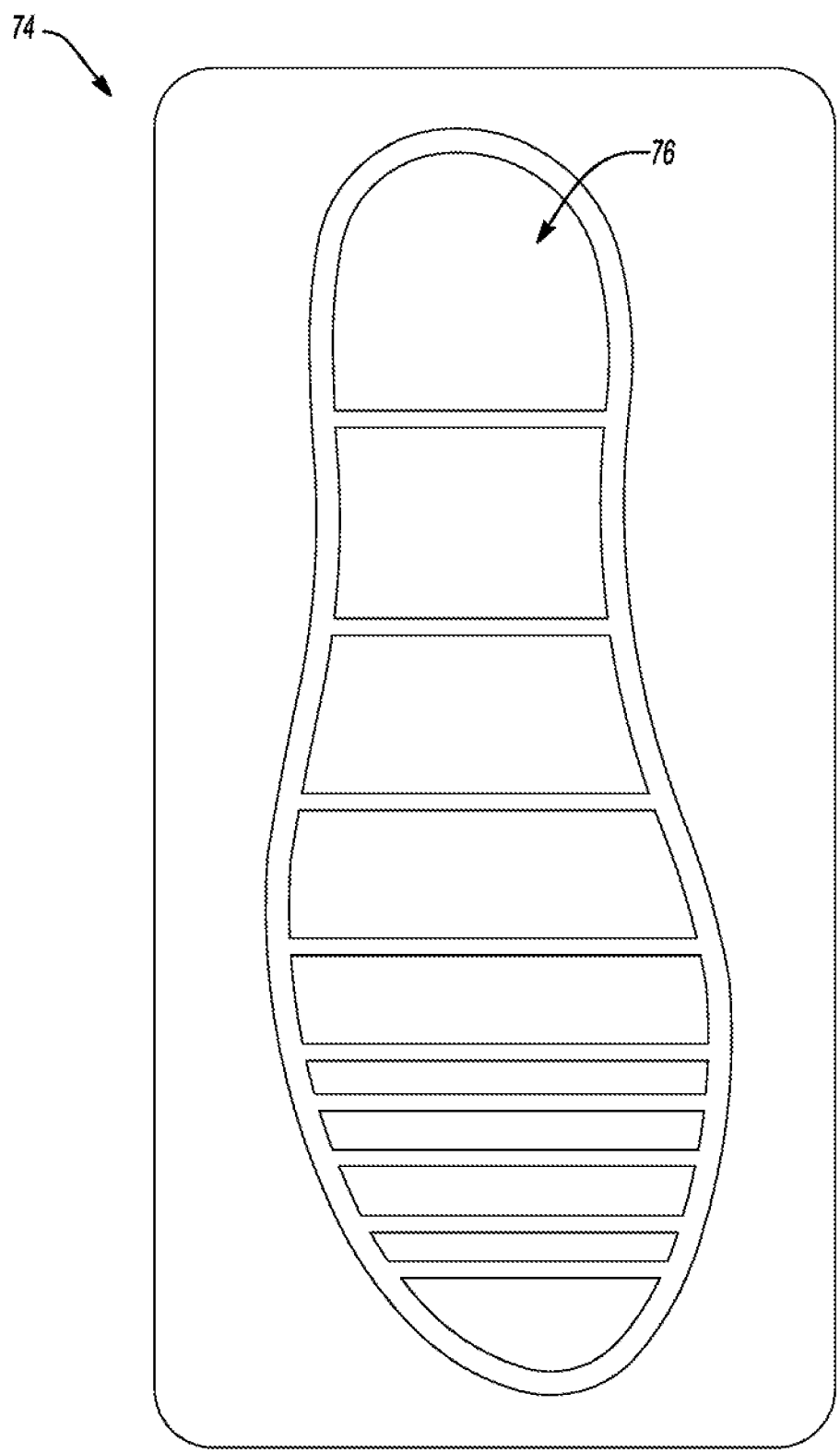
FIG. 30 is a plan view of a lower half of the mold tool of FIG. 29.
Figure 31:
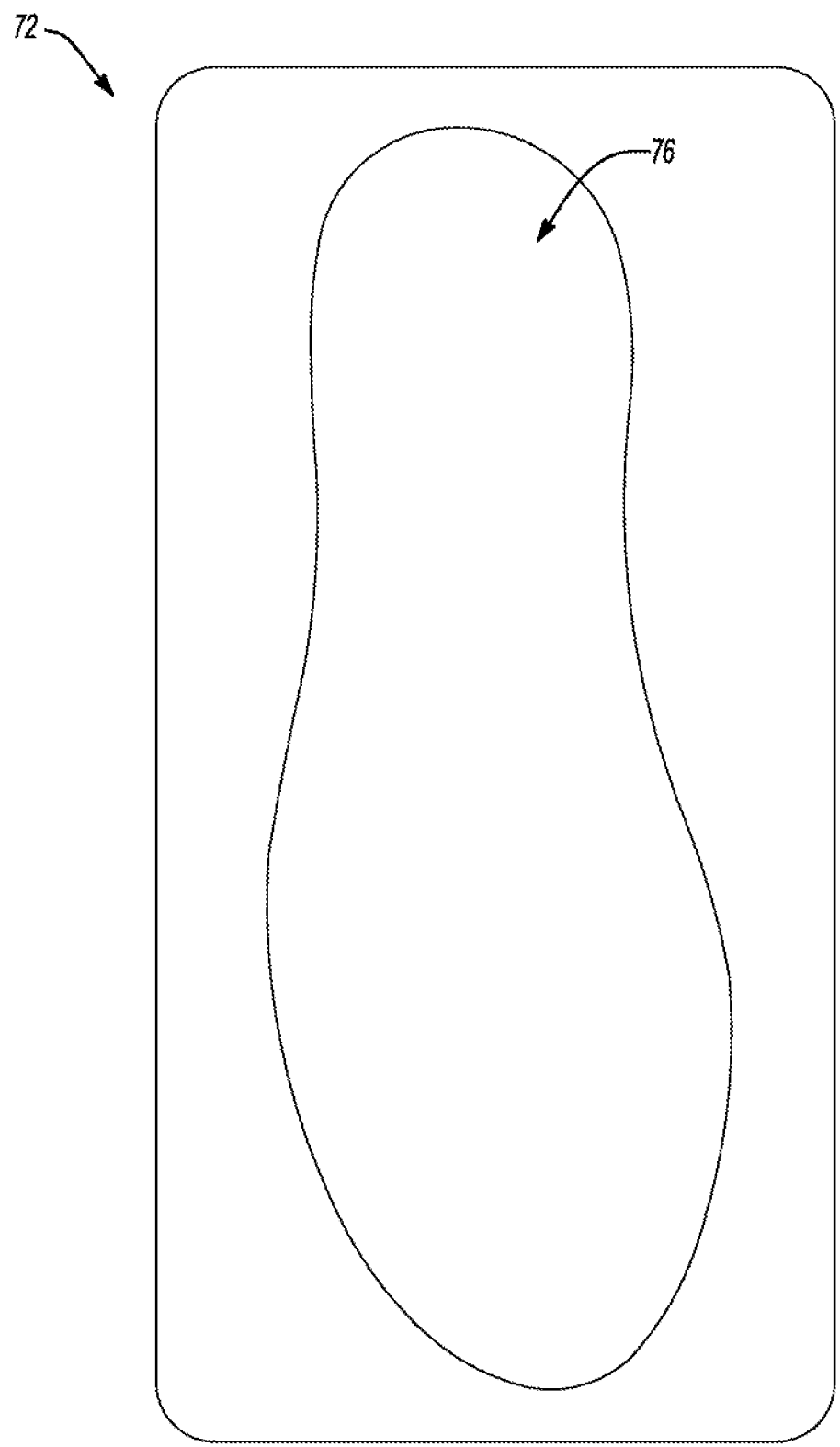
FIG. 31 is a plan view of an upper half of the mold too of FIG. 29.
Figure 32:
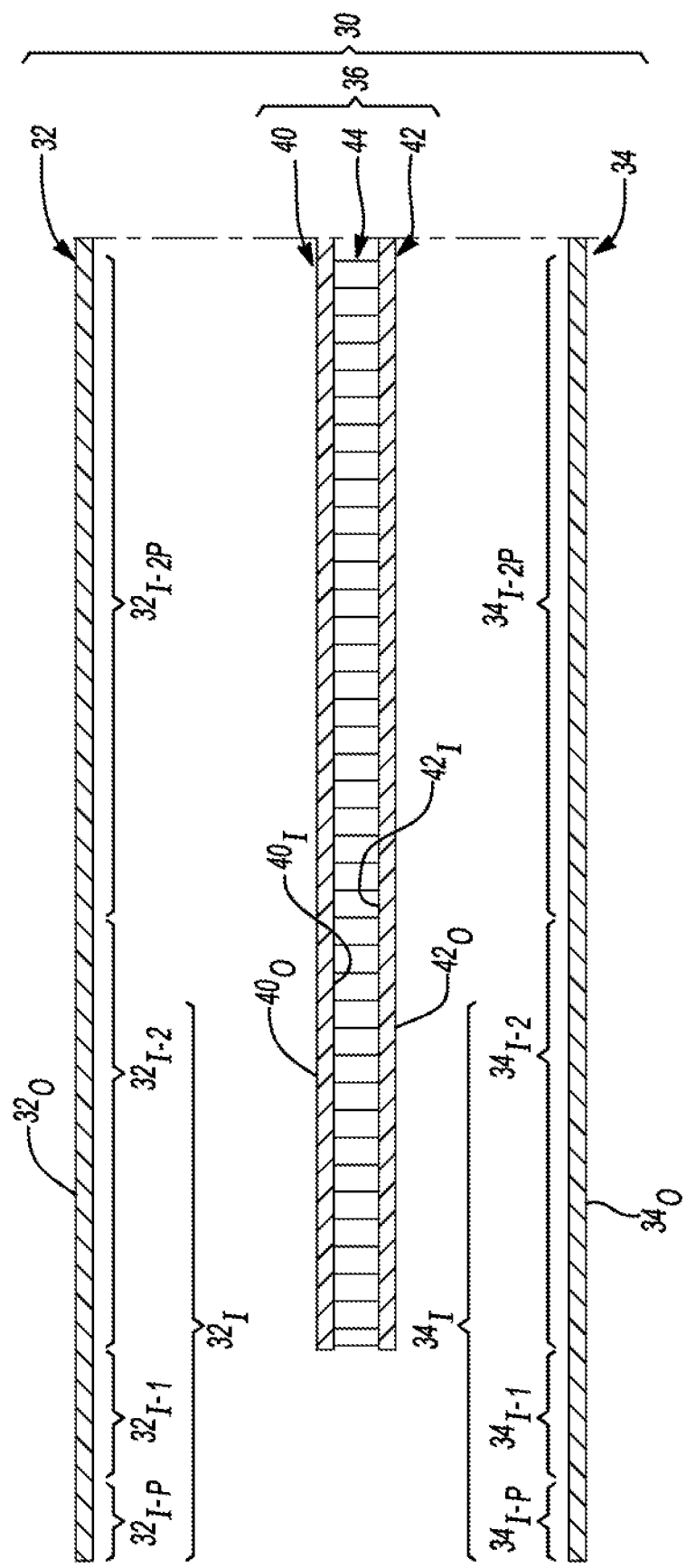
FIG. 32 is an exploded cross-sectional view of an exemplary cushioning arrangement.
Figure 33:
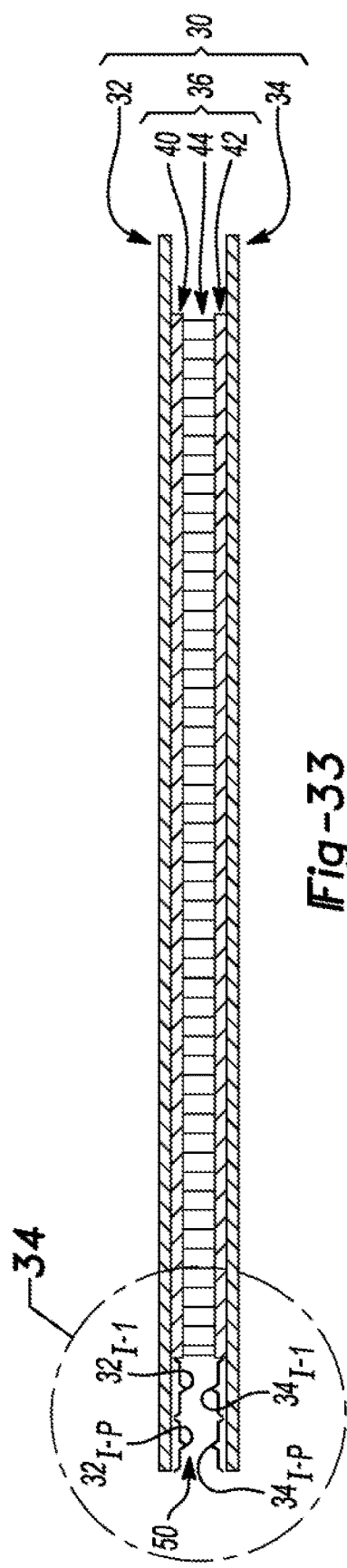
FIG. 33 is a cross-sectional view of the cushioning arrangement of FIG. 32 arranged in a partially assembled state.
Figure 34:
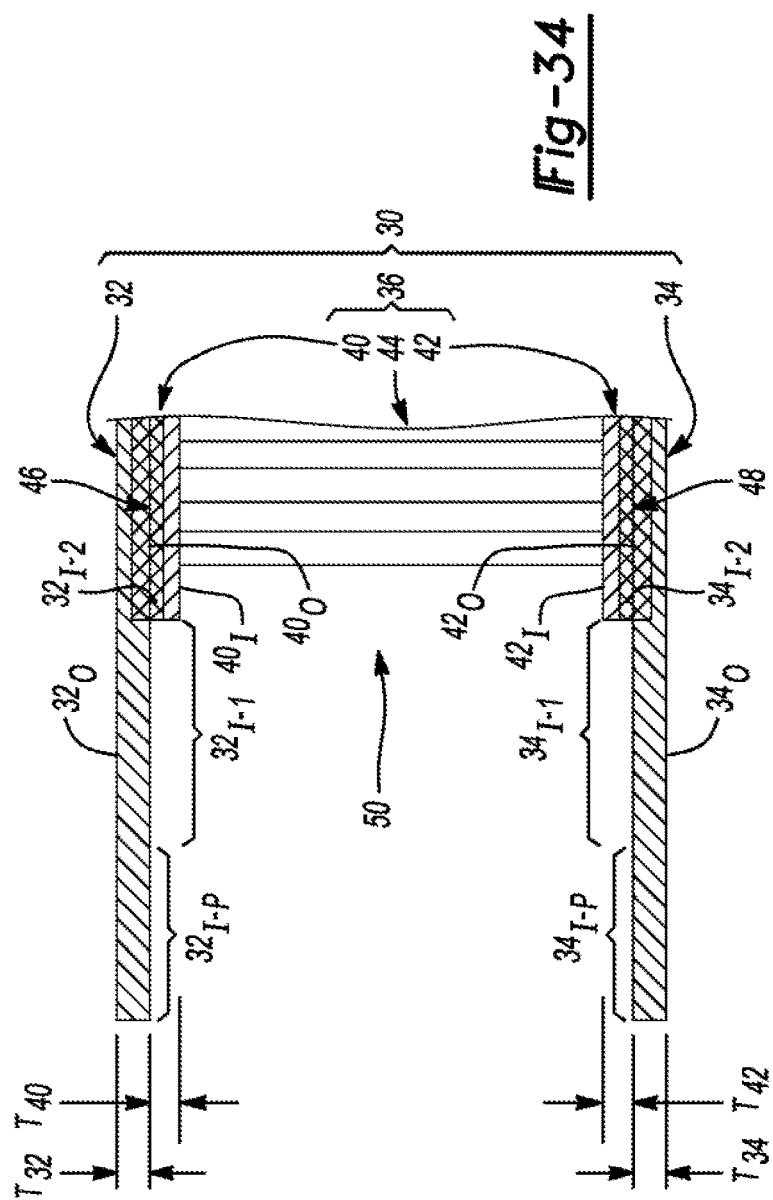
FIG. 34 is an enlarged cross-sectional view of a portion of the cushioning arrangement of FIG. 33 identified by Line 34 of FIG. 33.
Figure 35:
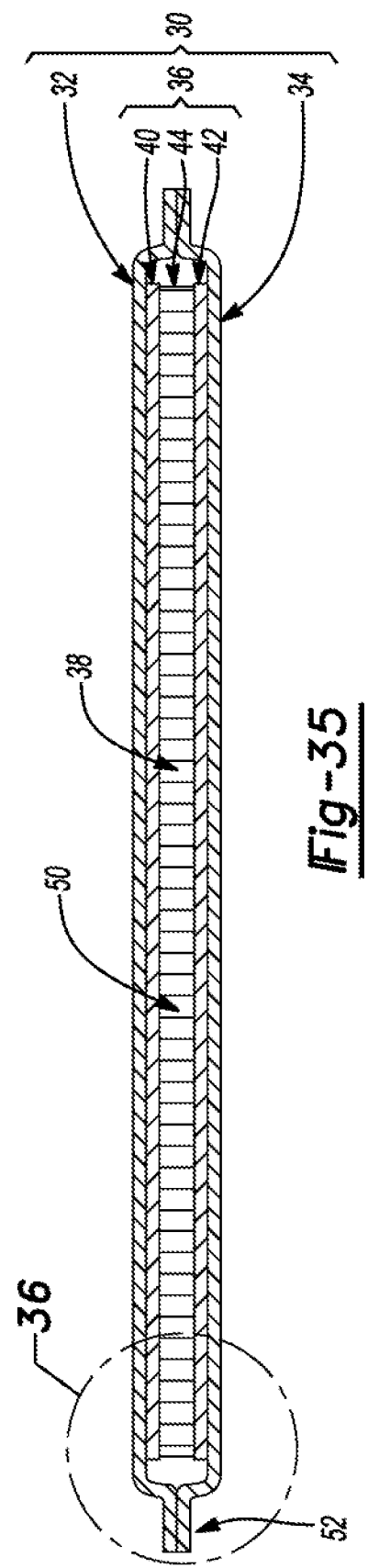
FIG. 35 is a cross-sectional view of the cushioning arrangement of FIG. 33 arranged in a further partially assembled state.
Figure 36:
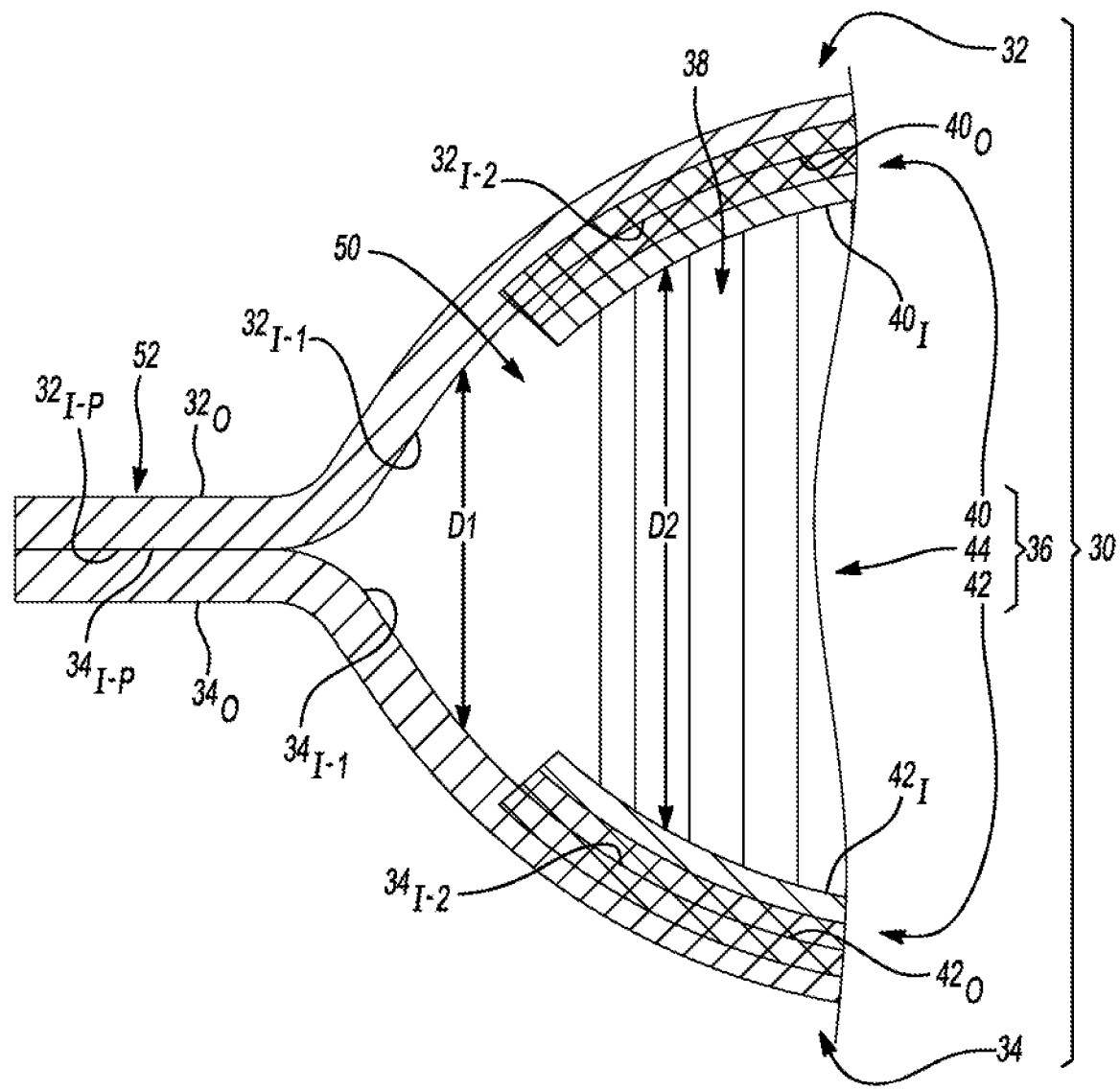
FIG. 36 is an enlarged cross-sectional view of a portion of the cushioning arrangement of FIG. 35 identified by Line 36 of FIG. 35.

As described above, the mold surfaces 76 of the second mold tool 70 may include virtually any shape to provide the fluid-filled chamber 38 with virtually any pattern. A portion of an exemplary fluid-filled chamber is shown generally at $38_{x1}$ in FIG. 28. As shown in FIGS. 29-31, corresponding mold surfaces 76 of an exemplary mold tool 70 (see, for example, FIG. 29) may shape the cushioning arrangement 30 such that the third spaced apart distance (D3) is not eliminated or not reduced to zero at the region $R_{54}$ defined by the opposing portions of the inner surface $40_I$ of the first tensile layer 40 and the inner surface $42_I$ of the second tensile layer 42. Accordingly, although the inner surface $40_I$ of the first tensile layer 40 and the inner surface $42_I$ of the second tensile layer 42 are closer to another at the region $R_{54}$ (in comparison to the second spaced apart distance (D2)), in such a configuration, the materials of the first barrier sheet 32, the second barrier sheet 34, the first tensile layer 40, the second tensile layer 42, and the tensile elements 44 extending therebetween are not melded together (unlike the above-described exemplary configuration at FIG. 16 that otherwise defines the third melded portion 54).

Figure 28:
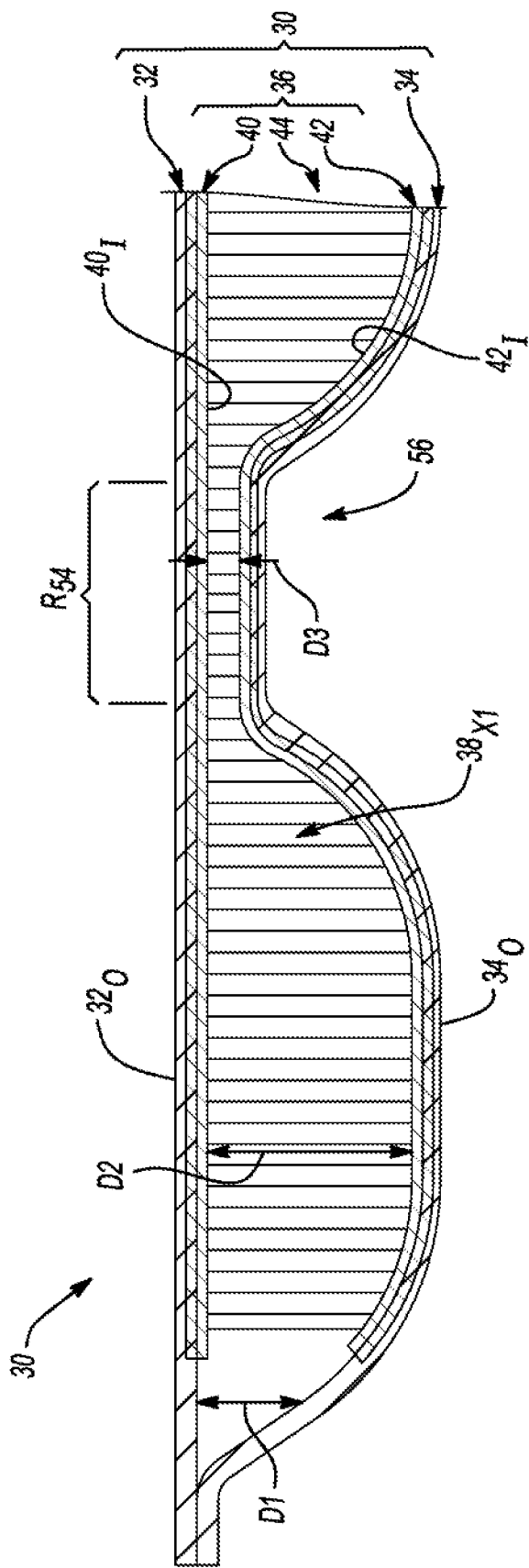
FIG. 28 is a cross-sectional view of a portion of an exemplary cushioning arrangement.

Furthermore, as shown in FIG. 28, the region $R_{54}$ defining the fluid-filled chamber $38_{x1}$ may be further defined by one or more recess, trench, or valley 56. In an example, the outer surface $32_O$ of the first barrier sheet 32 may be substantially flat or planar at the region $R_{54}$ whereas the outer surface $34_O$ of second barrier sheet 34 may define the recess, trench, or valley 56 at the region $R_{54}$.

The exemplary configuration of the fluid-filled chamber $38_{x1}$ may provide one or more advantageous functions. In an example, the region $R_{54}$ defining the fluid-filled chamber $38_{x1}$ may provide flexibility at one or more regions of the cushioning arrangement 30. Alternatively, or in addition to the mold surfaces 76 of the mold tool 70 forming the region $R_{54}$ defining the fluid-filled chamber $38_{x1}$, an amount of heat and/or closing pressure of the mold tool 70 may contribute to the formation of the region $R_{54}$ defining the fluid-filled chamber $38_{x1}$.

Figure 37:
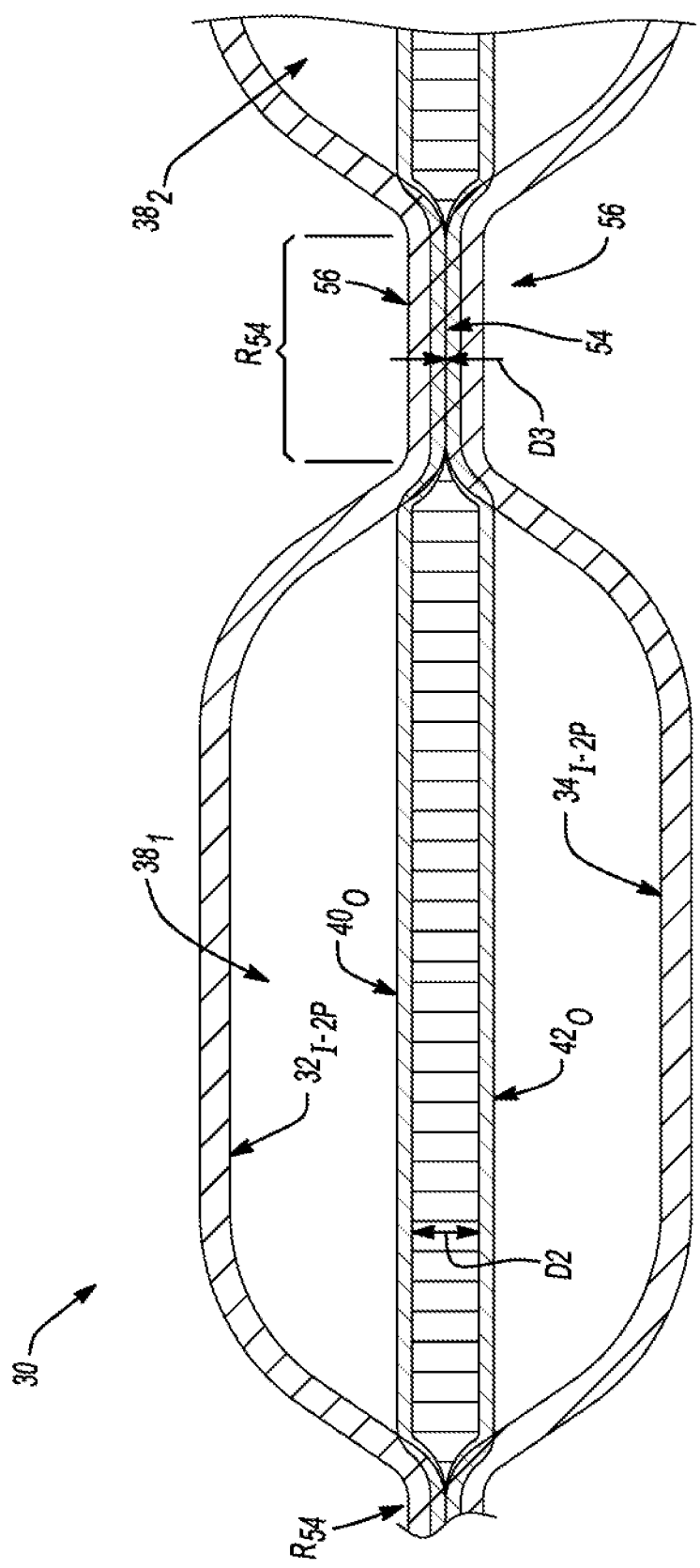
FIG. 37 is a cross-sectional view of a portion of the exemplary cushioning arrangement of FIG. 32-36 after being formed by a mold tool.
Figure 38:
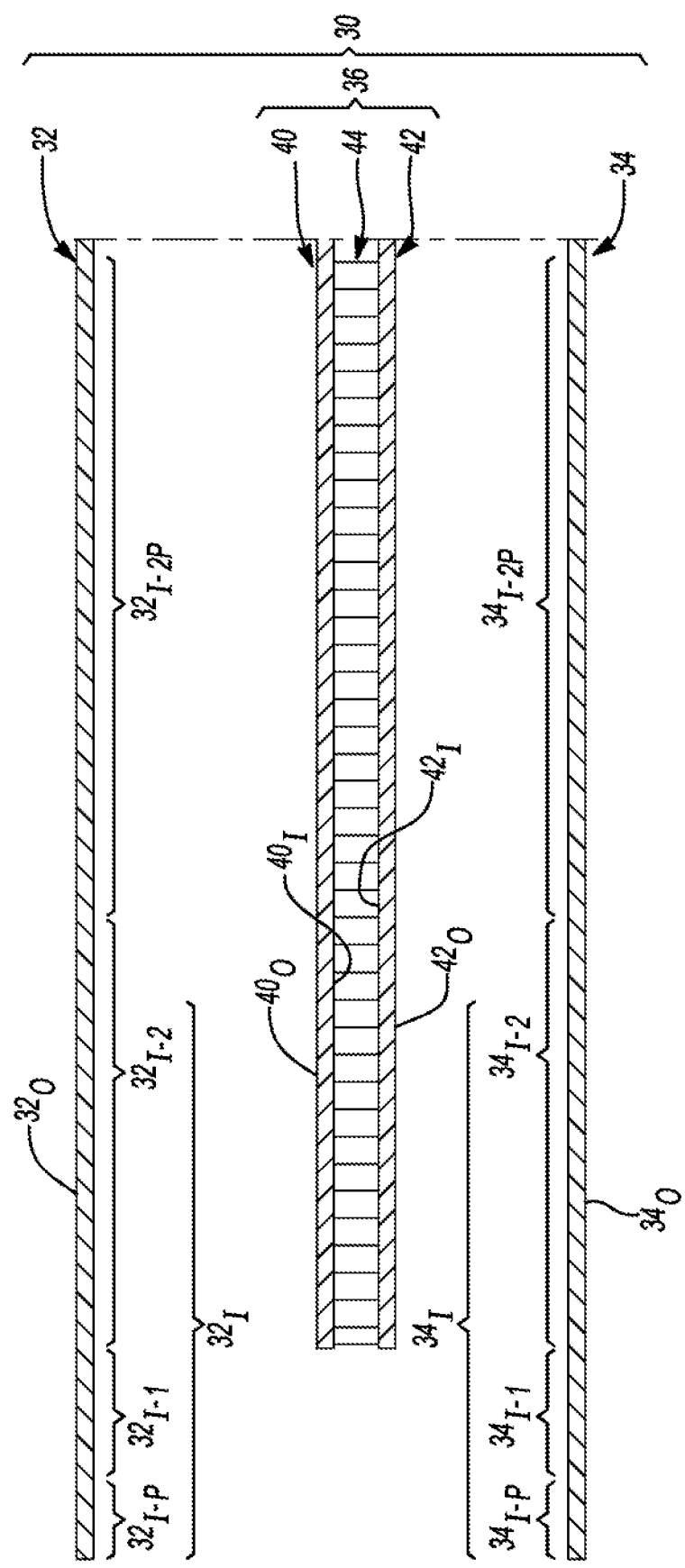
FIG. 38 is an exploded cross-sectional view of an exemplary cushioning arrangement.
Figure 41:
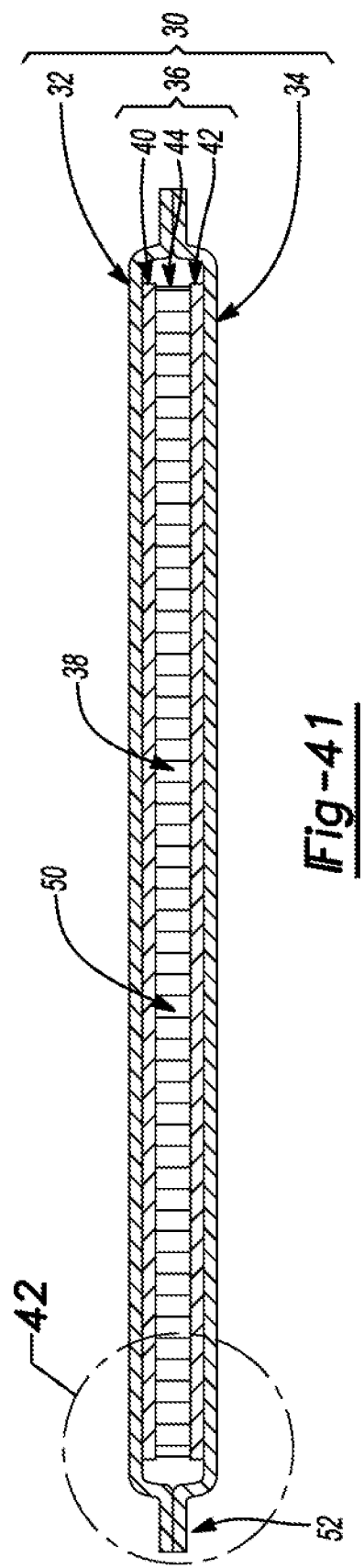
FIG. 41 is a cross-sectional view of the cushioning arrangement of FIG. 39 arranged in a further partially assembled state.
Figure 42:
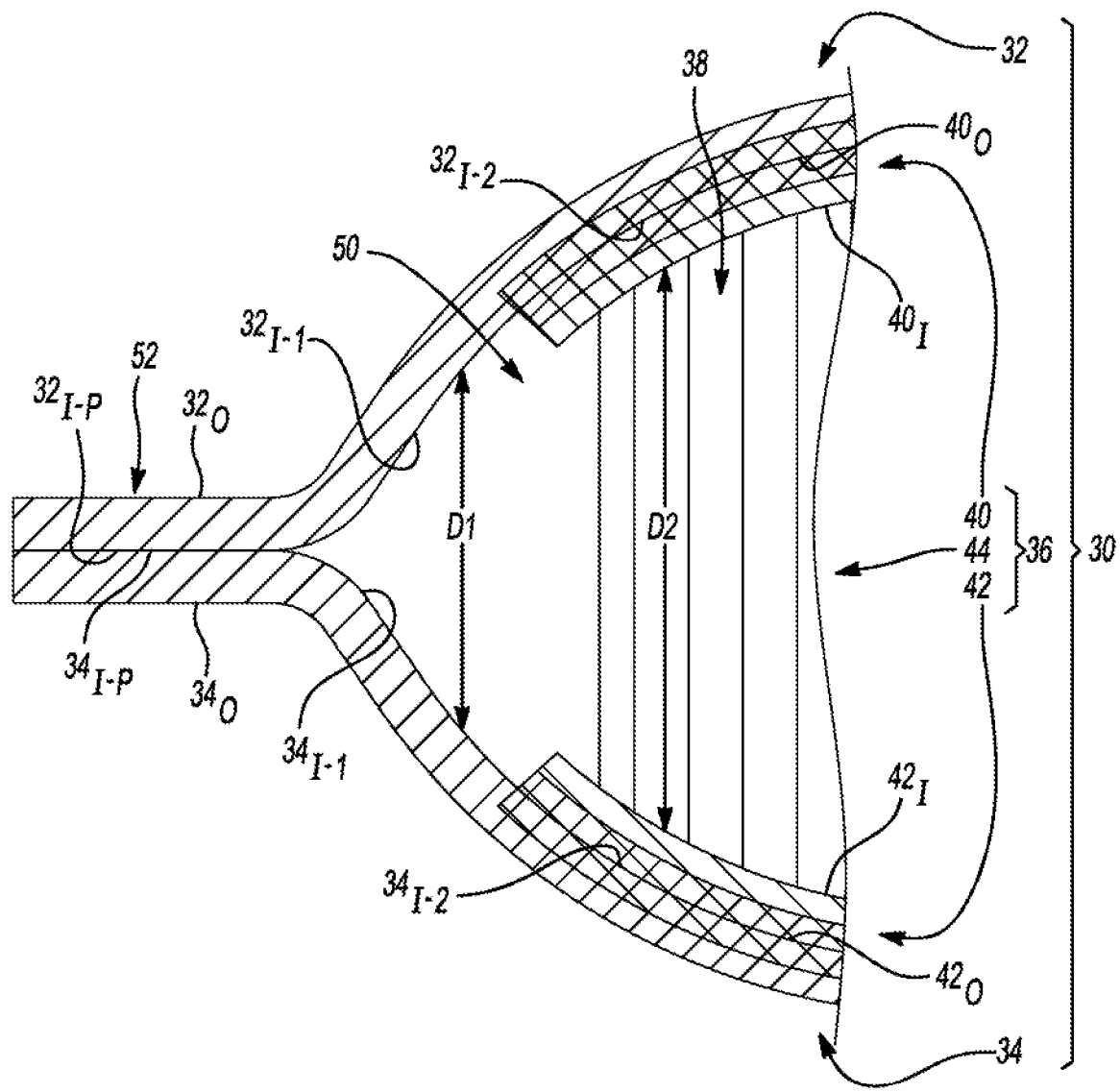
FIG. 42 is an enlarged cross-sectional view of a portion of the cushioning arrangement of FIG. 41 identified by Line 42 of FIG. 41.

Although an exemplary cushioning arrangement 30 is described above at FIGS. 9-11 to include: (1) attachment of the outer surface $40_O$ of the first tensile layer 40 of the tensile member 36 to the second inner surface portion $32_{I-2}$ of the inner surface $32_I$ of the first barrier sheet 32 by melding the material of the first tensile layer 40 and the material of the first barrier sheet 32 to form a first melded portion 46 (see, for example, FIG. 11) and (2) attachment of the outer surface $42_O$ of the second tensile layer 42 of the tensile member 36 to the second inner surface portion $34_{I-2}$ of the inner surface $34_I$ of the second barrier sheet 34 by melding the material of the second tensile layer 42 and the material of the second barrier sheet 34 to form a second melded portion 48 (see, for example, FIG. 11), some implementations of a cushioning arrangement may not include such a configuration. For example, as shown at FIGS. 32-37: (1) one or more portions $32_{I-2P}$ (see, for example, FIGS. 32 and 37) of the second inner surface portion $32_{I-2}$ of the inner surface $32_I$ of the first barrier sheet 32 is not attached or melded to the outer surface $40_O$ of the first tensile layer 40 of the tensile member 36 and (2) one or more portions $34_{I-2P}$ (see, for example, FIGS. 32 and 37) of the second inner surface portion $34_{I-2}$ of the inner surface 34I of the second barrier sheet 34 is not attached or melded to the outer surface $42_O$ of the second tensile layer 42 of the tensile member 36. As shown in FIG. 37, in such implementations, the non-attachment or non-melding of the above-described surfaces may be located between regions $R_{54}$ that form third melded portions 54.

The exemplary configuration of the cushioning arrangement 30 described above at FIGS. 32-37, may result from one or more of a combination of not heating (i.e., not melding) selected portions of the cushioning arrangement 30 when it is placed in the mold tool 58 and applying adhesive (e.g., a hot melt adhesive) to selected portions of the cushioning arrangement 30 for attaching selected portions of the cushioning arrangement 30 prior to introducing the cushioning arrangement 30 in the mold tool 58. In an example, for forming the cushioning arrangement described above at FIG. 37, an adhesive may be arranged over some of the second inner surface portion $32_{I-2}$, $34_{I-2}$ (as shown, for example, in FIG. 32) of the inner surfaces 32I, 34I of the first barrier sheet 32 and the second barrier sheet 34 corresponding to the regions $R_{54}$ that form third melded portions 54 for the purpose of attaching the first barrier sheet 32 and the second barrier sheet 34 to the tensile member 36 prior to arranging the first barrier sheet 32, the second barrier sheet 34, and the tensile member 36 in the mold tool 58. Thereafter, when the cushioning arrangement is inflated within the mold tool 58 while the third melded portions 54 are formed by the mold tool 58, the pressurized fluid introduced into the cushioning arrangement 30 maintains some of the second inner surface portions $32_{I-2P}$, $34_{I-2P}$, of the inner surfaces $32_I$, $34_I$ of the first barrier sheet 32 and the second barrier sheet 34 at a spaced-apart distance with respect to each of the outer surface $40_O$ of the first tensile layer 40 of the tensile member 36 and the outer surface $42_O$ of the second tensile layer 42 of the tensile member 36.

Figure 43:
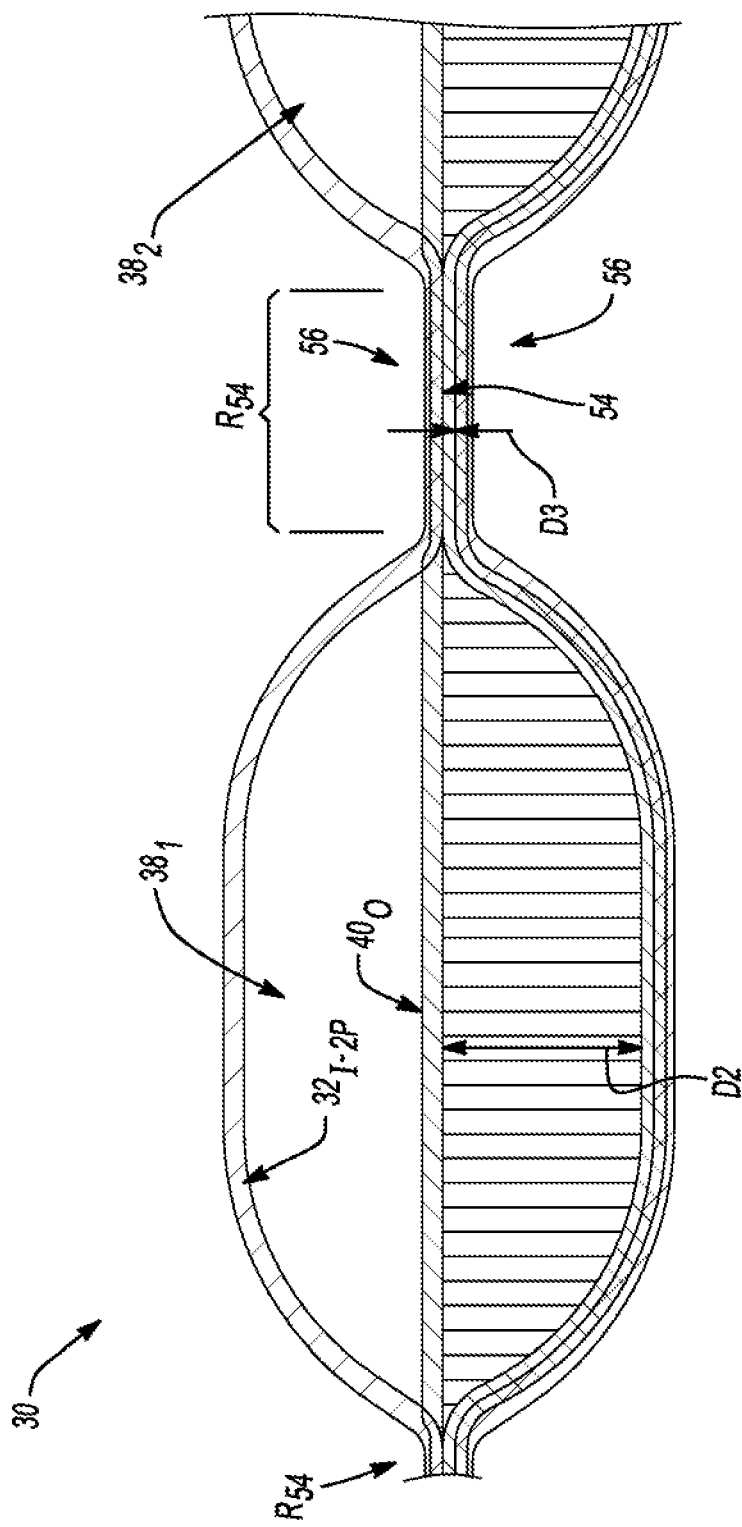
FIG. 43 is a cross-sectional view of a portion of the exemplary cushioning arrangement of FIG. 38-42 after being formed by a mold tool.
Figure 44:
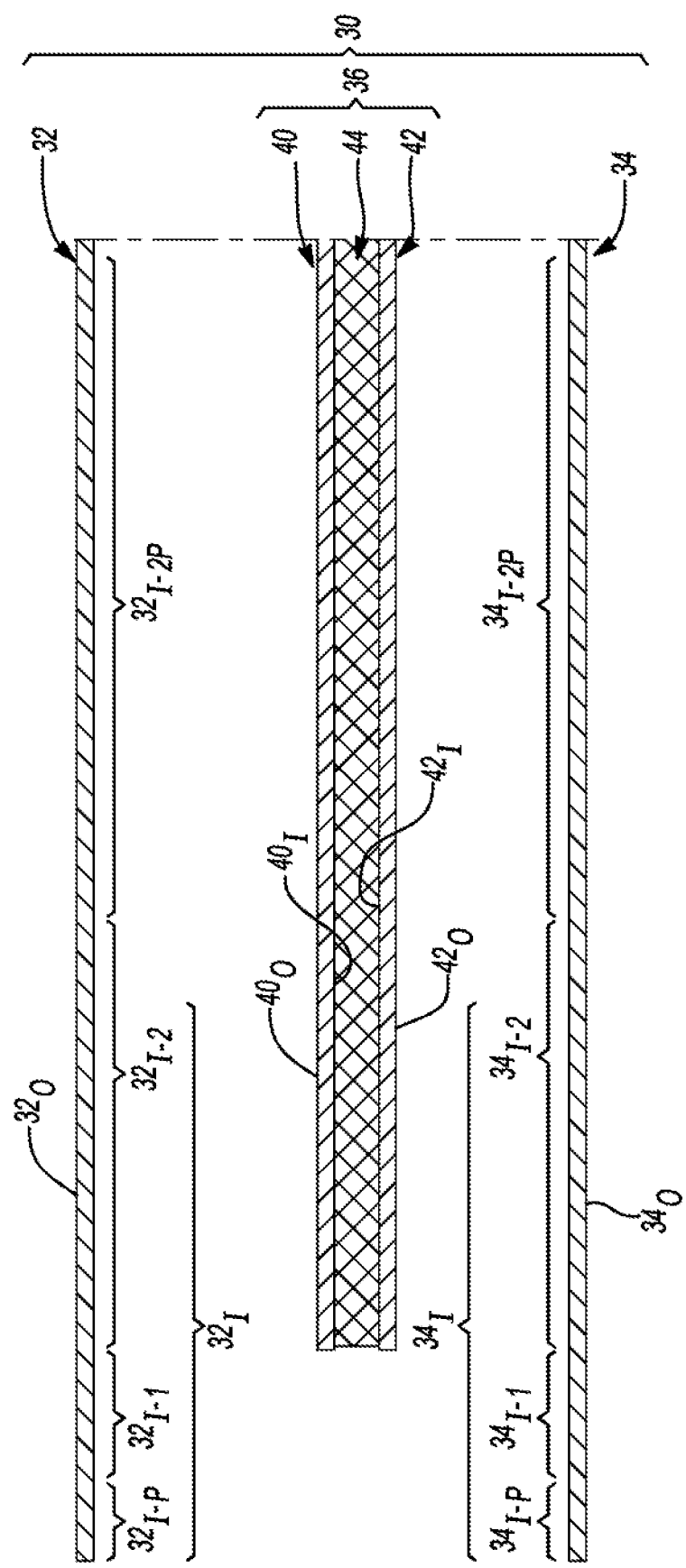
FIG. 44 is an exploded cross-sectional view of an exemplary cushioning arrangement.
Figure 45:
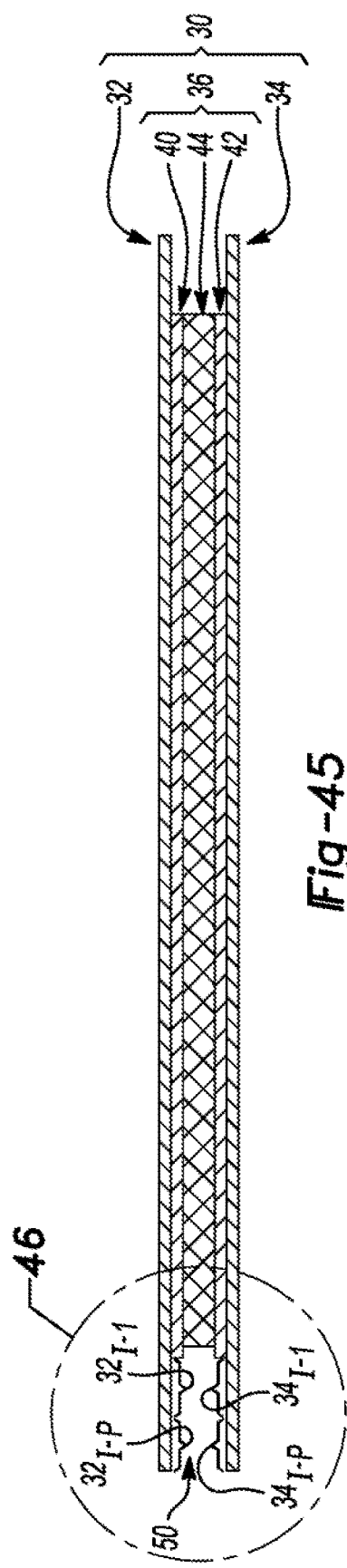
FIG. 45 is a cross-sectional view of the cushioning arrangement of FIG. 44 arranged in a partially assembled state.
Figure 46:
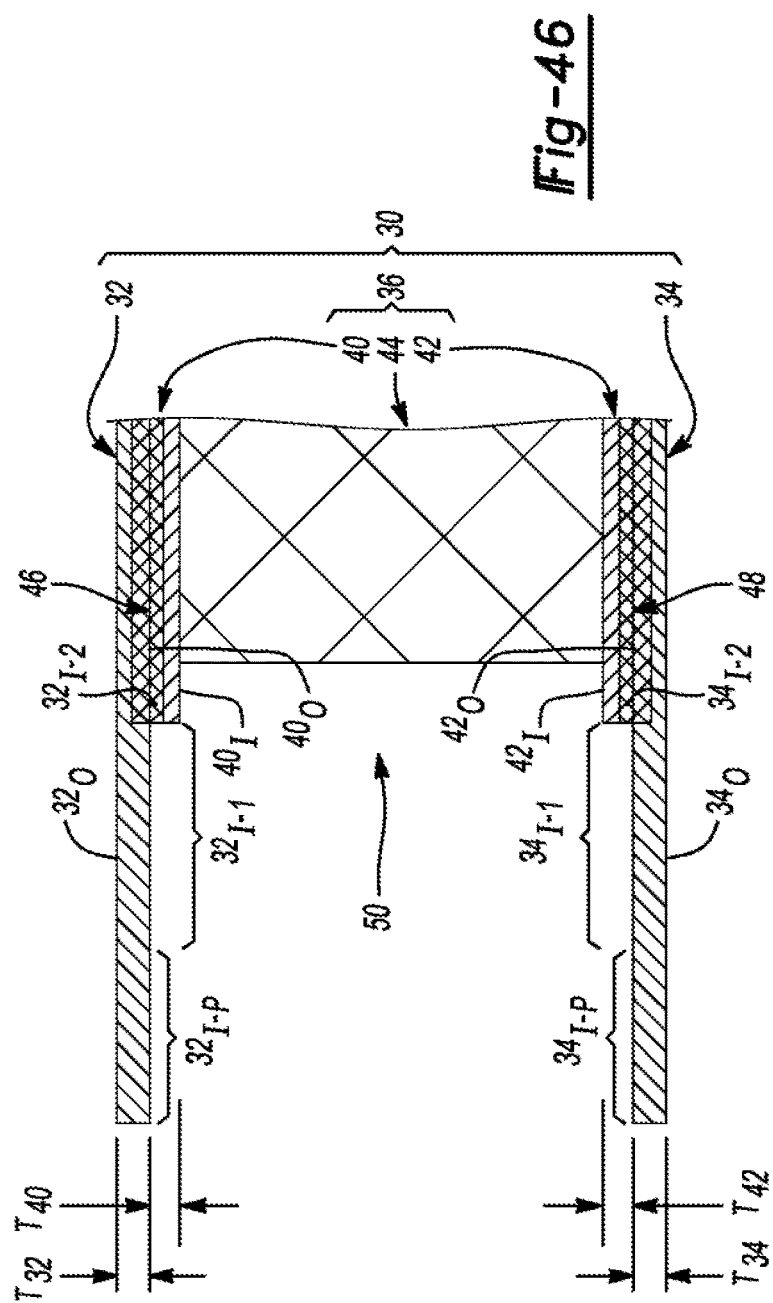
FIG. 46 is an enlarged cross-sectional view of a portion of the cushioning arrangement of FIG. 45 identified by Line 46 of FIG. 45.
Figure 47:
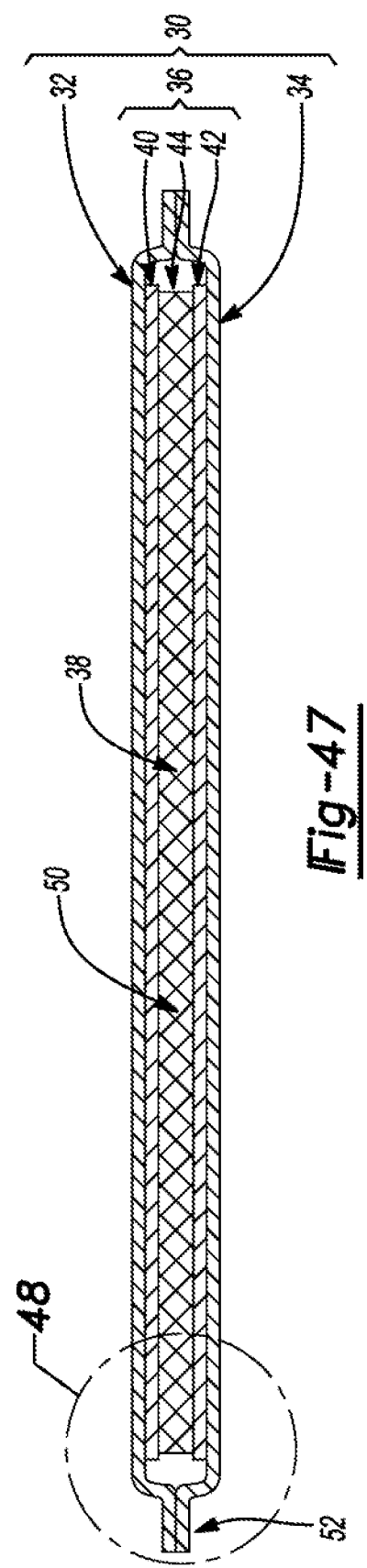
FIG. 47 is a cross-sectional view of the cushioning arrangement of FIG. 45 arranged in a further partially assembled state.
Figure 48:
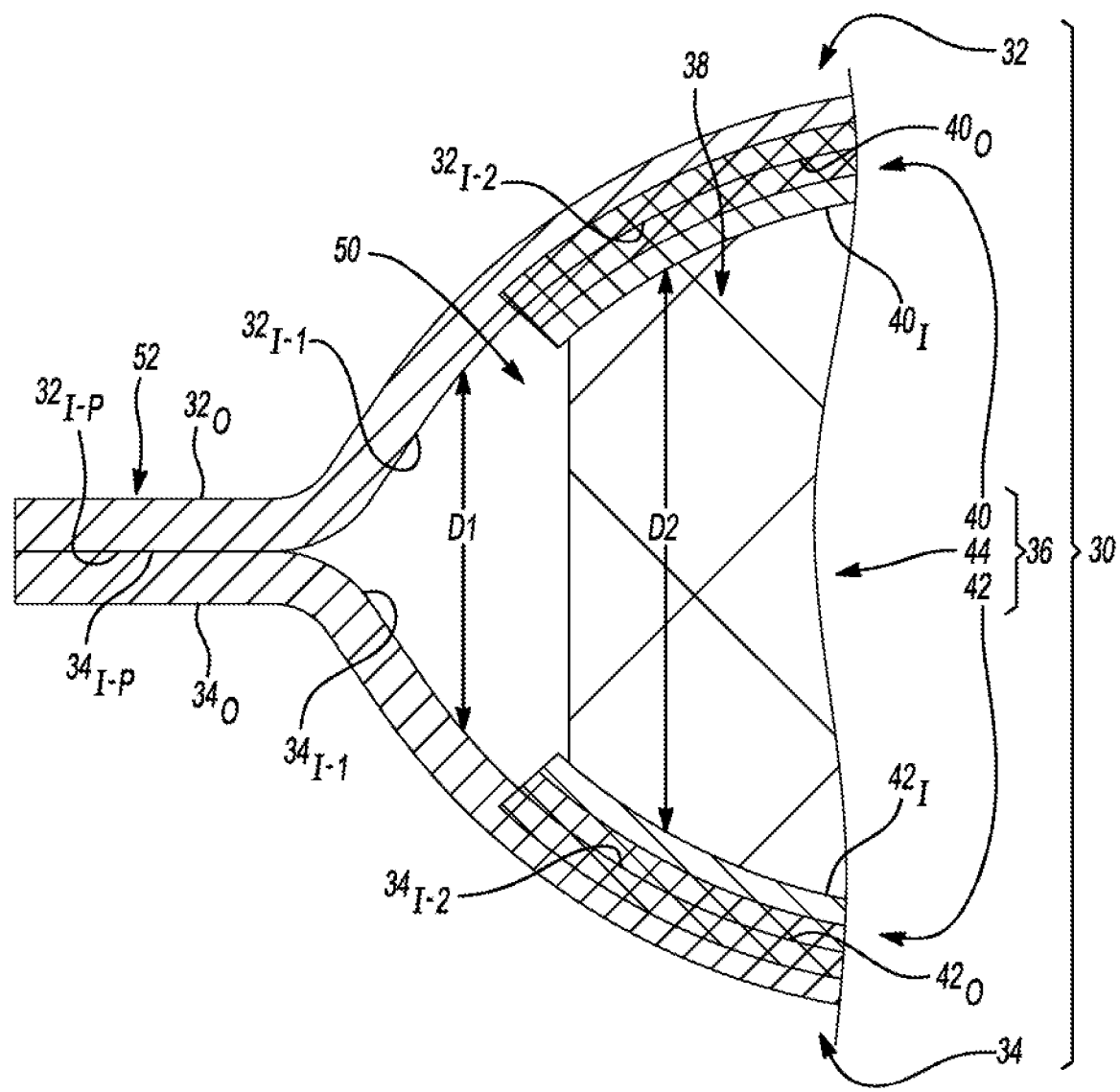
FIG. 48 is an enlarged cross-sectional view of a portion of the cushioning arrangement of FIG. 47 identified by Line 48 of FIG. 47.
Figure 49:
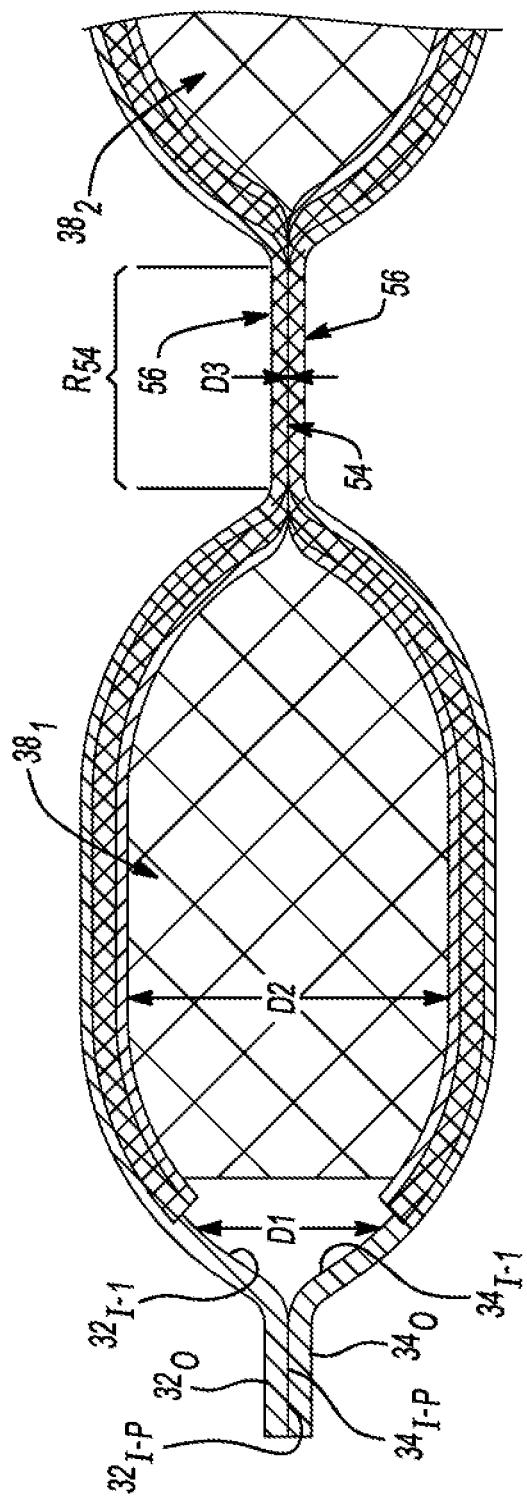
FIG. 49 is a cross-sectional view of a portion of the exemplary cushioning arrangement of FIG. 44-48 after being formed by a mold tool.

In another example, although an exemplary cushioning arrangement 30 is described above at FIGS. 9-11 to include: (1) attachment of the outer surface $40_O$ of the first tensile layer 40 of the tensile member 36 to the second inner surface portion $32_{I-2}$ of the inner surface $32_I$ of the first barrier sheet 32 by melding the material of the first tensile layer 40 and the material of the first barrier sheet 32 to form a first melded portion 46 (see, for example, FIG. 11) and (2) attachment of the outer surface $42_O$ of the second tensile layer 42 of the tensile member 36 to the second inner surface portion $34_{I-2}$ of the inner surface 34I of the second barrier sheet 34 by melding the material of the second tensile layer 42 and the material of the second barrier sheet 34 to form a second melded portion 48 (see, for example, FIG. 11), some implementations of a cushioning arrangement may not include such a configuration. For example, as shown at FIGS. 38-43: (1) one or more portions $32_{I-2P}$ (see, for example, FIGS. 38 and 43) of the second inner surface portion $32_{I-2}$ of the inner surface $32_I$ of the first barrier sheet 32 is not attached or melded to the outer surface $40_O$ of the first tensile layer 40 of the tensile member 36 while (2) one or more portions $341_{I-2P}$ (see, for example, FIGS. 38 and 43) of the second inner surface portion $34_{I-2}$ of the inner surface $34_I$ of the second barrier sheet 34 are attached or melded to the outer surface $42_O$ of the second tensile layer 42 of the tensile member 36 by way of, for example, heating and melding in the mold tool 58 as described above at FIGS. 18-23. As shown in FIG. 43, is such implementations, the non-attachment or non-melding of the one or more portions $32_{I-2P}$ of the second inner surface portion $32_{I-2}$ of the inner surface $32_I$ of the first barrier sheet 32 with respect to the outer surface $40_O$ of the first tensile layer 40 of the tensile member 36 may be located between regions $R_{54}$ that form third melded portions 54.

The exemplary configuration of the cushioning arrangement 30 described above at FIGS. 38-43, may result from one or more of a combination of not heating (i.e., not melding) selected portions of the cushioning arrangement 30 when it is placed in the mold tool 58 and applying adhesive (e.g., a hot melt adhesive) to selected portions of the cushioning arrangement 30 for attaching selected portions of the cushioning arrangement 30 prior to introducing the cushioning arrangement 30 in the mold tool 58. In an example, for forming the cushioning arrangement described above at FIG. 43, an adhesive may be arranged over some of at least one of the second inner surface portion $32_{I-2}$ of the inner surface $32_I$ of the first barrier sheet 32 and the second inner surface portion $34_{I-2}$ of the inner surface $34_I$ of the second barrier sheet 34 corresponding to the regions $R_{54}$ that form third melded portions 54 for the purpose of attaching at least one of the first barrier sheet 32 and the second barrier sheet 34 to the tensile member 36 prior to arranging the first barrier sheet 32, the second barrier sheet 34, and the tensile member 36 in the mold tool 58. Thereafter, when the cushioning arrangement is inflated within the mold tool 58 while the third melded portions 54 are formed by the mold tool 58, the pressurized fluid introduced into the cushioning arrangement 30 maintains some of the second inner surface portion $32_{I-2P}$ of the inner surface $32_I$ of the first barrier sheet 32 at a spaced-apart distance with respect to the outer surface $40_O$ of the first tensile layer 40 of the tensile member 36.

With respect to the exemplary cushioning arrangements 30 described above at FIGS. 32-37 and 38-43, the adhesive (e.g., a hot melt adhesive) may be provided in any desirable ways or configurations. For example, the adhesive may be provided in the form of a sheet and arranged between or disposed adjacent any of the outer surface $40_O$ of the first tensile layer 40 of the tensile member 36, the outer surface $42_O$ of the second tensile layer 42 of the tensile member 36, the second inner surface portion $32_{I-2}$ of the inner surface $32_I$ of the first barrier sheet 32, and the second inner surface portion $34_{I-2}$ of the inner surface $34_I$ of the second barrier sheet 34. In another example, the adhesive may be provided in the form of a cap layer of the barrier sheet. The cap layer may be a co-extruded cap layer of the barrier sheet, or may be a laminated cap layer of the barrier sheet. The cap layer comprising the adhesive may form substantially all of the inner surface $32_I$ of the first barrier sheet 32. The cap layer comprising the adhesive may form substantially all of the inner surface $34_I$ of the second barrier sheet 34. In another example, the adhesive could be embedded in the tensile fabric. In such an implementation, the adhesive could be a hot melt yarn (e.g., a monofilament yarn) having a polyester core and a TPU sheath.

Referring to FIGS. 44-49, an exemplary cushioning arrangement is shown generally at 30 having a tensile member 36 including a first tensile layer 40, a second tensile layer 42 and a plurality of tensile elements 44 extending between and connecting the first tensile layer 40 to the second tensile layer 42. The tensile member 36 is substantially similar to tensile members of the cushioning arrangements 30 described above with exception to the arrangement of tensile elements 44 extending between and connecting an inner surface $40_I$ $42_I$ of the first tensile layer 40 and the second tensile layer 42. In an example, the plurality of tensile elements 44 are not arranged in a non-parallel or overlapping relationship. For example, the non-parallel or overlapping relationship may be defined by as crisscross pattern. The remaining aspects of the tensile member 36 are substantially similar to the tensile member 36 of FIGS. 9-13 and are not described in further detail.

The following Clauses provide exemplary configurations of a fluid-filled chamber and methods for making a fluid-filled chamber, as described above.

Clause 1: A fluid-filled chamber comprising: a first barrier sheet formed from a first thermoplastic material; a second barrier sheet attached to the first barrier sheet and formed from a second thermoplastic material, the first barrier sheet and the second barrier sheet cooperating to define an internal cavity; a tensile member disposed within the internal cavity and formed from a third thermoplastic material; and a first weld that attaches the first barrier sheet, the second barrier sheet, and the tensile member together by melding the first thermoplastic material of the first barrier sheet, the second thermoplastic material of second barrier sheet, and the third thermoplastic material of the tensile member.

Clause 2: The fluid-filled chamber of Clause 1, further comprising a second weld that extends continuously around a perimeter of the fluid-filled chamber to define an outer edge of the fluid-filled chamber.

Clause 3: The fluid-filled chamber of Clause 2, wherein the second weld joins the first barrier sheet and the second barrier sheet.

Clause 4: The fluid-filled chamber of Clause 3, wherein the second weld is spaced apart from the first weld.

Clause 5: The fluid-filled chamber of Clause 3, wherein the first weld contacts and extends from the second weld.

Clause 6: The fluid-filled chamber of Clause 1, wherein the third thermoplastic material of the tensile member is foamed.

Clause 7: The fluid-filled chamber of Clause 1, wherein the tensile member is formed from a sheet of foamed thermoplastic material.

Clause 8: The fluid-filled chamber of Clause 1, wherein the tensile member includes a plurality of tensile elements extending between the first barrier sheet and the second barrier sheet.

Clause 9: The fluid-filled chamber of Clause 8, wherein the plurality of tensile elements extend between and connect a first tensile layer that opposes the first barrier sheet and a second tensile layer that opposes the second barrier sheet.

Clause 10: The fluid-filled chamber of Clause 9, wherein the first tensile layer is attached to the first barrier sheet and the second tensile layer is attached to the second barrier sheet.

Clause 11: The fluid-filled chamber of Clause 1, wherein the tensile member comprises a textile.

Clause 12: The fluid-filled chamber of Clause 11, wherein the textile is a knit textile.

Clause 13: The fluid-filled chamber of Clause 12, wherein the knit textile comprises a first tensile layer, a second tensile layer, and tensile strands extending between and connecting the first tensile layer and the second tensile layer.

Clause 14: The fluid-filled chamber of Clause 13, wherein the first tensile layer is opposes the first barrier layer and the second tensile layer opposes the second barrier layer.

Clause 15: The fluid-filled chamber of Clause 14, wherein the first tensile layer is attached to the first barrier layer and the second tensile layer is attached to the second barrier layer.

Clause 16: The fluid-filled chamber of any of the preceding clauses, wherein the internal cavity receives a pressurized fluid.

Clause 17: The fluid-filled chamber of Clause 16, wherein the pressurized fluid is air.

Clause 18: The fluid-filled chamber of any of the preceding clauses, wherein the first thermoplastic material, the second thermoplastic material, and the third thermoplastic material comprise one or more thermoplastic polyurethane (TPU) polymers.

Clause 19: The fluid-filled chamber of any of the preceding clauses, wherein a melting temperature of the first thermoplastic material, a melting temperature of the second thermoplastic material, and a melting temperature of the third thermoplastic material are all within a range of approximately 20° C.

Clause 20: The fluid-filled chamber of any of the preceding clauses, wherein a melting temperature of the first thermoplastic material, a melting temperature of the second thermoplastic material, and a melting temperature of the third thermoplastic material are approximately the same.

Clause 21: The fluid-filled chamber of any of the preceding clauses, wherein at least two of the first thermoplastic material, the second thermoplastic material, and the third thermoplastic material are formed from the same material.

Clause 22: An article of footwear or equipment incorporating the fluid-filled chamber of any of the preceding clauses.

Clause 23: A method of making a fluid-filled chamber, the method comprising: receiving a first barrier sheet formed from a first thermoplastic material; receiving a second barrier sheet formed from a second thermoplastic material; receiving a tensile member formed from a third thermoplastic material; positioning the tensile member between the first barrier sheet and the second barrier sheet; and welding the first barrier sheet, the second barrier sheet, and the tensile member together at a first weld by melding the first thermoplastic material of the first barrier sheet, the second thermoplastic material of second barrier sheet, and the third thermoplastic material of the tensile member.

Clause 24: The method of Clause 23, further comprising forming a second weld that extends continuously around a perimeter of the fluid-filled chamber to define an outer edge of the fluid-filled chamber.

Clause 25: The method of Clause 24, wherein forming a second weld that extends continuously around a perimeter of the fluid-filled chamber includes joining the first barrier sheet and the second barrier sheet.

Clause 26: The method of Clause 25, wherein welding the first barrier sheet, the second barrier sheet, and the tensile member together at the first weld includes spacing the first weld apart from the second weld.

Clause 27: The method of Clause 25, wherein welding the first barrier sheet, the second barrier sheet, and the tensile member together at the first weld includes contacting the first weld with the second weld such that the first weld extends from the second weld.

Clause 28: The method of Clause 23, wherein forming the tensile member from the third thermoplastic material includes forming the tensile member from a foamed thermoplastic material.

Clause 29: The method of Clause 23, wherein forming the tensile member from the third thermoplastic material includes forming the tensile member from a sheet of foamed thermoplastic material.

Clause 30: The method of Clause 23, wherein forming the tensile member from the third thermoplastic material includes providing the tensile member with a plurality of tensile elements extending between the first barrier sheet and the second barrier sheet.

Clause 31: The method of Clause 30, wherein providing the tensile member with a plurality of tensile elements includes extending the plurality of tensile elements between a first tensile layer that opposes the first barrier sheet and a second tensile layer that opposes the second barrier sheet, the plurality of tensile elements connecting the first tensile layer and the second tensile layer.

Clause 32: The method of Clause 31, further comprising attaching the first tensile layer to the first barrier sheet and attaching the second tensile layer to the second barrier sheet.

Clause 33: The method of Clause 23, wherein forming the tensile member from the third thermoplastic material includes forming the tensile member from a textile.

Clause 34: The method of Clause 23, wherein forming the tensile member from a textile includes forming the tensile member from a knit textile.

Clause 35: The method of Clause 34, wherein forming the tensile member from a knit textile includes forming the knit textile to include a first tensile layer, a second tensile layer, and tensile strands that extend between and connect the first tensile layer and the second tensile layer.

Clause 36: The method of Clause 35, further comprising positioning the tensile member such that the first tensile layer opposes the first barrier layer and the second tensile layer opposes the second barrier layer.

Clause 37: The method of Clause 36, further comprising attaching the first tensile layer to the first barrier layer and attaching the second tensile layer to the second barrier layer.

Clause 38: The method of any of the preceding clauses, further comprising providing an internal cavity of the fluid-filled chamber with a pressurized fluid.

Clause 39: The method of Clause 38, wherein providing the internal cavity with a pressurized fluid includes providing the internal cavity with pressurized air.

Clause 40: The method of any of the preceding clauses, wherein forming the first barrier sheet from a first thermoplastic material, forming the second barrier sheet from a second thermoplastic material, and forming the tensile member from a third thermoplastic material includes forming the first barrier sheet, the second barrier sheet, and the tensile member from one or more thermoplastic polyurethane (TPU) polymers.

Clause 41: The method of any of the preceding clauses, wherein forming the first barrier sheet from a first thermoplastic material, forming the second barrier sheet from a second thermoplastic material, and forming the tensile member from a third thermoplastic material includes forming the first barrier sheet, the second barrier sheet, and the tensile member from materials having melting temperatures that are all within a range of approximately 20° C.

Clause 42: The method of any of the preceding clauses, wherein forming the first barrier sheet from a first thermoplastic material, forming the second barrier sheet from a second thermoplastic material, and forming the tensile member from a third thermoplastic material includes forming the first barrier sheet, the second barrier sheet, and the tensile member from materials having melting temperatures that are approximately the same.

Clause 43: The method of any of the preceding clauses, wherein forming the first barrier sheet from a first thermoplastic material, forming the second barrier sheet from a second thermoplastic material, and forming the tensile member from a third thermoplastic material includes forming at least two of the first barrier sheet, the second barrier sheet, and the tensile member from the same material.

Clause 44: Incorporating the fluid-filled chamber of any of the preceding clauses into an article of footwear or equipment.

The foregoing description of the embodiments has been provided for purposes of illustration and description. It is not intended to be exhaustive or to limit the disclosure. Individual elements or feature of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluid-filled chamber comprising:
a first barrier sheet formed from a first material;
a second barrier sheet attached to the first barrier sheet and formed from a second material, the first barrier sheet and the second barrier sheet cooperating to define an internal cavity;
a tensile member disposed within the internal cavity and formed from a third material; and
a first weld that attaches the first barrier sheet, the second barrier sheet, and the tensile member together by melding the first material of the first barrier sheet, the second material of second barrier sheet, and the third material of the tensile member.

2. The fluid-filled chamber of claim 1, wherein the internal cavity receives a pressurized fluid.

3. The fluid-filled chamber of claim 1, wherein a melting temperature of the first material, a melting temperature of the second material, and a melting temperature of the third material are approximately the same.

4. The fluid-filled chamber of claim 1, wherein at least two of the first material, the second material, and the third material are formed from the same material.

5. The fluid-filled chamber of claim 1, further comprising a second weld that extends continuously around a perimeter of the fluid-filled chamber to define an outer edge of the fluid-filled chamber.

6. The fluid-filled chamber of claim 5, wherein the second weld joins the first barrier sheet and the second barrier sheet.

7. The fluid-filled chamber of claim 6, wherein the second weld is spaced apart from the first weld.

8. The fluid-filled chamber of claim 6, wherein the first weld contacts and extends from the second weld.

9. The fluid-filled chamber of claim 1, wherein the tensile member includes a plurality of tensile elements extending between the first barrier sheet and the second barrier sheet.

10. The fluid-filled chamber of claim 9, wherein the plurality of tensile elements extend between and connect a first tensile layer that opposes the first barrier sheet and a second tensile layer that opposes the second barrier sheet.

11. The fluid-filled chamber of claim 10, wherein the first tensile layer is attached to the first barrier sheet and the second tensile layer is attached to the second barrier sheet.

12. An article of footwear or equipment incorporating the fluid-filled chamber of claim 1.

13. A method of making a fluid-filled chamber, the method comprising:
receiving a first barrier sheet formed from a first material;
receiving a second barrier sheet formed from a second material;
receiving a tensile member formed from a third material;
positioning the tensile member between the first barrier sheet and the second barrier sheet; and
welding the first barrier sheet, the second barrier sheet, and the tensile member together at a first weld by melding the first material of the first barrier sheet, the second material of second barrier sheet, and the third material of the tensile member.

14. The method of claim 13, further comprising providing an internal cavity of the fluid-filled chamber with a pressurized fluid.

15. The method of claim 13, wherein forming the first barrier sheet from a first material, forming the second barrier sheet from a second material, and forming the tensile member from a third material includes forming the first barrier sheet, the second barrier sheet, and the tensile member from materials having melting temperatures that are approximately the same.

16. The method of claim 13, wherein forming the first barrier sheet from a first material, forming the second barrier sheet from a second material, and forming the tensile member from a third material includes forming at least two of the first barrier sheet, the second barrier sheet, and the tensile member from the same material.

17. The method of claim 13, further comprising forming a second weld that extends continuously around a perimeter of the fluid-filled chamber to define an outer edge of the fluid-filled chamber.

18. The method of claim 17, wherein forming a second weld that extends continuously around a perimeter of the fluid-filled chamber includes joining the first barrier sheet and the second barrier sheet.

19. The method of claim 18, wherein welding the first barrier sheet, the second barrier sheet, and the tensile member together at the first weld includes spacing the first weld apart from the second weld.

20. The method of claim 18, wherein welding the first barrier sheet, the second barrier sheet, and the tensile member together at the first weld includes contacting the first weld with the second weld such that the first weld extends from the second weld.

* * * * *